US012348706B2

(12) United States Patent
Zhang et al.

(10) Patent No.: US 12,348,706 B2
(45) Date of Patent: Jul. 1, 2025

(54) SELECTIVE USE OF CODING TOOLS IN VIDEO PROCESSING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 151 days.

(21) Appl. No.: 18/089,381

(22) Filed: Dec. 27, 2022

(65) Prior Publication Data

US 2023/0133338 A1     May 4, 2023

Related U.S. Application Data

(63) Continuation of application No. 17/519,310, filed on Nov. 4, 2021, now Pat. No. 11,575,887, which is a
(Continued)

(30) Foreign Application Priority Data

May 11, 2019   (WO) ................ PCT/CN2019/086487
Oct. 12, 2019   (WO) ................ PCT/CN2019/110905

(51) Int. Cl.
    *H04N 19/105*      (2014.01)
    *H04N 19/176*      (2014.01)
    *H04N 19/51*      (2014.01)

(52) U.S. Cl.
    CPC ......... *H04N 19/105* (2014.11); *H04N 19/176* (2014.11); *H04N 19/51* (2014.11)

(58) Field of Classification Search
    CPC .. H04N 19/103; H04N 19/105; H04N 19/136; H04N 19/176; H04N 19/51; H04N 19/517
See application file for complete search history.

(56) References Cited

U.S. PATENT DOCUMENTS 7,627,037 B2    12/2009   Li
8,340,177 B2    12/2012   Ji
(Continued)

FOREIGN PATENT DOCUMENTS

CA       3070678 A1    1/2019
CN     101160970 A    4/2008
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Anner N Holder
(74) *Attorney, Agent, or Firm* — Conley Rose, P.C.

(57) ABSTRACT

A video processing method is provided to include determining, for a conversion between a current video block of a current picture of a video and a coded representation of the video, that use of a coding tool is disabled for the current video block due to use of a reference picture having a dimension different from a dimension of the current picture for coding of the current video block into the coded representation; and performing the conversion based on the determining.

20 Claims, 35 Drawing Sheets

Related U.S. Application Data continuation of application No. PCT/CN2020/089556, filed on May 11, 2020.

(56) References Cited

U.S. PATENT DOCUMENTS

| | | | |
|---|---|---|---|
| 8,374,238 B2 | 2/2013 | Xiong |
| 8,442,108 B2 | 5/2013 | Song |
| 9,247,246 B2 | 1/2016 | Lu |
| 9,294,777 B2 | 3/2016 | Wang |
| 9,521,425 B2 | 12/2016 | Chen |
| 9,525,861 B2 | 12/2016 | Zhang |
| 9,621,920 B2 | 4/2017 | An |
| 9,641,852 B2 | 5/2017 | Lu |
| 9,667,996 B2 | 5/2017 | Chen |
| 9,762,927 B2 | 9/2017 | Chen |
| 9,832,351 B1 | 11/2017 | Schoenblum |
| 9,838,712 B2 | 12/2017 | Lin |
| 10,158,884 B2 | 12/2018 | Zhang |
| 10,230,937 B2 | 3/2019 | Lin |
| 10,448,010 B2 | 10/2019 | Chen |
| 10,462,462 B2 | 10/2019 | Chien |
| 10,469,847 B2 | 11/2019 | Xiu |
| 10,491,917 B2 | 11/2019 | Chen |
| 10,523,964 B2 | 12/2019 | Chuang |
| 10,542,280 B2 | 1/2020 | Sun |
| 10,645,382 B2 | 5/2020 | Zhang |
| 10,701,366 B2 | 6/2020 | Chen |
| 10,764,592 B2 | 9/2020 | Zhang |
| 10,779,002 B2 | 9/2020 | Chen |
| 10,841,609 B1 | 11/2020 | Liu |
| 11,240,531 B2 | 2/2022 | Liu |
| 11,425,417 B2 | 8/2022 | Liu |
| 11,546,604 B2 | 1/2023 | Luo |
| 11,575,887 B2 | 2/2023 | Zhang et al. |
| 11,689,747 B2 | 6/2023 | Zhang et al. |
| 11,876,932 B2 | 1/2024 | Liu et al. |
| 12,034,964 B2 | 7/2024 | Liu et al. |
| 12,081,767 B2 | 9/2024 | Liu et al. |
| 2009/0003446 A1 | 1/2009 | Wu |
| 2009/0175334 A1 | 7/2009 | Ye |
| 2009/0268823 A1 | 10/2009 | Dane |
| 2010/0157078 A1 | 6/2010 | Atanassov |
| 2010/0284466 A1 | 11/2010 | Pandit |
| 2011/0176611 A1 | 7/2011 | Huang |
| 2014/0022343 A1 | 1/2014 | Chen |
| 2014/0098851 A1 | 4/2014 | Chen |
| 2014/0286408 A1 | 9/2014 | Zhang |
| 2015/0085935 A1 | 3/2015 | Chen |
| 2015/0160390 A1 | 6/2015 | Goyal |
| 2015/0181216 A1 | 6/2015 | Zhang |
| 2015/0271524 A1 | 9/2015 | Zhang |
| 2015/0358599 A1 | 12/2015 | Lin |
| 2016/0073132 A1 | 3/2016 | Zhang |
| 2016/0080748 A1 | 3/2016 | Sasai |
| 2016/0100189 A1 | 4/2016 | Pang |
| 2016/0191931 A1 | 6/2016 | Hannuksela |
| 2017/0105018 A1 | 4/2017 | Wu |
| 2017/0230662 A1 | 8/2017 | Nishitani |
| 2017/0332095 A1 | 11/2017 | Zou et al. |
| 2017/0339405 A1 | 11/2017 | Wang |
| 2018/0014017 A1 | 1/2018 | Li |
| 2018/0041769 A1 | 2/2018 | Chuang |
| 2018/0098089 A1 | 4/2018 | Chen |
| 2018/0184083 A1 | 6/2018 | Panusopone et al. |
| 2018/0184117 A1 | 6/2018 | Chen |
| 2018/0192071 A1 | 7/2018 | Chuang |
| 2018/0199057 A1 | 7/2018 | Chuang |
| 2018/0241998 A1 | 8/2018 | Chen |
| 2018/0262773 A1 | 9/2018 | Chuang |
| 2018/0278949 A1 | 9/2018 | Karczewicz |
| 2018/0278950 A1 | 9/2018 | Chen |
| 2018/0324417 A1 | 11/2018 | Karczewicz et al. |
| 2018/0332298 A1 | 11/2018 | Liu |
| 2018/0359483 A1 | 12/2018 | Chen |
| 2019/0020895 A1 | 1/2019 | Liu |
| 2019/0045192 A1 | 2/2019 | Socek |
| 2019/0132606 A1 | 5/2019 | Su |
| 2019/0208204 A1 | 7/2019 | Tourapis |
| 2019/0222848 A1 | 7/2019 | Chen |
| 2019/0230350 A1 | 7/2019 | Chen |
| 2019/0273937 A1 | 9/2019 | Yu |
| 2019/0306502 A1 | 10/2019 | Gadde |
| 2019/0320199 A1 | 10/2019 | Chen |
| 2019/0349580 A1 | 11/2019 | Li |
| 2020/0029091 A1 | 1/2020 | Chien |
| 2020/0036997 A1 | 1/2020 | Li |
| 2020/0045310 A1 | 2/2020 | Chen |
| 2020/0128258 A1 | 4/2020 | Chen |
| 2020/0169748 A1 | 5/2020 | Chen |
| 2020/0213594 A1 | 7/2020 | Liu |
| 2020/0213612 A1 | 7/2020 | Liu |
| 2020/0221117 A1 | 7/2020 | Liu |
| 2020/0244979 A1 | 7/2020 | Li |
| 2020/0296405 A1 | 9/2020 | Huang |
| 2020/0344475 A1 | 10/2020 | Zhu |
| 2020/0359029 A1 | 11/2020 | Liu |
| 2020/0366928 A1 | 11/2020 | Liu |
| 2020/0374544 A1 | 11/2020 | Liu |
| 2020/0382795 A1 | 12/2020 | Zhang |
| 2020/0396453 A1 | 12/2020 | Zhang |
| 2021/0029362 A1 | 1/2021 | Liu |
| 2021/0029364 A9 | 1/2021 | Yu |
| 2021/0051339 A1 | 2/2021 | Liu |
| 2021/0076063 A1 | 3/2021 | Liu |
| 2021/0092413 A1 | 3/2021 | Tsukuba |
| 2021/0092435 A1 | 3/2021 | Liu |
| 2021/0160511 A1 | 5/2021 | Zhang |
| 2021/0160533 A1 | 5/2021 | Zhang |
| 2021/0218985 A1 | 7/2021 | Liu |
| 2021/0227209 A1 | 7/2021 | Liu |
| 2021/0235073 A1 | 7/2021 | Liu |
| 2021/0235074 A1 | 7/2021 | Liu |
| 2021/0235109 A1 | 7/2021 | Liu |
| 2021/0235110 A1 | 7/2021 | Liu |
| 2021/0258598 A1 | 8/2021 | Hendry |
| 2021/0266587 A1 | 8/2021 | Liu |
| 2021/0274208 A1 | 9/2021 | Zhang |
| 2021/0274211 A1 | 9/2021 | Liu |
| 2021/0274212 A1 | 9/2021 | Liu |
| 2021/0289216 A1 | 9/2021 | Liu |
| 2021/0344909 A1 | 11/2021 | Liu |
| 2021/0360256 A1 | 11/2021 | Liu et al. |
| 2021/0368172 A1 | 11/2021 | Lim |
| 2021/0368181 A1 | 11/2021 | Liu |
| 2021/0377559 A1 | 12/2021 | Liu et al. |
| 2021/0377561 A1 | 12/2021 | Zhang |
| 2021/0385499 A1 | 12/2021 | Zhang |
| 2021/0392327 A1 | 12/2021 | Zhang |
| 2022/0007047 A1 | 1/2022 | Zhang et al. |
| 2022/0007048 A1 | 1/2022 | He |
| 2022/0038681 A1 | 2/2022 | Galpin |
| 2022/0060692 A1 | 2/2022 | Zhang et al. |
| 2022/0078488 A1 | 3/2022 | Leleannec |
| 2022/0094940 A1 | 3/2022 | Bandyopadhyay |
| 2022/0116650 A1 | 4/2022 | Liu |
| 2022/0217410 A1 | 7/2022 | Wang |
| 2022/0256196 A1 | 8/2022 | Wang |
| 2023/0125740 A1 | 4/2023 | Luo |

FOREIGN PATENT DOCUMENTS

| | | |
|---|---|---|
| CN | 102215386 A | 10/2011 |
| CN | 102970543 A | 3/2013 |
| CN | 103918266 A | 7/2014 |
| CN | 104170381 A | 11/2014 |
| CN | 104221384 A | 12/2014 |
| CN | 104471943 A | 3/2015 |
| CN | 104813671 A | 7/2015 |
| CN | 105103556 A | 11/2015 |
| CN | 105187824 A | 12/2015 |
| CN | 105325003 A | 2/2016 |
| CN | 106797476 A | 5/2017 |
| CN | 106888379 A | 6/2017 |
| CN | 107027339 A | 8/2017 |

(56) References Cited

FOREIGN PATENT DOCUMENTS

| | | |
|---|---|---|
| CN | 107113425 A | 8/2017 |
| CN | 107431820 A | 12/2017 |
| CN | 107690810 A | 2/2018 |
| CN | 107710764 A | 2/2018 |
| CN | 108028939 A | 5/2018 |
| CN | 108293131 A | 7/2018 |
| CN | 108432250 A | 8/2018 |
| CN | 109417631 A | 3/2019 |
| CN | 110115032 A | 8/2019 |
| CN | 113424533 B | 9/2024 |
| EP | 3939311 A1 | 1/2022 |
| IN | 538600 | 5/2024 |
| IN | 546327 | 7/2024 |
| JP | 2008236402 A | 10/2008 |
| JP | 2020017970 A | 1/2020 |
| JP | 2022520825 A | 4/2022 |
| JP | 7556090 B2 | 9/2024 |
| TW | 201830968 A | 8/2018 |
| WO | 2007108661 A1 | 9/2007 |
| WO | 2017118409 A1 | 7/2017 |
| WO | 2018048265 A1 | 3/2018 |
| WO | 2018113658 A1 | 6/2018 |
| WO | 2018117546 A1 | 6/2018 |
| WO | 2018119167 A1 | 6/2018 |
| WO | 2018121506 A1 | 7/2018 |
| WO | 2018156628 A1 | 8/2018 |
| WO | 2018169923 A1 | 9/2018 |
| WO | 2018175720 A1 | 9/2018 |
| WO | 2018175756 A1 | 9/2018 |
| WO | 2018199050 A1 | 11/2018 |
| WO | 2018237303 A1 | 12/2018 |
| WO | 2019072595 A1 | 4/2019 |
| WO | 2019129130 A1 | 7/2019 |
| WO | 2020189893 A1 | 9/2020 |

OTHER PUBLICATIONS

Chen et al. ""CE4: Affine Merge Enhancement with Simplification (Test 4.2.2).""" Joint Video Experts Team (JVET) of ITU-T SG 16 WP 3 and ISO/IEC JTC 1/SC 29/WG 11 12th Meeting: Macao, CN, Oct. 3-12, 2018, document JVET-L0368, 2018.

Chen et al. "Crosscheck of JVET-L0142 (CE4: Simplification of the Common Base for Affine Merge (Test 4.2.6))." Joint Video Experts Team (JVET) of ITU-T SG 16 WP 3 and ISO/IEC JTC 1/SC 29/WG 11 12th Meeting: Macao, CN, Oct. 3-12, 2018, document JVET-L0632, 2018.

Chen et al. "CE4-Related: MMVD Cleanups," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0171, 2019.

Chen et al. "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0279, 2019.

Davies, Thomas. "Resolution Switching for Coding Efficiency and Resilience," Joint Collaborative Team on Video Coding (JCT-VC) of ITU-T SG16 WP3 and ISO/IEC JTC1/SC29/WG11 6th Meeting: Turin, IT, Jul. 14-22, 2011, document JCTVC-F158, 2011.

Davies, Thomas. "AHG18: Design Considerations for Adaptive Resolution Coding (ARC)," Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, document JCTVC-H0234, 2012.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337, 2018.

Hannuksela et al. "Use Cases and Proposed Design Choices for Adaptive Resolution Changing (ARC)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0259, 2019.

Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.

Hannuksela et al. "AHG12: Sub-Picture Layers for Realizing Independently Coded Picture Regions," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0045, 2019.

Hannuksela et al. "AHG19: On Adaptive Resolution Changing," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0048, 2019.

Hendry et al. "On Adaptive Resolution Change (ARC) for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0135, 2019.

Hendry et al. "AHG19: Adaptive Resolution Change (ARC) Support in VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0118, 2019.

Hu et al. "CE5: Coding Tree Block Based Adaptive Loop Filter (CE5-4)," Joint Video Experts Team (JVET) of ITU-T SG 16 WP 3 and ISO/IEC JTC 1/SC 29/WG 11 14th Meeting: Geneva, CH, Mar. 19-27, 2019, document Jvet-N0415, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11 12th Meeting: Macau, CN, Oct. 8-12, 2018, document JVET-L0142, 2018.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document Jvet-N0052, 2019.

JEM-7.0:https://jvet.hhi.fraunhofer.de/svn/svn_HMJEMSoftware/tags/ HM-16.6-JEM-7.0, Feb. 2, 2022.

Wan et al. "AHG17: Text for Picture Header," Joint Video Experts Team (JVET)of ITU-T SG 16 WP 3 and ISO/IEC JTC 1/SC 29/WG 1116th Meeting: Geneva, CH, Oct. 1-11, 2019, document JVET-P1006, 2019.

Document: JVET-L1001-v9, Bross, B., et al., "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, 13 pages.

Document: JVET-M0116, Yu, R., et al., "CE2-related: ATMVP simplification," Joint Video Experts Team (JVET) of ITU-T SG 16 WP 3 and ISO/IEC JTC 1/SC 29/WG 11 13th Meeting: Marrakech, MA, Jan. 9-18, 2019, 12 pages.

International Search Report and Written Opinion from International Patent Application No. PCT/CN2020/089555 dated Aug. 10, 2020 (12 pages).

International Search Report and Written Opinion from International Patent Application No. PCT/CN2020/089556 dated Aug. 11, 2020 (10 pages).

International Search Report and Written Opinion from International Patent Application No. PCT/CN2020/120287 dated Dec. 31, 2020 (8 pages).

Non Final Office Action from U.S. Appl. No. 17/717,549 dated Aug. 11, 2022.

Extended European Search Report from European Patent Application No. 20873612.4 dated Oct. 25, 2022 (7 pages).

Notice of Allowance from U.S. Appl. No. 17/717,549 dated Dec. 28, 2022.

Non-Final Office Action from U.S. Appl. No. 17/519,310 dated Feb. 8, 2022.

(56) References Cited

OTHER PUBLICATIONS

Non-Final Office Action from U.S. Appl. No. 17/519,310 dated Jun. 1, 2022.
Document: JVET-P0320-v1, Filippov, A., et al., "Non-CE4/AHG17: On slice-level syntax for BDOF and DMVR," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 25 pages.
Document: JVET-N1002-v2, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 80 pages.
Final Office Action from U.S. Appl. No. 17/398,903 dated Nov. 2, 2023, 30 pages.
Document: JVET-L0256-v2, Xiu, X., et al., "CE9-related: Complexity reduction and bit-width control for bi-directional optical flow (BIO)," XP030251694, Joint Video Experts Team (JVET) of ITU-T SG 16 WP 3 and ISO/IC JTC 1/SC 29/WG 11 12th Meeting: Macao, CN, Oct. 3-12, 2018, 15 pages.
Document: JVET-P0320-v1, Filippov, A., et al., "Non-CE4/AHC17: On slice-level syntax for BDOF and DMVR," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Final Office Action from U.S. Appl. No. 17/389,200 dated Feb. 7, 2024, 46 pages.
Extended European Search Report from European Application No. 23210725.0 dated Feb. 6, 2024, 14 pages.
Non-Final Office Action from U.S. Appl. No. 17/398,903 dated Mar. 1, 2024, 16 pages.
Notice of Allowance from U.S. Appl. No. 17/401,438 dated Mar. 1, 2024, 32 pages.
Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 474 pages.
Document: JVET-P0239-v1, Wan, W., et al., "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, 11 pages.
Document: JVET-P0239-v1, Wan, W., et al., "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.
Document: JVET-L0003-v1, Bossen, F., et al., "AHG report: Test Model Software Development (AHG3)," Joint Video Experts Team (JVET) of ITU-T SG 16 WP 3 and ISO/IEC JTC 1/SC 29/WG 11 12th Meeting: Macao, CN, Oct. 3-12, 2018, 9 pages.
Document: JVET-P0057-v2, Xiu, X., et al., "CE4: Harmonization of BDOF and PROF (Test 4-2.1 and 4-2.2)," Joint Video Experts Team (JVET) of ITU-T SG 16 WP 3 and ISO/IEC JTC 1/SC 29/WG 11 16th Meeting: Geneva, CH, Oct. 1-11, 2019, 8 pages.
Document: JVET-P0409-v1, Chen, J., et al., "CE1-related: Enable PROF for RPR," Joint Video Experts Team (JVET) of ITU-T SG 16 WP 3 and 1S0/IEC JTC 1/SC 29/WG 11 16th Meeting: Geneva, CH, Oct. 1-11, 2019, 7 pages.
Chinese Notice of Allowance from Chinese Patent Application No. 202080013766.7 dated Jul. 2, 2024, 8 pages.
European Office Action from European Patent Application No. 20805395.9 dated May 28, 2024, 5 pages.
Singaporean Office Action from Singapore Patent Application No. 11202112279W dated May 15, 2024, 9 pages.
Document: JVET-K1001-v6, Bross, B., et al., "Versatile Video Coding (Draft 2)," Joint Video Experts Team (JVET) of ITU-T SG 16 WP 3 and ISO/IEC JTC 1/SC 29/WG 11 11th Meeting: Ljubljana, SI, Jul. 10-18, 2018, 141 pages.
https://vcgit.hhi.fraunhofer.de/jvet/VVCSoftware_VTM/tags/VTM-2.1, Sep. 20, 2023, 3 pages.

Document: JVET-L0054, Jeong, S., et al., "CE4 Ultimate motion vector expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-M0147-v7, Sethuraman, S., "CE9: Results of DMVR related Tests CE9.2.1 and CE9.2.2," Joint Video Experts Team (JVET) of ITU-T SG 16 WP 3 and ISO/IEC JTC 1/SC 29/WG 11 13th Meeting: Marrakech, MA, Jan. 9-18, 2019, 12 pages.
Document: JVET-L0100-v3, Chiang, M., et al., "CE10.1.1: Multi-hypothesis prediction for improving AMVP mode, skip or merge mode, and intra mode," Joint Video Experts Team (JVET) of ITU-T SG 16 WP 3 and ISO/IEC JTC 1/SC 29/WG 11 12th Meeting: Macao, CN, Oct. 3-12, 2018, 14 pages.
Document: JVET-M0481, Chen., H., et al., "CE4: Symmetrical MVD mode (Test 4.4.3)," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
"Information Technology—High efficiency coding and media delivery in heterogeneous environments—Part 2: High Efficiency Video Coding," ISO/IEC JTC 1/SC 29/WG 11 N17661, ISO/IEC DIS 23008-2:201x (4th Ed.) Rec. ITU-T H.265 | ISO/IEC 23008-2 (in force edition), Apr. 20, 2018, 8 pages.
JEM-7.0:https://jvet.hhi.fraunhofer.de/svn/svn_HMJEMSoftware/tags/ HM-16.6-JEM-7.0, Sep. 20, 2023, 1 page.
Document: JVET-K1024-v4, Yang, H., et al., "Description of Core Experiment 4 (CE4): Inter prediction and motion vector coding," Joint Video Experts Team (JVET) of ITU-T SG 16 WP 3 and ISO/IEC JTC 1/SC 29/WG 11 11th Meeting: Ljubljana, SI, Jul. 10-18, 2018, 47 pages.
Document: JVET-M0223-v4, Sethuraman, S., "Non-CE9: Co-existence analysis for DMVR with BDOF," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-L0369-v2, Chen, H., et al., "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting: Macao, CN, Oct. 3-12, 2018, 5 pages.
Document: JVET-N0815-v3, Esenlik, S., "BoG Report on CE9 Decoder Motion Vector Derivation Related Contributions," Joint Video Experts Team (JVET) of ITU-T SG 16 WP 3 and ISO/IEC JTC 1/SC 29/WG 11, 14th Meeting, Geneva, CH, Mar. 19-27, 2019, 19 pages.
Document: JVET-K0105-v1, Liu, H., et al., "CE9-Related: Simplification of Decoder Side Motion Vector Derivation," Joint Video Experts Team (JVET) of ITU-T SG 16 WP 3 and ISO/IEC JTC 1/SC 29/WG 11 11th Meeting, Ljubljana, SI, Jul. 10-18, 2018, 3 pages.
Document: JVET-L0173-v3, Sethuraman, S., "CE9: Results of Tests 9.1.4, 9.2.4, 9.2.5, and 9.2.6," Joint Video Experts Team (JVET) of ITU-T SG 16 WP 3 and ISO/IEC JTC 1/SC 29/WG 11, 12th Meeting, Macao, CN, Oct. 3-12, 2018, 7 pages.
Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.
Document: JVET-M0467-v2, Luo, J., et al., "CE2-related: Symmetric MVD for Affine Bi-prediction Coding," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Chien, W., et al., "Enhanced AMVP Mechanism Based Adaptive Motion Search Range for Fast HEVC Coding," Ministry of Economic Affairs and National Science Council of Taiwan, IEEE, ICIP, 2014.
Non-Final Office Action From U.S. Appl. No. 17/389,200 dated Aug. 15, 2023, 19 pages.
International Search Report From PCT Application No. PCT/CN2020/074152 dated Apr. 20, 2020, 10 pages.
Non-Final Office Action From U.S. Appl. No. 17/398,903 dated Jul. 26, 2023, 32 pages.
International Search Report From PCT Application No. PCT/CN2020/075226 dated May 8, 2020, 10 pages.
Non-Final Office Action From U.S. Appl. No. 17/401,438 dated Sep. 1, 2023, 41 pages.

(56) References Cited

OTHER PUBLICATIONS

International Search Report From PCT Application No. PCT/CN2020/075232 dated Apr. 29, 2020, 10 pages.
Extended European Search Report From European Patent Application No. 20755475.9 dated Mar. 23, 2022, 11 pages.
Indian Office Action From Indian Patent Application No. 202147036782 dated Mar. 21, 2022, 6 pages.
Non-Final Office Action From U.S. Appl. No. 17/324,432 dated Aug. 4, 2021, 13 pages.
International Search Report From PCT Application No. PCT/CN2020/075235 dated May 8, 2020, 11 pages.
Non-Final Office Action From U.S. Appl. No. 17/324,482 dated Sep. 1, 2021, 22 pages.
International Search Report From PCT Application No. PCT/CN2020/075238 dated Apr. 26, 2020, 11 pages.
Bossen F., "VTM-2.1," May 9, 2022, 1 Page, Retrieved from URL: https://vcgit.hhi.fraunhofer.de/jvet/VVCSoftware_VTM/tags/VTM-2.1.
Bross B., et al., "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-v7, 280 Pages.
Chiang M-S., et al., "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0100-v1, 237 Pages.
Extended European Search Report from European Patent Application No. 20805395.9 dated May 10, 2022 (8 pages).
Lee J., et al., "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting: Macau, CN, Oct. 8-12, 2018, Document: JVET-L0142, 26 Pages.
Luo J., et al., "CE2-Related: Symmetric MVD for Affine Bi-Prediction Coding," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0467, 22 Pages.
Timofte, R., et al., "DIV2K Dataset: DIVerse 2K Resolution High Quality Images as Used for the Challenges @ NTIRE CVPR 2017 and CVPR 2018) and @ PIRM (ECCV 2018)," https://data.vision.ee.ethz.ch/cvl/DIV2K/, 2017, 6 Pages.
Xiu X., et al., "CE9.1.3: Complexity Reduction on Decoder-Side Motion Vector Refinement (DMVR)," Joint Video Experts Team (JVET) of ITU-T SG 16 WP 3 and ISO/IEC JTC 1/SC 29/WG 11, 11th Meeting: Ljubljana, SI, Jul. 10, 2018-Jul. 18, 2018, Document: JVET-K0342, 2 Pages.
Zhou "Non-CE9: A Computational Complexity Analysis for DMVR," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0480-V1, 4 Pages.
Notice of Allowance for Korean Application No. 10-2022-7010809, mailed on Oct. 28, 2024, 10 pages.
Technical Examination Report for Brazilian Application No. 112021022174-3, mailed Nov. 5, 2024, 12 pages.
Document: JVET-J1029_r1, Esenlik, S., "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11 10th Meeting: San Diego, US, Apr. 10-20, 2018, 35 pages.
Document: JVET-L1002-v1, Chen, J., et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11 12th Meeting: Macao, CN, Oct. 3-12, 2018, 48 pages.
Japanese Notice of Allowance from Japanese Patent Application No. 2023-063135 dated Aug. 13, 2024, 6 pages.
Chujoh T., et al., "Non-CE9: On Conditions for DMVR and BDOF," Sharp Corporation, JVET-N0146, Mar. 26, 2019, 7 Pages.
Notice of First Examination Opinion for Chinese Application No. 202080000731.X, mailed Oct. 24, 2024, 14 pages.
Document: JVET-N0153, Yu, R., et al., "Non-CE9: On DMVR and GBI," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.

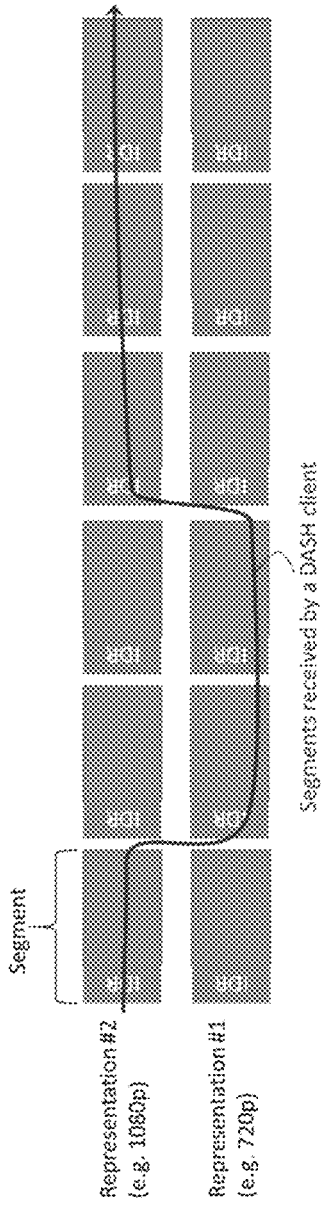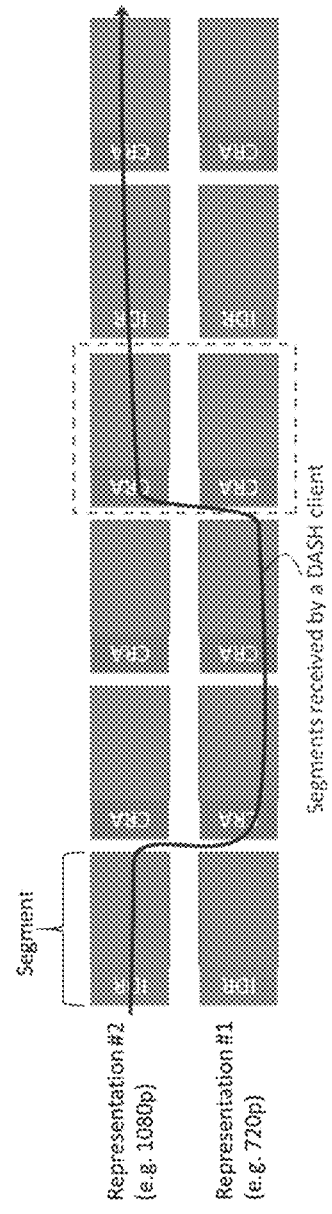

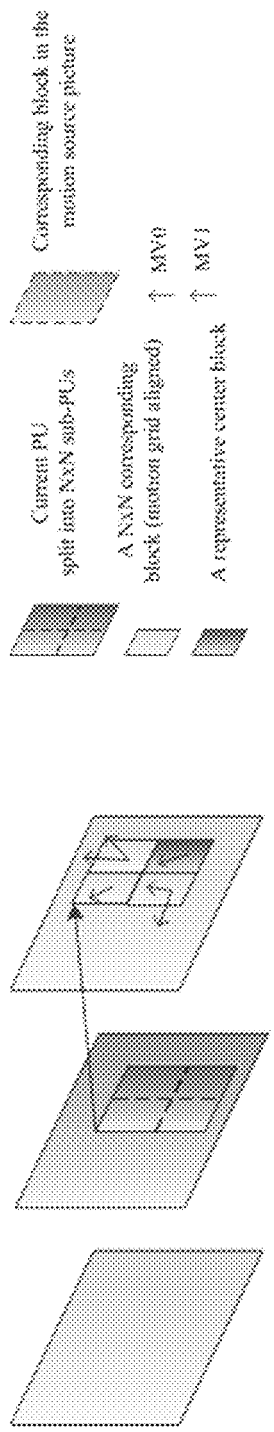
FIG. 15
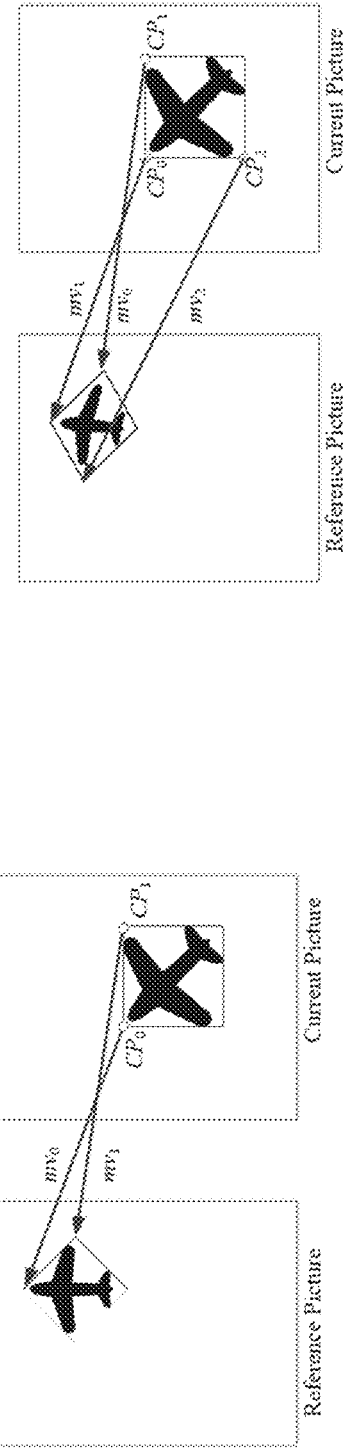
FIG. 16A
FIG. 16B

```
                    ┌─────────────────────────┐
                    │ 2572                    │
                    │ Parsing a coded         │
                    │ representation of a     │
                    │ video to determine      │
                    │ that a current video    │
          2570      │ block of a current      │
           ↘        │ picture of the video    │
                    │ refers to a reference   │
                    │ picture that is         │
                    │ associated with a       │
                    │ resolution different    │
                    │ from a resolution of    │
                    │ the current picture     │
                    └─────────────────────────┘
                                │
                    ┌─────────────────────────┐
                    │ 2574                    │
                    │ Generating a prediction │
                    │ block for the current   │
                    │ video block by          │
                    │ converting a bi-        │
                    │ prediction mode to a    │
                    │ uni-prediction mode to  │
                    │ be applied to the       │
                    │ current video block     │
                    └─────────────────────────┘
                                │
                    ┌─────────────────────────┐
                    │ 2576                    │
                    │ Generating the video    │
                    │ from the coded          │
                    │ representation using    │
                    │ the prediction block    │
                    └─────────────────────────┘
```

FIG. 25G

SELECTIVE USE OF CODING TOOLS IN VIDEO PROCESSING

CROSS REFERENCE TO RELATED APPLICATIONS

This application is a continuation of U.S. application Ser. No. 17/519,310 filed on Nov. 4, 2021, which is a continuation of International Patent Application No. PCT/CN2020/089556 filed on May 11, 2020, both of which claim the priority to and benefits of International Patent Application No. PCT/CN2019/086487 filed on May 11, 2019, and International Patent Application No. PCT/CN2019/110905 filed on Oct. 12, 2019. All the aforementioned patent applications are hereby incorporated by reference in their entireties.

TECHNICAL FIELD

The present disclosure relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems, and methods related to digital video processing, for example, to adaptive loop filtering for video processing, are described. The described methods may be applied to both the existing video coding standards (e.g., High Efficiency Video Coding (HEVC)) and future video coding standards (e.g., Versatile Video Coding (VVC)) or codecs.

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H. 261 and H. 263, ISO/IEC produced Moving Picture Experts Group (MPEG)-1 and MPEG-4 Visual, and the two organizations jointly produced the H. 262/MPEG-2 Video and H. 264/MPEG-4 Advanced Video Coding (AVC) and H. 265/HEVC standards. Since H. 262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the JVET between VCEG (Q6/16) and ISO/IEC Joint Technical Committee (JTC) 1 SC 29/WG11 (MPEG) was created to work on the VVC standard targeting at 50% bitrate reduction compared to HEVC.

In one representative aspect, the disclosed technology may be used to provide a video processing method. The method includes: deriving, for a conversion between a current video block of a current picture of a video and a coded representation of the video, one or more motion vector offsets based on one or more resolutions of reference pictures associated with the current video block and a resolution of the current picture; and performing the conversion using the one or more motion vector offsets.

In one representative aspect, the disclosed technology may be used to provide a video processing method. The method includes constructing, for a conversion between a current video block of a current picture of a video and a coded representation of the video, a motion candidate list in which motion candidates are included in a priority order such that a priority of a motion candidate is based on a resolution of a reference picture that is associated with the motion candidate; and performing the conversion using the motion candidate list.

In one representative aspect, the disclosed technology may be used to provide a video processing method. The method includes determining parameters of an adaptive loop filter for a current video picture comprising one or more video units based on a dimension of the current video picture; and performing a conversion between the current video picture and a coded representation of the current video picture by filtering the one or more video units according to the parameters of the adaptive loop filter.

In one representative aspect, the disclosed technology may be used to provide a video processing method. The method includes applying, for a current video block of a current picture of a video, a luma mapping with chroma scaling (LMCS) process in which luma samples of the current video block are reshaped between a first domain and a second domain and chroma residual is scaled in a luma-dependent manner by using LMCS parameters associated with corresponding dimensions; and performing a conversion between the current video block and a coded representation of the video.

In one representative aspect, the disclosed technology may be used to provide a video processing method. The method includes determining, for a conversion between a current video block of a video and a coded representation of the video, whether to and/or how to enable a coding tool that splits the current video block into multiple sub-partitions according to a rule based on a reference picture information of the multiple sub-partitions; and performing the conversion based on the determining.

In one representative aspect, the disclosed technology may be used to provide a video processing method. The method includes determining, for a conversion between a current video block of a current picture of a video and a coded representation of the video, that use of a coding tool is disabled for the current video block due to use of a reference picture having a dimension different from a dimension of the current picture for coding of the current video block into the coded representation; and performing the conversion based on the determining.

In one representative aspect, the disclosed technology may be used to provide a video processing method. The method includes generating, for a current video block of a current picture of a video, a prediction block by applying a coding tool to the current video block based on a rule that determines whether and/or how to use a reference picture with dimensions different from dimensions of the current picture; and performing a conversion between the current video block and a coded representation of the video using the prediction block.

In one representative aspect, the disclosed technology may be used to provide a video processing method. The method includes determining, for a conversion between a current video block of a current picture of a video and a coded representation of the video, whether a coding tool is disabled for the current video block based on a first resolution of reference pictures associated with one or more reference picture lists and/or a second resolution of a current reference picture used for deriving prediction block for the current video block; and performing the conversion based on the determining.

In one representative aspect, the disclosed technology may be used to provide a video processing method. The method includes performing a conversion between a video picture comprising one or more video blocks and a coded representation of the video, wherein at least some of the one or more video blocks are coded by referring to a reference picture list for the video picture according to a rule, wherein the rule specifies that the reference picture list contains reference pictures having at most K different resolutions, where K is an integer.

In one representative aspect, the disclosed technology may be used to provide a video processing method. The method includes performing a conversion between N consecutive video pictures of a video and a coded representation of the video, wherein the N consecutive video pictures include one or more video blocks that are coded with different resolutions according to a rule, wherein the rule specifies that at most K different resolutions are allowed for the N consecutive pictures, where N and K are integers.

In one representative aspect, the disclosed technology may be used to provide a video processing method. The method includes performing a conversion between a video comprising a plurality of pictures and a coded representation of the video, wherein at least some of the plurality of pictures are coded in the coded representation using different coded video resolutions, and wherein the coded representation conforms to a format rule that a first coded resolution of a previous frame is changed to a second coded resolution of a next frame after the previous frame in an order only in a case that the next frame is coded as an intra frame.

In one representative aspect, the disclosed technology may be used to provide a video processing method. The method includes parsing a coded representation of a video to determine that a current video block of a current picture of the video refers to a reference picture that is associated with a resolution different from a resolution of the current picture; generating a prediction block for the current video block by converting a bi-prediction mode to a uni-prediction mode to be applied to the current video block; and generating the video from the coded representation using the prediction block.

In one representative aspect, the disclosed technology may be used to provide a video processing method. The method includes generating a prediction block for a current video block of a current picture of a video by enabling or disabling an inter-prediction from reference pictures with different resolutions from each other depending on a motion vector precision and/or resolution ratios; and performing a conversion between the current video block and a coded representation of the video using the prediction block.

In one representative aspect, the disclosed technology may be used to provide a video processing method. The method includes determining, based on a coding characteristic of a current video block of a current picture of a video, whether a reference picture with a different dimension than that of the current picture is allowed for generating a prediction block for the current video block during a conversion between the current video block and a coded representation of the video; and performing the conversion according to the determining.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 1 shows an example of adaptive streaming of two Representations of a same content coded at different resolutions.

FIG. 2 shows an example of an adaptive streaming of two Representations of the same content coded at different resolutions.

FIG. 7 shows examples of collocated sub-picture Representations of different Intra Random Access Point (IRAP) intervals and different sizes.

FIG. 8 illustrates an example of segments received when a viewing orientation change causes a resolution change.

FIG. 15 shows an example of alternative temporal motion vector prediction (ATMVP) motion prediction for a coding unit (CU).

FIGS. 16A and 16B show examples of a simplified 4-parameter affine motion model and a simplified 6-parameter affine motion model, respectively.

FIGS. 25A to 25I show flowcharts of example methods for video processing in accordance with some implementations of the disclosed technology.

DETAILED DESCRIPTION

Figure 3:
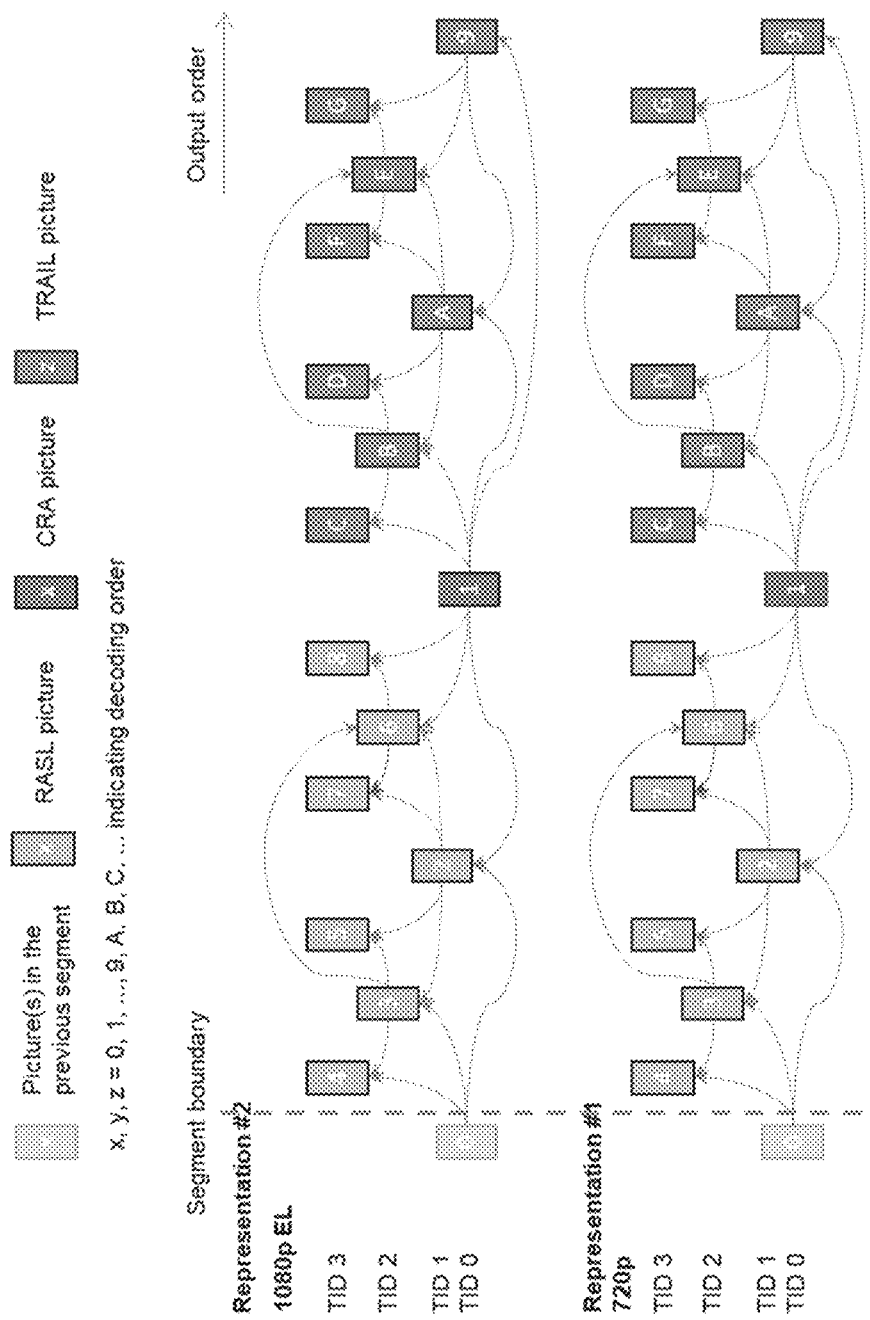
FIG. 3 shows examples of open group of pictures (GOP) prediction structures of the two Representations.

The techniques and devices disclosed in this disclosure provide coding tools with adaptive resolution conversion. AVC and HEVC do not have the ability to change resolution without having to introduce an IDR or intra random access point (IRAP) picture; such ability can be referred to as adaptive resolution change (ARC). There are use cases or application scenarios that would benefit from an ARC feature, including the following:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an IRAP picture; this has several issues. An IRAP picture at reasonable quality will be much larger than an inter-coded picture and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing, it is common that the active speaker is shown in bigger video size than the video for the rest of conference participants. When the active speaker changes, picture resolution for each participant may also need to be adjusted. The need to have ARC feature becomes more important when such change in active speaker happens frequently.

Fast start in streaming: For streaming application, it is common that the application would buffer up to certain length of decoded picture before start displaying. Starting the bitstream with smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., Clean Random Access (CRA) pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching—at CRA pictures can be decoded with acceptable quality hence enabling seamless switching. With ARC, the @mediaStreamStructureId feature would also be usable for switching between DASH representations with different spatial resolutions.

ARC is also known as Dynamic resolution conversion.

ARC may also be regarded as a special case of Reference Picture Resampling (RPR) such as H. 263 Annex P.

1.1 Reference Picture Resampling in H. 263 Annex P

This mode describes an algorithm to warp the reference picture prior to its use for prediction. It can be useful for resampling a reference picture having a different source format than the picture being predicted. It can also be used for global motion estimation, or estimation of rotating motion, by warping the shape, size, and location of the reference picture. The syntax includes warping parameters to be used as well as a resampling algorithm. The simplest level of operation for the reference picture resampling mode is an implicit factor of 4 resampling as only an FIR filter needs to be applied for the upsampling and downsampling processes. In this case, no additional signaling overhead is required as its use is understood when the size of a new picture (indicated in the picture header) is different from that of the previous picture.

1.2 Contributions on ARC to VVC

1.2.1. JVET-M 0135

A preliminary design of ARC as described below, with some parts taken from Joint Collaborative Team on Video Coding (JCTVC)-F158, is suggested to be a place holder just to trigger the discussion. Double brackets are placed before and after the text deleted.

2.2.1.1 Description of Basic Tools

The basic tools constraints for supporting ARC are as follows:

The spatial resolution may differ from the nominal resolution by a factor 0.5, applied to both dimensions. The spatial resolution may increase or decrease, yielding scaling ratios of 0.5 and 2.0.

The aspect ratios and chroma formats of the video format are not changed.

The cropping areas are scaled in proportion to spatial resolutions.

The reference pictures are simply re-scaled as needed and inter prediction is applied as usual.

2.2.1.2 Scaling Operations

It is proposed to use simple, zero-phase separable down- and up-scaling filters. Note that these filters are for prediction only; a decoder may use more sophisticated scaling for output purposes.

The following 1:2 down-scaling filter is used, which has zero phase and 5 taps:

(−1, 9, 16, 9, −1)/32

The down-sampling points are at even sample positions and are co-sited. The same filter is used for luma and chroma.

For 2:1 up-sampling, additional samples at odd grid positions are generated using the half-pel motion compensation interpolation filter coefficients in the latest VVC working draft (WD).

The combined up- and down-sampling will not change phase or the position of chroma sampling points.

2.2.1.2 Resolution Description in Parameter Set

The signaling of picture resolution in the sequence parameter set (SPS) is changed as shown below.

TABLE 1

Sequence parameter set Raw Byte Sequence
Payload (RBSP) syntax and semantics.

| | Descriptor |
|---|---|
| seq_parameter_set_rbsp( ) { | |
| ... | |
| [[pic_width_in_luma_samples | ue(v)]] |
| [[pic_height_in_luma_samples | ue(v)]] |
| num_pic_size_in_luma_samples_minus1 | ue(v) |
| for( i = 0; i <= | |
| num_pic_size_in_luma_samples_minus1; i++ ) { | |
| pic_width_in_luma_samples[ i ] | ue(v) |
| pic_height_in_luma_samples[ i ] | ue(v) |
| } | |
| ... | |
| } | |

[[pic_width_in_luma_samples specifies the width of each decoded picture in units of luma samples. pic_width_in_luma_samples shall not be equal to 0 and shall be an integer multiple of MinCbSizeY.

pic_height_in_luma_samples specifies the height of each decoded picture in units of luma samples. pic_height_in_luma_samples shall not be equal to 0 and shall be an integer multiple of MinCbSizeY.]]

num_pic_size_in_luma_samples_minus1 plus 1 specifies the number of picture sizes (width and height) in units of luma samples that may be present in the coded video sequence.

pic_width_in_luma_samples[i] specifies the i-th width of decoded pictures in units of luma samples that may be present in the coded video sequence. pic_width_in_luma_samples[i] shall not be equal to 0 and shall be an integer multiple of MinCbSizeY.

pic_height_in_luma_samples[i] specifies the i-th height of decoded pictures in units of luma samples that may be present in the coded video sequence. pic_height_in_luma_samples[i] shall not be equal to 0 and shall be an integer multiple of MinCbSizeY.

TABLE 2

Picture parameter set RBSP syntax and semantics

| pic_parameter_set_rbsp( ) { |
|---|
| ... |
| pic_size_idx |
| ... |
| } | pic_size_idx specifies the index to the i-th picture size in the sequence parameter set. The width of pictures that refer to the picture parameter set is pic_width_in_luma_samples [pic_size_idx] in luma samples. Likewise, the height of pictures that refer to the picture parameter set is pic_height_in_luma_samples[pic_size_idx] in luma samples.

1.2.2. JVET-M 0259
1.2.2.1. Background: Sub-Pictures

The terms sub-picture track is defined as follows in Omnidirectional Media Format (OMAF): track that is with spatial relationships to other track(s) and that represents that represents a spatial subset of the original video content, which has been split into spatial subsets before video encoding at the content production side. A sub-picture track for HEVC can be constructed by rewriting the parameter sets and slice segment headers for a motion-constrained tile set so that it becomes a self-standing HEVC bitstream. A sub-picture Representation can be defined as a DASH Representation that carries a sub-picture track.

JVET-M 0261 used the term sub-picture as a spatial partitioning unit for VVC, summarized as follows:

1. Pictures are divided into sub-pictures, tile groups and tiles.
2. A sub-picture is a rectangular set of tile groups that starts with a tile group that has tile_group_address equal to 0.
3. Each sub-picture may refer to its own picture parameter set (PPS) and may hence have its own tile partitioning.
4. Sub-pictures are treated like pictures in the decoding process.
5. The reference pictures for decoding the sub-picture are generated by extracting the area collocating with the current sub-picture from the reference pictures in the decoded picture buffer. The extracted area shall be a decoded sub-picture, i.e., inter prediction takes place between sub-pictures of the same size and the same location within the picture.
6. A tile group is a sequence of tiles in tile raster scan of a sub-picture.

In this contribution, the term, sub-picture, can be understood as defined in JVET-M 0261. However, a track that encapsulates a sub-picture sequence as defined in JVET-M 0261 has very similar properties as a sub-picture track defined in OMAF, the examples given below apply in both cases.

1.2.2.2. Use Cases
1.2.2.2.1. Adaptive Resolution Change in Streaming
Requirement for the Support of Adaptive Streaming Section 5.13 ("Support for Adaptive Streaming") of MPEG N17074 includes the following requirement for VVC: The standard shall support fast representation switching in the case of adaptive streaming services that offer multiple representations of the same content, each having different properties (e.g., spatial resolution or sample bit depth). The standard shall enable the use of efficient prediction structures (e.g., so-called open groups of pictures) without compromising from the fast and seamless representation switching capability between representations of different properties, such as different spatial resolutions.

Example of the Open GOP Prediction Structure with Representation Switching

Content generation for adaptive bitrate streaming includes generations of different Representations, which can have different spatial resolutions. The client requests Segments from the Representations and can hence decide at which resolution and bitrate the content is received. At the client, the Segments of different Representations are concatenated, decoded, and played. The client should be able to achieve seamless playout with one decoder instance. Closed GOP structures (starting with an Instantaneous Decoder Refresh (IDR) picture) are conventionally used as illustrated in FIG. 1. FIG. 1 shows adaptive streaming of two Representations of the same content coded at different resolutions.

Open GOP prediction structures (starting with CRA pictures) enable better compression performance than the respective closed GOP prediction structures. For example, an average bitrate reduction of 5.6% in terms of luma Bjontegaard delta bitrate was achieved with an IRAP picture interval of 24 pictures. For convenience, the simulations conditions and results are summarized in Section YY.

Open GOP prediction structures reportedly also reduce subjectively visible quality pumping.

A challenge in the use of open GOPs in streaming is that RASL pictures cannot be decoded with correct reference pictures after switching Representations. This challenge in relation to the Representations is presented in FIG. 2 which shows adaptive streaming of two Representations of the same content coded at different resolutions. In FIG. 2, the Segments use either closed GOP or open GOP prediction structures.

The Segments starting with a CRA picture contain RASL pictures for which at least one reference picture is in the previous Segment. This is illustrated in FIG. 3 which shows open GOP prediction structures of the two Representations. In FIG. 3, picture 0 in both bitstreams resides in the previous Segment and is used as reference for predicting the RASL pictures.

Figure 4:
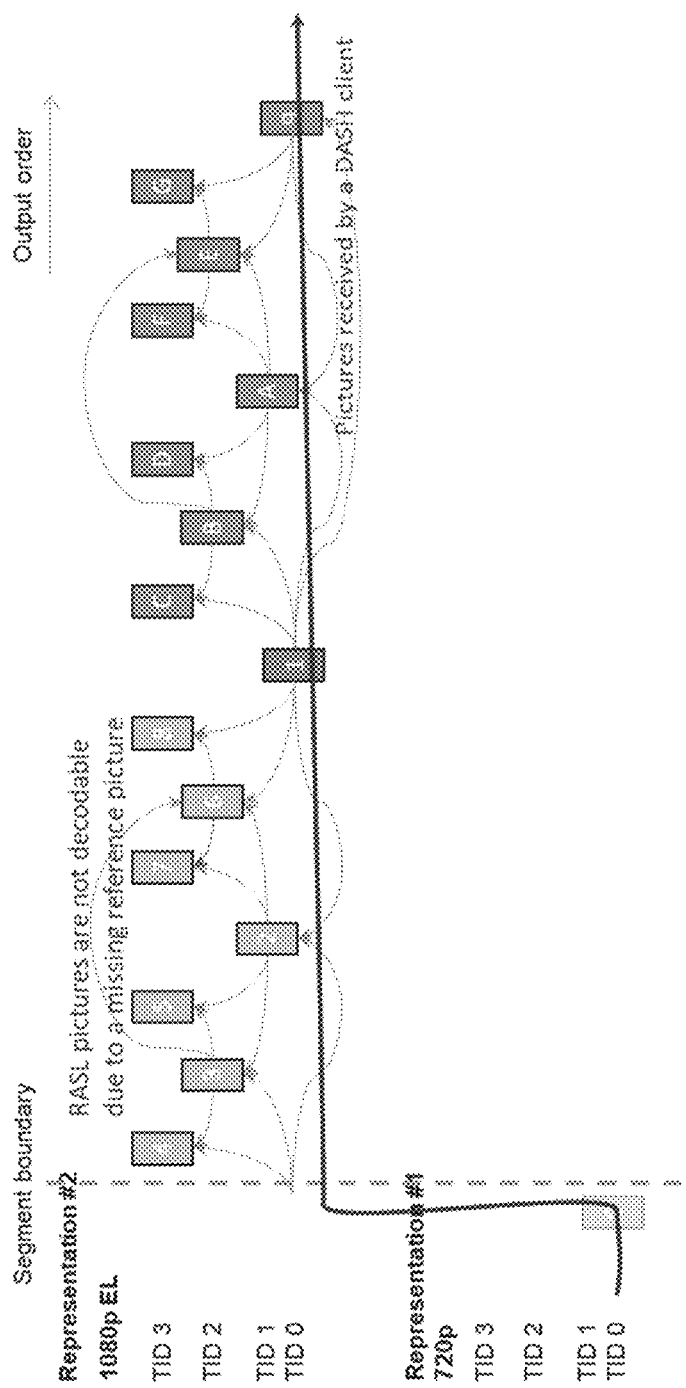
FIG. 4 shows an example of Representation switching at an open GOP position.

The Representation switching marked with a dashed rectangle in in FIG. 2 is illustrated below in FIG. 4 which shows Representation switching at an open GOP position. It can be observed that the reference picture ("picture 0") for RASL pictures has not been decoded. Consequently, RASL pictures are not decodable and there will be a gap in the playout of the video.

Figure 5:
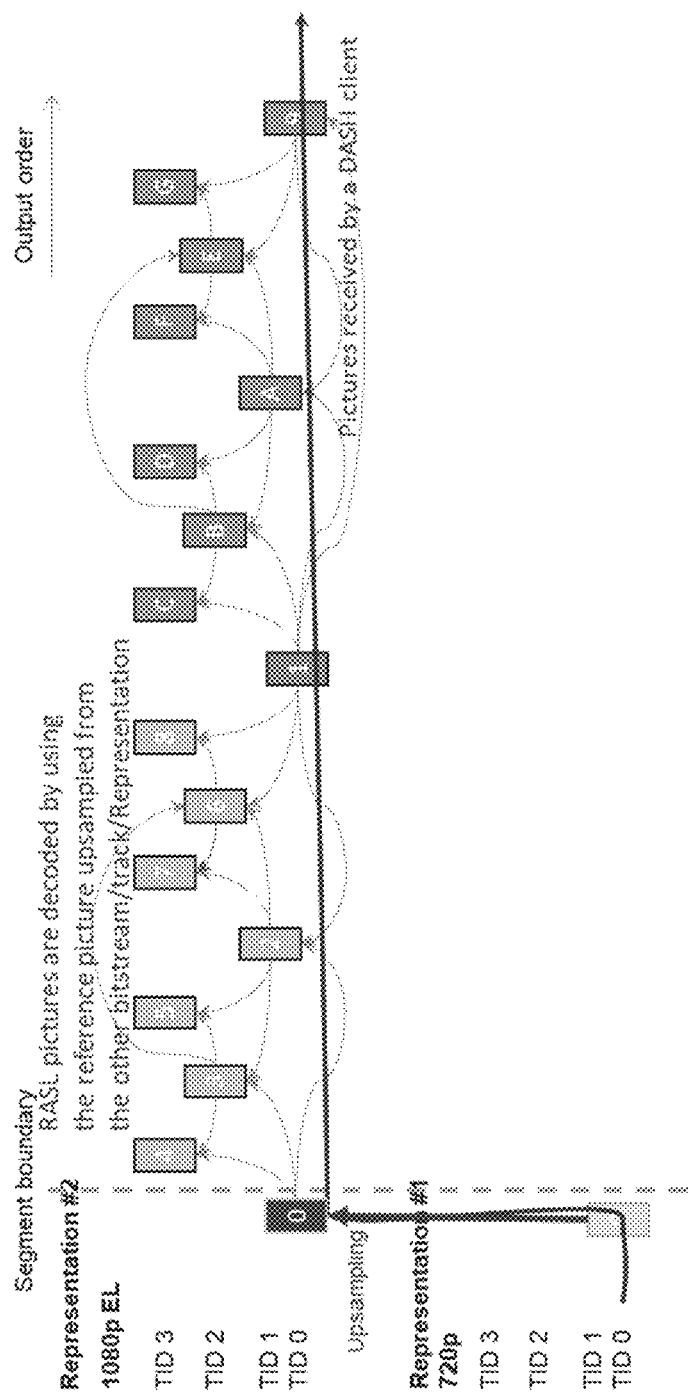
FIG. 5 shows an example of a decoding process for Random Access Skipped Leading (RASL) pictures by using a resampled reference picture from other bitstream as a reference.

However, it has been found to be subjectively acceptable to decode RASL pictures with resampled reference pictures, see Section 4. Resampling of "picture 0" and using it as a reference picture for decoding the RASL pictures is illustrated in FIG. 5. FIG. 5 shows a decoding process for RASL picture by using resampled reference picture from the other bitstream as reference.

2.2.2.2.2. Viewport Change in Region-Wise Mixed-Resolution (RWMR) 360° Video Streaming Background: HEVC-Based RWMR Streaming RWMR 360° streaming offers an increased effective spatial resolution on the viewport. Schemes where tiles covering the viewport originate from a 6K (6144×3072) equirectangular (ERP) picture or an equivalent cubemap (CMP) resolution, illustrated in FIG. 6, with "4K" decoding capacity (HEVC Level 5.1) were included in clauses D. 6.3 and D. 6.4 of OMAF and also adopted in the virtual reality (VR) Industry Forum Guidelines. Such resolutions are asserted to be suitable for head-mounted displays using quad-high definition (HD) (2560×1440) display panel.

Encoding: The content is encoded at two spatial resolutions with cube face size 1536×1536 and 768×768, respectively. In both bitstreams a 6×4 tile grid is used and a motion-constrained tile set (MCTS) is coded for each tile position.

Encapsulation: Each MCTS sequence is encapsulated as a sub-picture track and made available as a sub-picture Representation in DASH.

Selection of streamed MCTSs: 12 MCTSs from the high-resolution bitstream are selected and the complementary 12 MCTSs are extracted from the low-resolution bitstream. Thus, a hemi-sphere (180°×180°) of the streamed content originates from the high-resolution bitstream.

Merging MCTSs to a bitstream to be decoded: The received MCTSs of a single time instance are merged into a coded picture of 1920×4608, which conforms to HEVC Level 5.1. Another option for the merged picture is to have 4 tile columns of width 768, two tile columns of width 384, and three tile rows of height 768 luma samples, resulting into a picture of 3840×2304 luma samples.

Figures 6A, 6B, 6C:
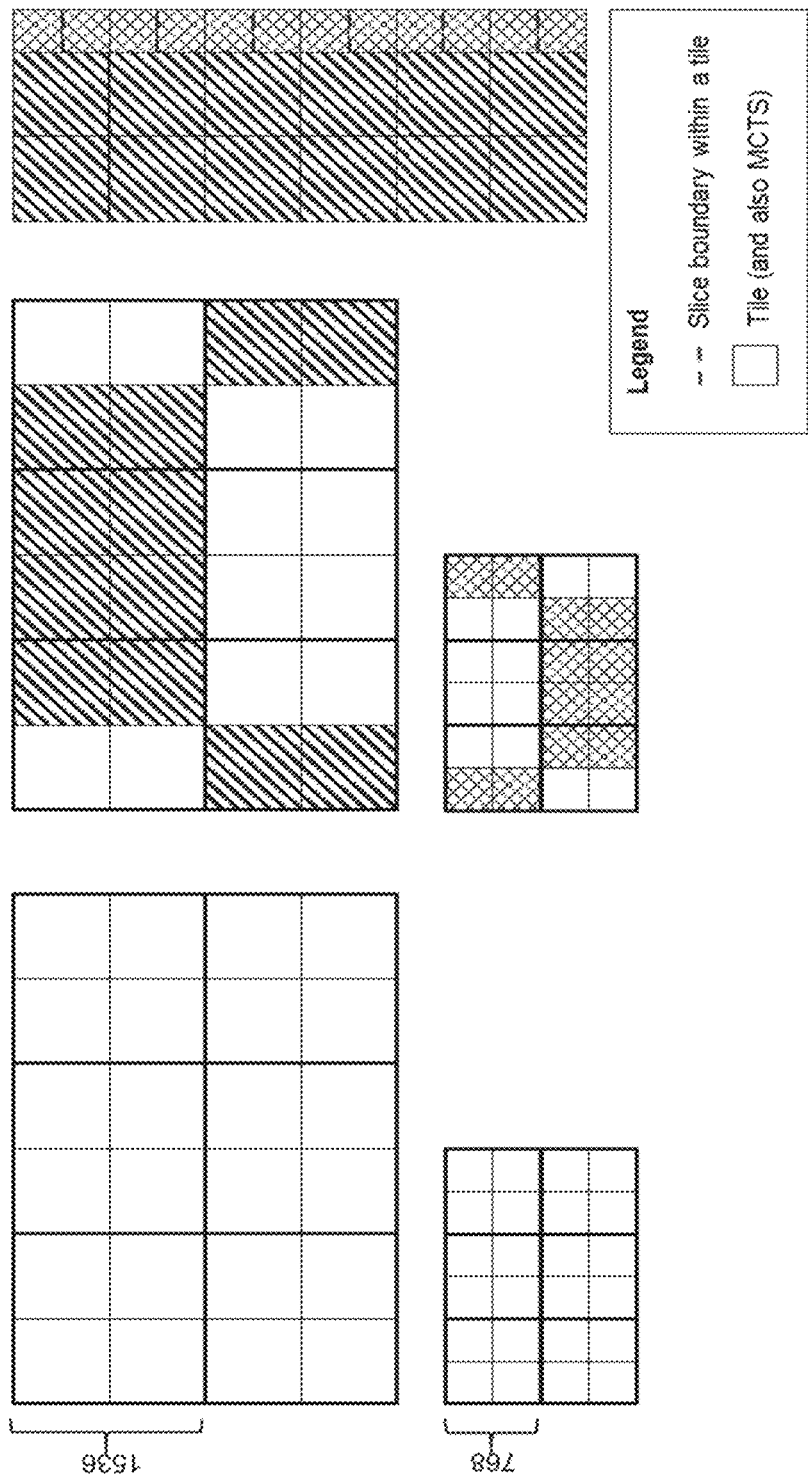
FIGS. 6A to 6C show examples of Motion Constrained Tile Set (MCTS)-based region-wise mixed-resolution (RWMR) viewport-dependent three hundred sixty degree (360°) streaming.

FIG. 6 shows examples of MCTS-based RWMR viewport-dependent 360° streaming. FIG. 6A shows examples of coded bitstreams, FIG. 6B shows examples of MCTSs selected for streaming, and FIG. 6C shows an example of a picture merged from MCTSs.

Background: Several Representations of Different IRAP Intervals for Viewport-Dependent 360° Streaming When viewing orientation changes in HEVC-based viewport-dependent 360° streaming, a new selection of sub-picture Representations can take effect at the next IRAP-aligned Segment boundary. Sub-picture Representations are merged to coded pictures for decoding, and hence the VCL NAL unit types are aligned in all selected sub-picture Representations.

Figures 7, 8:
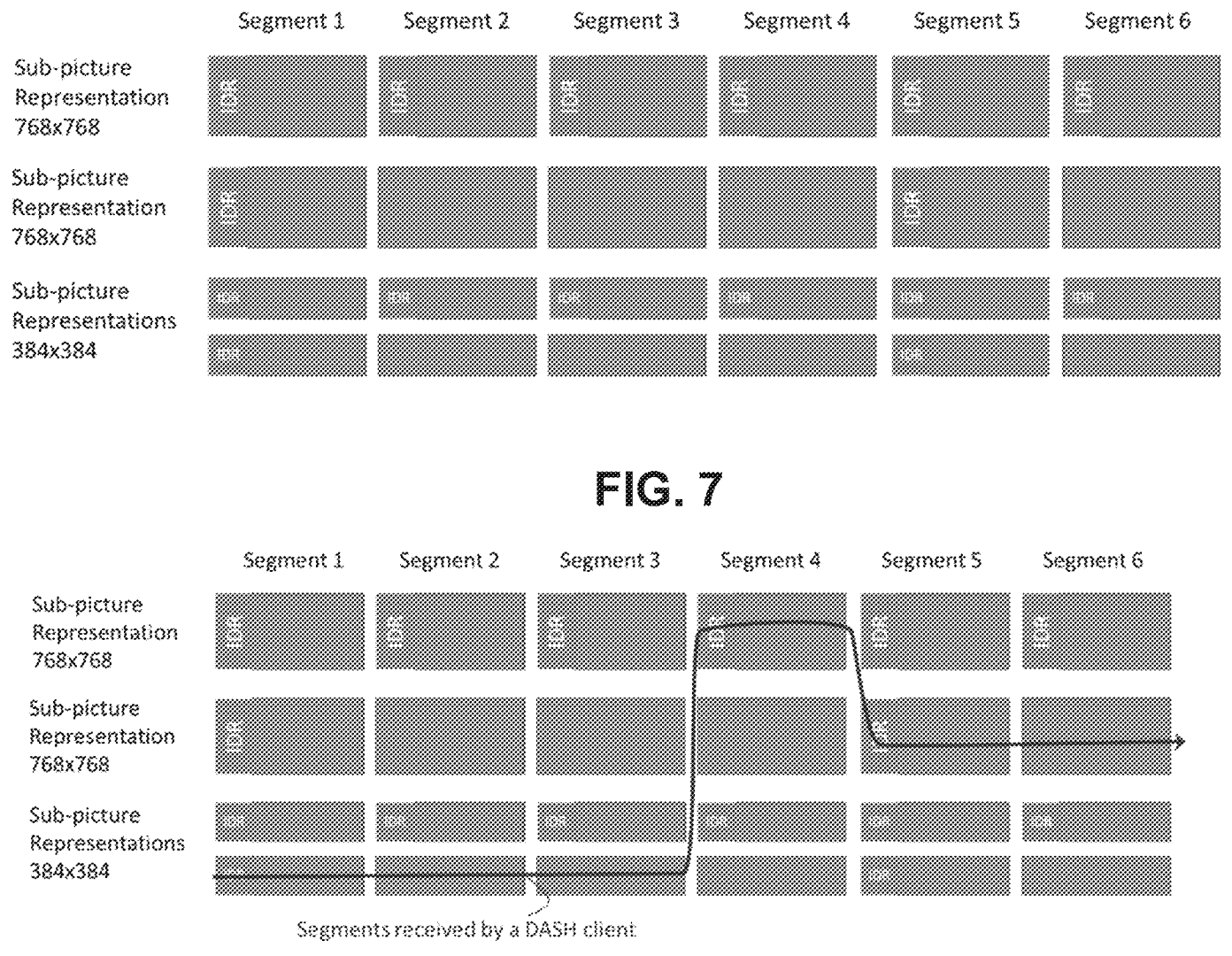

To provide a trade-off between the response time to react to viewing orientation changes and the rate-distortion performance when the viewing orientation is stable, multiple versions of the content can be coded at different IRAP intervals. This is illustrated in FIG. 7 for one set of collocated sub-picture Representations for encoding presented in FIG. 6 and discussed in more details in Section 3 of H. Chen, H. Yang, J. Chen, "Separate list for sub-block merge candidates," JVET-L0368, October 2018.

FIG. 7 shows examples of collocated sub-picture Representations of different IRAP intervals and different sizes.

FIG. 8 presents an example where a sub-picture location is firstly selected to be received at the lower resolution (384×384). A change in the viewing orientation causes a new selection of the sub-picture locations to be received at the higher resolution (768×768). In the example of FIG. 8, the segments received when a viewing orientation change causes a resolution change are at the start of Segment 4. In this example, the viewing orientation change occurs so that Segment 4 is received from the short-IRAP-interval sub-picture Representations. After that, the viewing orientation is stable and thus, the long-IRAP-interval version can be used starting from Segment 5 onwards.

Drawback of Updating all Sub-Picture Locations

Figure 9:
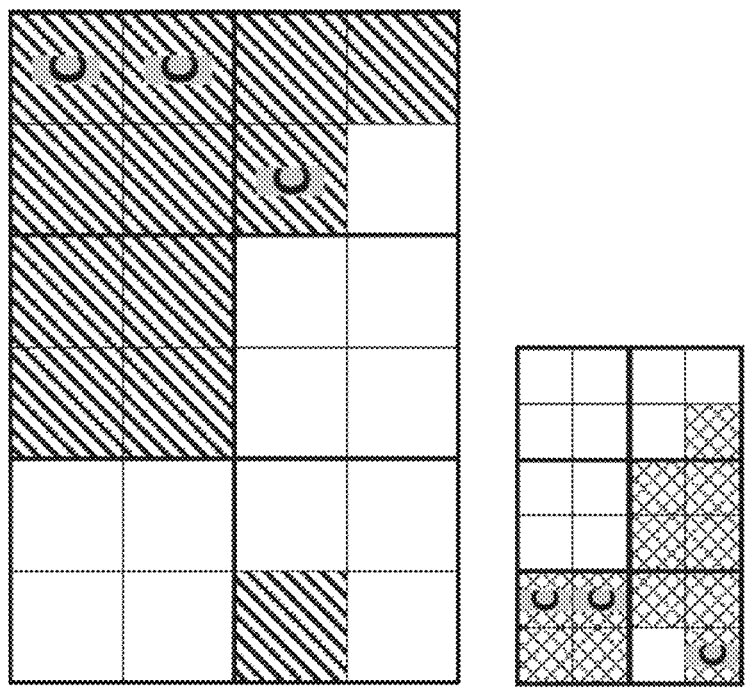
FIG. 9 illustrates an example of a viewing orientation change which is slightly upwards and towards the right cube face as compared to FIG. 6.

Since the viewing orientation moves gradually in typical viewing situations, the resolution changes in only a subset of the sub-picture locations in RWMR viewport-dependent streaming. FIG. 9 illustrates a viewing orientation change from FIG. 6 slightly upwards and towards the right cube face. Cube face partitions that have a different resolution as earlier are indicated with "C". It can be observed that the resolution changed in 6 out of 24 cube face partitions. However, as discussed above, Segments starting with an IRAP picture need to be received for all 24 cube face partitions in response to the viewing orientation change. Updating all sub-picture locations with Segments starting with an IRAP picture is inefficient in terms of streaming rate-distortion performance.

In addition, the ability to use open GOP prediction structures with sub-picture Representations of RWMR 360° streaming is desirable to improve rate-distortion performance and to avoid visible picture quality pumping caused by closed GOP prediction structures.

Proposed Design Examples

The following design goals are proposed:

1. The VVC design should allow merging of a sub-picture originating from a random-access picture and another sub-picture originating from a non-random-access picture into the same coded picture conforming to VVC.

2. The VVC design should enable the use of open GOP prediction structure in sub-picture representations without compromising from the fast and seamless representation switching capability between sub-picture representations of different properties, such as different spatial resolutions, while enabling merging of sub-picture representations into a single VVC bitstream.

Figure 10:
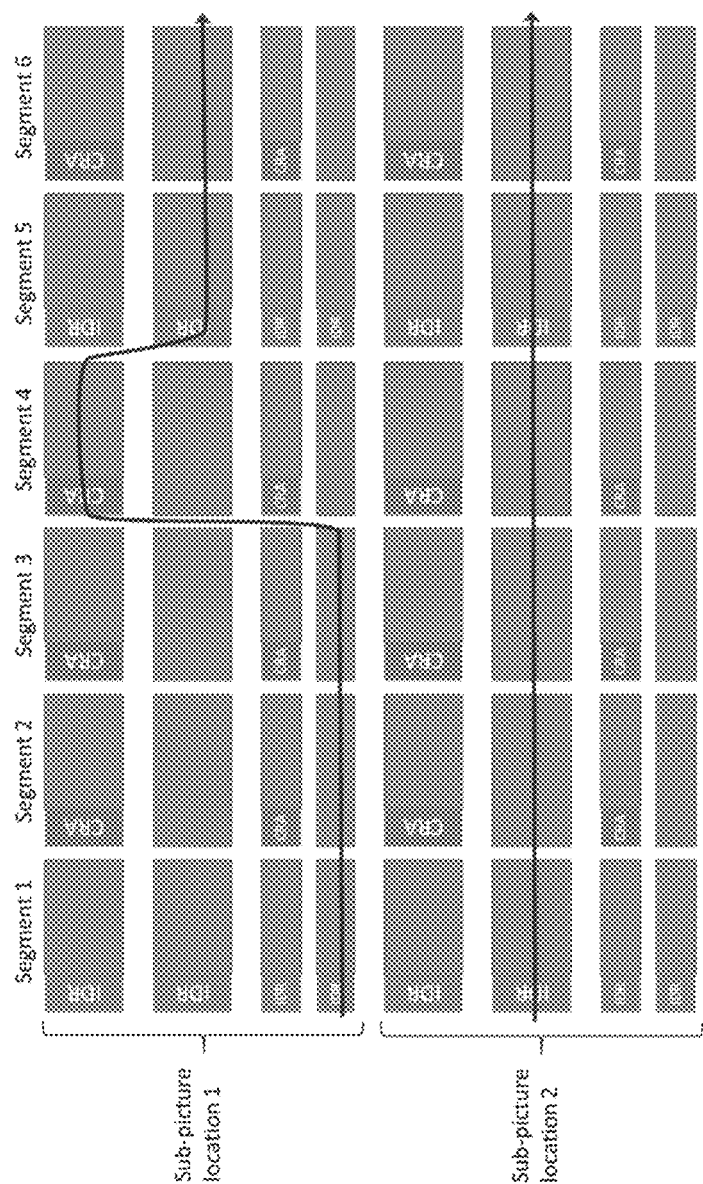
FIG. 10 shows an example of an implementation in which sub-picture representations for two sub-picture locations are presented.

The example of the design goals can be illustrated with FIG. 10, in which sub-picture Representations for two sub-picture locations are presented. For both sub-picture locations, a separate version of the content is coded for each combination among two resolutions and two random access intervals. Some of the Segments start with an open GOP prediction structure. A viewing orientation change causes the resolution of sub-picture location 1 to be switched at the start of Segment 4. Since Segment 4 starts with a CRA picture, which is associated with RASL pictures, those reference pictures of the RASL pictures that are in Segment 3 need to be resampled. It is remarked that this resampling applies to sub-picture location 1 while decoded sub-pictures of some other sub-picture locations are not resampled. In this example, the viewing orientation change does not cause changes in the resolution of sub-picture location 2 and thus decoded sub-pictures of sub-picture location 2 are not resampled. In the first picture of Segment 4, the Segment for sub-picture location 1 contains a sub-picture originating from a CRA picture, while the Segment for sub-picture location 2 contains a sub-picture originating from a non-random-access picture. It is suggested that merging of these sub-pictures into a coded picture is allowed in VVC.

2.2.2.2.3. Adaptive Resolution Change in Video Conferencing

JCTVC-F158 proposed adaptive resolution change mainly for video conferencing. The following sub-sections are copied from JCTVC-F158 and present the use cases where adaptive resolution change is asserted to be useful.

Seamless Network Adaption and Error Resilience

Applications such as video conferencing and streaming over packets networks frequently require that the encoded stream adapt to changing network conditions, especially when bit rates are too high and data is being lost. Such applications typically have a return channel allowing the encoder to detect the errors and perform adjustments. The encoder has two main tools at its disposal: bit rate reduction and changing the resolution, either temporal or spatial. Temporal resolution changes can be effectively achieved by coding using hierarchical prediction structures. However, for best quality spatial resolution changes are needed as well as part of a well-designed encoder for video communications.

Changing spatial resolution within AVC requires an IDR frame is sent and the stream is reset. This causes significant problems. An IDR frame at reasonable quality will be much larger than an Inter picture, and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This gives a poor user experience.

To minimize these problems, the IDR is typically sent at low quality, using a similar number of bits to a P frame, and it takes a significant time to return to full quality for the given resolution. To get low enough delay, the quality can be very low indeed and there is often a visible blurring before the image is "refocused". In effect, the Intra frame is doing very little useful work in compression terms: it is just a method of re-starting the stream.

So, there is a requirement for methods in HEVC which allow resolution to be changed, especially in challenging network conditions, with minimal impact on subjective experience.

Fast Start

It would be useful to have a "fast start" mode where the first frame is sent at reduced resolution and resolution is increased over the next few frames, in order to reduce delay and get to normal quality more quickly without unacceptable image blurring at the beginning.

Conference "Compose"

Video conferences also often have a feature whereby the person speaking is shown full-screen and other participants are shown in smaller resolution windows. To support this efficiently, often the smaller pictures are sent at lower resolution. This resolution is then increased when the participant becomes the speaker and is full-screened. Sending an intra frame at this point causes an unpleasant hiccup in the video stream. This effect can be quite noticeable and unpleasant if speakers alternate rapidly.

2.2.2.3. Proposed Design Goals

The following is high-level design choices are proposed for VVC version 1:

1. It is proposed to include a reference picture resampling process in VVC version 1 for the following use cases:

Usage of efficient prediction structures (e.g., so-called open groups of pictures) in adaptive streaming without compromising from the fast and seamless representation switching capability between representations of different properties, such as different spatial resolutions.

Adapting low-delay conversational video content to network conditions and application-originated resolution changes without significant delay or delay variation.

2. The VVC design is proposed to allow merging of a sub-picture originating from a random-access picture and another sub-picture originating from a non-random-access picture into the same coded picture conforming to VVC. This is asserted to enable efficient handling of viewing orientation changes in mixed-quality and mixed-resolution viewport-adaptive 360° streaming.

3. It is proposed to include sub-picture-wise resampling process in VVC version 1. This is asserted to enable efficient prediction structure for more efficient handling of viewing orientation changes in mixed-resolution viewport-adaptive 360° streaming.

2.2.3. JVET-N0048

The use cases and design goals for adaptive resolution changing (ARC) were discussed in detail in JVET-M 0259. A summary is provided below:

1. Real-Time Communication

The following use cases for adaptive resolution change were originally included in JCTVC-F158:

a. Seamless network adaption and error resilience (through dynamic adaptive resolution changes)

b. Fast start (gradual increase of resolution at session start or reset)

c. Conference "compose" (person speaking is given a higher resolution)

2. Adaptive Streaming

Section 5.13 ("Support for Adaptive Streaming") of MPEG N17074 includes the following requirement for VVC: The standard shall support fast representation switching in the case of adaptive streaming services that offer multiple representations of the same content, each having different properties (e.g., spatial resolution or sample bit depth). The standard shall enable the use of efficient prediction structures (e.g., so-called open groups of pictures) without compromising from the fast and seamless representation switching capability between representations of different properties, such as different spatial resolutions.

JVET-M 0259 discusses how to meet this requirement by resampling of reference pictures of leading pictures.

3. 360-Degree Viewport-Dependent Streaming

JVET-M 0259 discusses how to address this use case by resampling certain independently coded picture regions of reference pictures of leading pictures.

This contribution proposes an adaptive resolution coding approach, which is asserted to meet all the use cases and design goals above. 360-degree viewport-dependent streaming and conference "compose" uses cases are handled by this proposal together with JVET-N0045 (proposing independent sub-picture layers).

Proposed Specification Text

Double brackets are placed before and after the text deleted.

Signaling

TABLE 3

| sps_max_rpr | |
|---|---|
| | Descriptor |
| seq_parameter_set_rbsp( ) { ... sps_max_rpr ... | ue(v) | sps_max_rpr specifies the maximum number of active reference pictures in reference picture list 0 or 1 for any tile group in the coded video sequence (CVS) that have pic_a-width_in_luma_samples and pic_height_in_luma_samples not equal to pic_width_in_luma_samples and pic_height_in_luma_samples, respectively, of the current picture.

Tables 4 and 5: Picture Width and Height

| | Descriptor |
|---|---|
| seq_parameter_set_rbsp( ) { | |
| ... | |
| [[pic_width_in_luma_samples | ue(v) |
| pic_height_in_luma_samples | ue(v)]] |
| max_width_in_luma_samples | ue(v) |
| max_height_in_luma_samples | ue(v) |
| ... | ue(v) |

| | Descriptor |
|---|---|
| pic_parameter_set_rbsp( ) { | |
| pps_pic_parameter_set_id | ue(v) |
| pps_seq_parameter_set_id | ue(v) |
| pic_width_in_luma_samples | ue(v) |
| pic_height_in_luma_samples | ue(v) |
| ... | | max_width_in_luma_samples specifies that it is a requirement of bitstream conformance that pic_width_in_luma_samples in any active PPS for any picture of a CVS for which this SPS is active is less than or equal to max_width_in_luma_samples.

max_height_in_luma_samples specifies that it is a requirement of bitstream conformance that pic_height_in_luma_samples in any active PPS for any picture of a CVS for which this SPS is active is less than or equal to max_height_in_luma_samples.

High-Level Decoding Process

The decoding process operates as follows for the current picture CurrPic:

1. The decoding of Network Abstraction Layer (NAL) units is specified in clause 8.2.

2. The processes in clause 8.3 specify the following decoding processes using syntax elements in the tile group header layer and above:

Variables and functions relating to picture order count are derived as specified in clause 8.3.1. This needs to be invoked only for the first tile group of a picture.

At the beginning of the decoding process for each tile group of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference". This needs to be invoked only for the first tile group of a picture.

For each active reference picture in RefPicList[0] and RefPicList[1] that has pic_width_in_luma_samples or pic_height_in_luma_samples not equal to pic_width_in_luma_samples or pic_height_in_luma_samples, respectively, of CurrPic, the following applies:

The resampling process in clause H. 8.1.4.2 X.Y.Z is invoked with the output having the same reference picture marking and picture order count as the input.

The reference picture used as input to the resampling process is marked as "unused for reference".

The invocation of the decoding processes for coding tree units, scaling, transform, in-loop filtering, etc. can be further discussed.

After all tile groups of the current picture have been decoded, the current decoded picture is marked as "used for short-term reference".

Resampling Process

Scalable High efficiency Video Coding (SHVC) resampling process (HEVC clause H. 8.1.4.2) is proposed with the following additions:

. . .

If sps_ref_wraparound_enabled_flag is equal to 0, the sample value tempArray[n] with n=0 . . . 7, is derived as follows:

$$\begin{aligned}\text{tempArray}[n] = &(f_L[x\text{Phase},0]*rl\text{PicSample}_L[\text{Clip3}(0,\\ &\text{ref}W-1,x\text{Ref}-3),y\text{PosRL}]+f_L[x\text{Phase},1]*\\ &rl\text{PicSample}_L[\text{Clip3}(0,\text{ref}W-1,x\text{Ref}-2),y\text{PosRL}]+\\ &f_L[x\text{Phase},2]*rl\text{PicSample}_L[\text{Clip3}(0,\text{ref}W-1,\\ &x\text{Ref}-1),y\text{PosRL}]+f_L[x\text{Phase},3]*rl\text{PicSample}_L\\ &[\text{Clip3}(0,\text{ref}W-1,x\text{Ref}),y\text{PosRL}]+\\ &f_L[x\text{Phase},4]*rl\text{PicSample}_L[\text{Clip3}(0,\text{ref}W-1,\\ &x\text{Ref}+1),y\text{PosRL}]+f_L[x\text{Phase},5]*rl\text{PicSample}_L\\ &[\text{Clip3}(0,\text{ref}W-1,x\text{Ref}+2),y\text{PosRL}]+\\ &f_L[x\text{Phase},6]*rl\text{PicSample}_L[\text{Clip3}(0,\text{ref}W-1,\\ &x\text{Ref}+3),y\text{PosRL}]+f_L[x\text{Phase},7]*rl\text{PicSample}_L\\ &[\text{Clip3}(0,\text{ref}W-1,x\text{Ref}+4),y\text{PosRL}])>>\text{shift1}\end{aligned}$$ (H-38)

Otherwise, the sample value tempArray[n] with n=0 . . . 7, is derived as follows: refOffset=(sps_ref_wraparound_offset_minus1+1)*MinCbSizeY $$\begin{aligned}\text{tempArray}[n] = &(f_L[x\text{Phase},0]*rl\text{PicSample}_L[\text{Clip}H\\ &(\text{refOffset},\text{ref}W,x\text{Ref}-3),y\text{PosRL}]+\\ &f_L[x\text{Phase},1]*rl\text{PicSample}_L[\text{Clip}H(\text{refOffset},\text{ref}W,\\ &x\text{Ref}-2),y\text{PosRL}]+f_L[x\text{Phase},2]*rl\text{PicSample}_L\\ &[\text{Clip}H(\text{refOffset},\text{ref}W,x\text{Ref}-1),y\text{PosRL}]+f_L\\ &[x\text{Phase},3]*rl\text{PicSample}_L[\text{Clip}H(\text{refOffset},\text{ref}W,\\ &x\text{Ref}),y\text{PosRL}]+f_L[x\text{Phase},4]*rl\text{PicSample}_L\\ &[\text{Clip}H(\text{refOffset},\text{ref}W,x\text{Ref}+1),y\text{PosRL}]+f_L\\ &[x\text{Phase},5]*rl\text{PicSample}_L[\text{Clip}H(\text{refOffset},\text{ref}W,\\ &x\text{Ref}+2),y\text{PosRL}]+f_L[x\text{Phase},6]*rl\text{PicSample}_L\\ &[\text{Clip}H(\text{refOffset},\text{ref}W,x\text{Ref}+3),y\text{PosRL}]+f_L\end{aligned}$$

[xPhase,7]*rlPicSample$_L$[Clip$H$(refOffset,ref$W$,
xRef+4),yPos$RL$])>>shift1

...

If sps_ref_wraparound_enabled_flag is equal to 0, the sample value tempArray[n] with n=0.3, is derived as follows:

tempArray[$n$]=($f_C$[xPhase,0]*rlPicSample$_C$[Clip3(0,
ref$WC$−1,xRef−1),yPos$RL$]+
$f_C$[xPhase,1]*rlPicSample$_C$[Clip3(0,ref$WC$−1,
xRef),yPos$RL$]+$f_C$[xPhase,2]*rlPicSample$_C$
[Clip3(0,ref$WC$−1,xRef+1),yPos$RL$]+$f_C$[xPhase,
3]*rlPicSample$_C$[Clip3(0,ref$WC$−1,xRef+2),
yPos$RL$])>>shift1     (H-50)

Otherwise, the sample value tempArray[n] with n=0.3, is derived as follows:

refOffset=(sps_ref_wraparound_offset_
minus1+1)*Min$CbSizeY$/SubWidth$C$ tempArray[$n$]=($f_C$[xPhase,0]*rlPicSample$_C$[Clip$H$(refOffset,ref$WC$,xRef−1),yPos$RL$]+
$f_C$[xPhase,1]*rlPicSample$_C$[Clip$H$(refOffset,
ref$WC$,xRef),yPos$RL$]+$f_C$[xPhase,2]*rlPicSample$_C$[Clip$H$(refOffset,ref$WC$,xRef+1),yPos$RL$]+$f_C$
[xPhase,3]*rlPicSample$_C$[Clip$H$(refOffset,
ref$WC$,xRef+2),yPos$RL$])>>shift1

2.2.4. JVET-N0052

Adaptive resolution change, as a concept in video compression standards, has been around since at least 1996; in particular H. 263+ related proposals towards reference picture resampling (RPR, Annex P) and Reduced Resolution Update (Annex Q). It has recently gained a certain prominence, first with proposals by Cisco during the JCT-VC time, then in the context of VP 9 (where it is moderately widely deployed nowadays), and more recently in the context of VVC. ARC allows reducing the number of samples required to be coded for a given picture, and upsampling the resulting reference picture to a higher resolution when such is desirable.

ARC of particular interest is considered in two scenarios:

1) Intra coded pictures, such as IDR pictures are often considerably larger than inter pictures. Downsampling pictures intended to be intra coded, regardless of reason, may provide a better input for future prediction. It's also clearly advantageous from a rate control viewpoint, at least in low delay applications.

2) When operating the codec near its breaking point, as at least some cable and satellite operators routinely seem to do, ARC may become handy even for non-intra coded pictures, such as in scene transitions without a hard transition point.

3) Looking perhaps a bit too much forward: is the concept of a fixed resolution generally defensible? With the departure of cathode ray tubes (CRTs) and the ubiquity of scaling engines in rendering devices, the hard bind between rendering and coding resolution is a thing of the past. Also, it is noted that there is certain research available that suggests that most people are not able to concentrate on fine details (associated perhaps with high resolution) when there is a lot of activity going on in the video sequence, even if that activity is elsewhere spatially. If that were true and generally accepted, fine granularity resolution changes may be a better rate control mechanism than adaptive quantization parameter (QP). This point is now for discussion. Doing away with the concept of fixed resolution bitstreams has a myriad of system layer and implementation implications, which (at least at the level of their existence, if not their detailed nature) are well aware of.

Technically, ARC can be implemented as reference picture resampling. Implementing reference picture resampling has two major aspects: the resampling filters, and the signaling of the resampling information in the bitstream. This disclosure focusses on the latter and touches the former to the extent there is an implementation experience. More study of suitable filter design is encouraged, and Tencent will carefully consider and, when appropriate, support any proposals in that regard that substantially improve the strawman design provided.

Overview of Tencent's ARC Implementation

Figure 11:
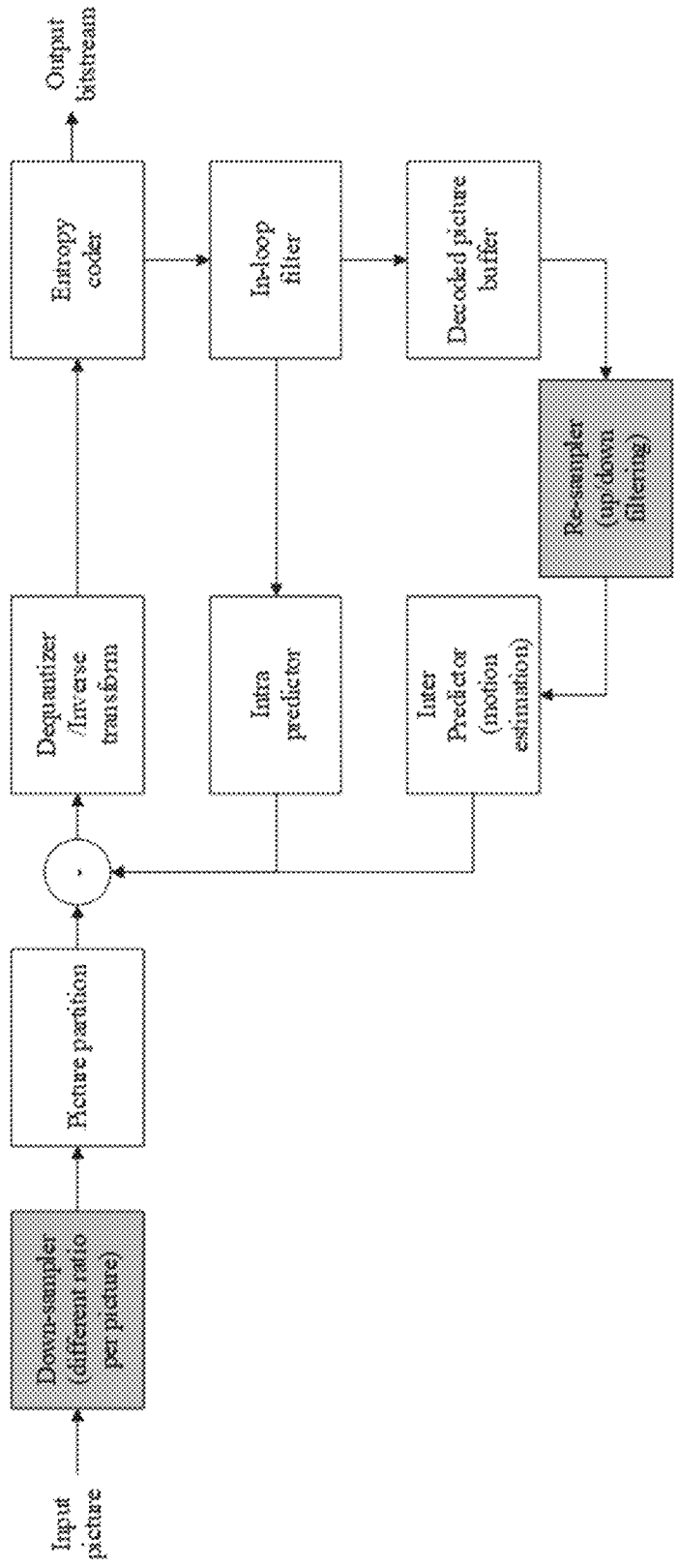
FIGS. 11 and 12 illustrate adaptive resolution change (ARC) encoder and decoder implementations, respectively.
Figure 12:
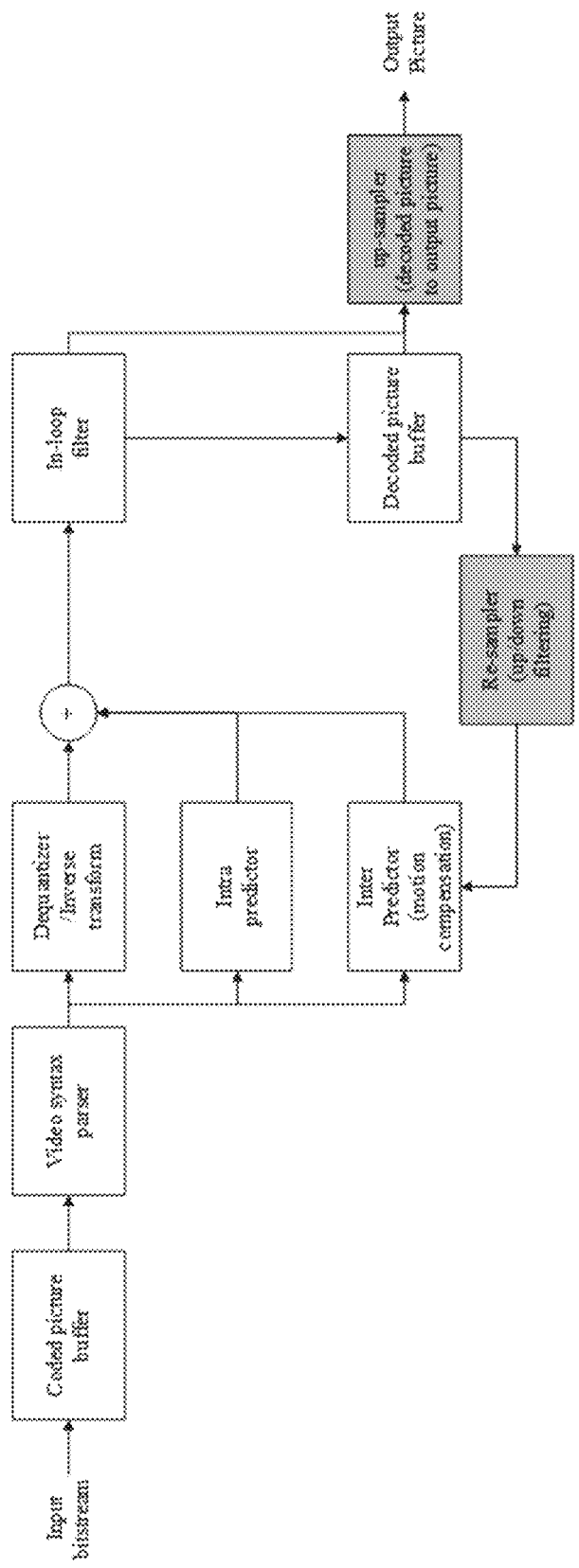

FIGS. 11 and 12 illustrate Tencent's ARC encoder and decoder implementations, respectively. Implementations of the disclosed technology enable to change the picture width and height, on a per picture granularity irrespective of the picture type. At the encoder, the input image data is downsampled to the selected picture size for the current picture encoding. After the first input picture is encoded as intra-picture, the decoded picture is stored in the decoded picture buffer (DPB). When the consequent picture is downsampled with a different sampling ratio and encoded as inter-picture, the reference picture(s) in the DPB is/are up-/down-scaled according the spatial ratio between the picture size of the reference and the current picture size. At the decoder, the decoded picture is stored in the DPB without resampling. However, the reference picture in the DPB is up-/down-scaled in relation to the spatial ratio between the currently decoded picture and the reference, when used for motion compensation. The decoded picture is up-sampled to the original picture size or the desired output picture size when bumped out for display. In motion estimation/compensation process, motion vectors are scaled in relation to picture size ratio as well as picture order count difference.

Signaling of ARC Parameters

The term, ARC parameters, is used herein as a combination of any parameters required to make ARC work. In the easiest case, that could be a zoom factor, or an index into a table with defined zoom factors. It could be a target resolution (for example in sample or max CU size granularity), or an index into a table providing a target resolution, like what was proposed in JVET-M 0135. Also included would be filter selectors or even filter parameters (all the way up to filter coefficients) of the up/down-sampling filters in use.

From the outset, the implementations proposed herein are to allow, at least conceptually, different ARC parameters for different parts of a picture. It is proposed that the appropriate syntax structure as per the current VVC draft would be a rectangular tile group (TG). Those using scan-order TGs would be restricted to use ARC only to a full picture, or to the extent scan order TGs are included in a rectangular TG. That can easily be specified by a bitstream constraint.

As different TGs may have different ARC parameters, the appropriate place for ARC parameters would be either in the TG header or in a parameter set with the scope of a TG, and referenced by the TG header—the Adaptation Parameter Set in the current VVC draft, or a more detailed reference (an index) into a table in a higher parameter set. Of these three choices, it is proposed, at this point, to use the TG header to code a reference to a table entry including the ARC parameters, and that table be located in the SPS, with maximum table values coded in the (forthcoming) decoding parameter set (DPS). A zoom factor can be directly coded into the TG header, without using any parameter set values. The use of the PPS for the reference, as proposed in JVET-M 0135, is counter-indicated if the per tile group signaling of ARC parameters is a design criterion.

As for the table entries themselves, the following options are available:

coding down-sample factors, either one for both dimension or independently in X and Y dimension? That's mostly a (HW-) implementation discussion, and some would perhaps prefer an outcome where the zoom factor in X dimension is fairly flexible, but in Y dimension is fixed to 1, or has very few choices. It is suggested that the syntax is the wrong place for expressing such constraints and, if they were desirable, the constraints expressed as requirements for conformance are preferred. In other words, keep the syntax flexible.

Coding target resolutions are proposed below. There could be more or less complex constraints about those resolutions in relation to the current resolution, expressed perhaps in bitstream conformance requirements.

Down-sampling per tile group is preferred to allow for picture composition/extraction. However, it is not critical from a signaling viewpoint. If the group were making the unwise decision of allowing ARC only at picture granularity, a requirement for bitstream conformance that all TGs use the same ARC parameters can be included.

Control information related to ARC. In our design below, that includes the reference picture size.

Flexibility in filter design is needed? Anything bigger than a handful of codepoints? If yes, put those into adaptation parameter set (APS)? In some implementations, if down-sample filter changes and adaptive loop filter (ALF) stays, it is proposed that bitstream has to eat the overhead.

For now, in order to keep proposed technology aligned and simple (to the extent possible), the following is proposed:

Fixed filter design

Target resolutions in a table in the SPS, with bitstream constraints to be decided (TBD).

Minimum/Maximum target resolution in DPS to facilitate cap exchange/negotiation.

The resulting syntax could look as follows:

TABLE 6

Decoder parameter set RBSP syntax

| | Descriptor |
|---|---|
| dec_parameter_set_rbsp( ) { | |
| ... | |
| max_pic_width_in_luma_samples | ue(v) |
| max_pic_height_in_luma_samples | ue(v) |
| ... | |
| } | | max pic_width_in_luma_samples specifies the maximum width of decoded pictures in units of luma samples in the bitstream. max_pic_width_in_luma_samples shall not be equal to 0 and shall be an integer multiple of MinCbSizeY. The value of dec_pic_width_in_luma_samples[i] cannot be greater than the value of max_pic_width_in_luma_samples.

max pic_height_in_luma_samples specifies the maximum height of decoded pictures in units of luma samples. max_pic_height_in_luma_samples shall not be equal to 0 and shall be an integer multiple of MinCbSizeY. The value of dec_pic_height_in_luma_samples[i] cannot be greater than the value of max_pic_height_in_luma_samples.

TABLE 7

Sequence parameter set RBSP syntax

| | Descriptor |
|---|---|
| seq_parameter_set_rbsp( ) { | |
| ... | |
| adaptive_pic_resolution_change_flag | u(1) |
| if(adaptive_pic_resolution_change_flag) { | |
| output_pic_width_in_luma_samples | ue(v) |
| output_pic_height_in_luma_samples | ue(v) |
| reference_pic_size_present_flag | u(1) |
| if(reference_pic_size_present_flag) | |
| { | |
| reference_pic_width_in_luma_samples | ue(v) |
| reference_pic_height_in_luma_samples | ue(v) |
| } | |
| num_dec_pic_size_in_luma_samples_minus1 | ue(v) |
| for( i = 0; i <= | |
| num_dec_pic_size_in_luma_samples_minus1; i++ ) | |
| { | |
| dec_pic_width_in_luma_samples[ i ] | ue(v) |
| dec_pic_height_in_luma_samples[ i ] | ue(v) |
| } | |
| } | |
| else { | |
| pic_width_in_luma_samples | ue(v) |
| pic_height_in_luma_samples | ue(v) |
| } | |
| ... | |
| } | | adaptive_pic_resolution_change_flag equal to 1 specifies that an output picture size (output_pic_width_in_luma_samples, output_pic_height_in_luma_samples), an indication of the number of decoded picture sizes (num_dec_pic_size_in_luma_samples_minus1) and at least one decoded picture size (dec_pic_width_in_luma_samples[i], dec_pic_height_in_luma_samples[i]) are present in the SPS. A reference picture size (reference_pic_width_in_luma_samples, reference_pic_height_in_luma_samples) is present conditioned on the value of reference_pic_size_present_flag.

output_pic_width_in_luma_samples specifies the width of the output picture in units of luma samples. output_pic_width_in_luma_samples shall not be equal to 0.

output_pic_height_in_luma_samples specifies the height of the output picture in units of luma samples. output_pic_height_in_luma_samples shall not be equal to 0.

reference_pic_size_present_flag equal 1 specifies that reference_pic_width_in_luma_samples and reference_pic_height_in_luma_samples are present.

reference_pic_width_in_luma_samples specifies the width of the reference picture in units of luma samples. output_pic_width_in_luma_samples shall not be equal to 0. If not present, the value of reference_pic_width_in_luma_samples is inferred to be equal to dec_pic_width_in_luma_samples[i].

reference_pic_height_in_luma_samples specifies the height of the reference picture in units of luma samples. output_pic_height_in_luma_samples shall not be equal to 0. If not present, the value of reference_pic_height_in_luma_samples is inferred to be equal to dec_pic_height_in_luma_samples[i].

NOTE1—The size of the output picture shall be equal to the values of output_pic_width_in_luma_samples and output_pic_height_in_luma_samples. The size of the reference picture shall be equal to the values of reference_pic_width_in_luma_samples and pic_height_in_luma_samples, when the reference picture is used for motion compensation.

num_dec_pic_size_in_luma_samples_minus1 plus 1 specifies the number of the decoded picture size (dec_pic_width_in_luma_samples[i], dec_pic_height_in_luma_samples[i]) in units of luma samples in the coded video sequence.

dec pic_width_in_luma_samples[i] specifies the i-th width of the decoded picture sizes in units of luma samples in the coded video sequence. dec_pic_width_in_luma_samples[i] shall not be equal to 0 and shall be an integer multiple of MinCbSizeY.

dec pic_height_in_luma_samples[i] specifies the i-th height of the decoded picture sizes in units of luma samples in the coded video sequence. dec_pic_height_in_luma_samples[i] shall not be equal to 0 and shall be an integer multiple of MinCbSizeY.

NOTE2—The i-th decoded picture size (dec_pic_width_in_luma_samples[i], dec_pic_height_in_luma_samples[i]) may be equal to the decoded picture size of the decoded picture in the coded video sequence.

TABLE 8

| Tile group header syntax | |
|---|---|
| | Descriptor |
| tile_group_header( ) { <br> ... <br>   if(adaptive_pic_resolution_change_flag) { <br>     dec_pic_size_idx <br>   } <br> ... <br> } | <br><br><br>ue(v) | dec pic_size_idx specifies that the width of the decoded picture shall be equal to pic_width_in_luma_samples [dec_pic_size_idx] and the height of the decoded picture shall be equal to pic_height_in_luma_samples[dec_pic_size_idx].

Filters

The proposed design conceptually includes four different filter sets: down-sampling filter from the original picture to the input picture, up-/down-sampling filters to rescale reference pictures for motion estimation/compensation, and up-sampling filter from the decoded picture to the output picture. The first and last ones can be left as non-normative matters. In the scope of specification, up-/down-sampling filters need to be explicitly signaled in an appropriate parameter set, or pre-defined.

Our implementation uses the down-sampling filters of SHVC (SHM ver. 12.4), which is a 12-tap and two dimensional (2D) separable filter, for down-sampling to resize the reference picture to be used for motion compensation. In the current implementation, only dyadic sampling is supported. Therefore, the phase of the down-sampling filter is set equal to zero by default. For up-sampling, 8-tap interpolation filters are used, with 16-phases, to shift the phase and align the luma and chroma pixel positions to the original positions.

Tables 9 and 10 provide the 8-tap filter coefficients fL[p, x] with p=0 . . . 15 and x=0 . . . 7 used for the luma up-sampling process, and the 4-tap filter coefficients fC[p, x] with p=0 . . . 15 and x=0.3 used for the chroma up-sampling process.

Table 11 provides the 12-tap filter coefficients for down-sampling process. The same filter coefficients are used for both luma and chroma for down-sampling.

TABLE 9

Luma up-sampling filter with 16 phases

| | Interpolation filter coefficients | | | | | | | |
|---|---|---|---|---|---|---|---|---|
| Phase p | fL[p, 0] | fL[p, 1] | fL[p, 2] | fL[p, 3] | fL[p, 4] | fL[p, 5] | fL[p, 6] | fL[p, 7] |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 10

Chroma up-sampling filter with 16 phases

| Phase p | Interpolation filter coefficients | | | |
|---|---|---|---|---|
| | fC[p, 0] | fC[p, 1] | fC[p, 2] | fC[p, 3] |
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

TABLE 11

Down-sampling filter coefficient for luma and chroma

| Phase p | Down-sampling filter coefficients | | | | | | | | | | | |
|---|---|---|---|---|---|---|---|---|---|---|---|---|
| | f[p, 0] | f[p, 1] | f[p, 2] | f[p, 3] | f[p, 4] | f[p, 5] | f[p, 6] | f[p, 7] | f[p, 8] | f[p, 9] | f[p, 10] | f[p, 11] |
| 0 | 1 | −6 | −5 | 7 | 26 | 41 | 41 | 26 | 7 | −5 | −6 | 1 |

It is anticipated that (perhaps significant) subjective and objective gains can be expected when using filters adaptive to content and/or to scaling factors.

Tile Group Boundary Discussions

As it is perhaps true with a lot of tile group related work, our implementation is not quite finished with respect to tile group (TG) based ARC. Our preference is to revisit that implementation once the discussion of spatial composition and extraction, in the compressed domain, of multiple sub-pictures into a composed picture has yielded at least a working draft. That, however, does not prevent from extrapolating the outcome to some extent, and to adapt our signaling design accordingly.

For now, the tile group header is the correct place for something like dec_pic_size_idx as proposed above, for reasons already stated. A single ue(v) codepoint dec_pic_size_idx, conditionally present in the tile group header, is used to indicate the employed ARC parameters. In order to match the implementation which is ARC per picture only, in spec-space, it is needed to code a single tile group only, or to make it a condition of bitstream compliance that all TG headers of a given coded picture have the same value of dec_pic_size_idx (when present).

The parameter dec_pic_size_idx can be moved into whatever header that starts a sub-picture. It may continue to be a tile group header.

Beyond these syntactical considerations, some additional work is needed to enable tile group or sub-picture based ARC. The perhaps most difficult part is how to address the issue of unneeded samples in a picture where a sub-picture has been resampled to a lower size.

Figure 13:
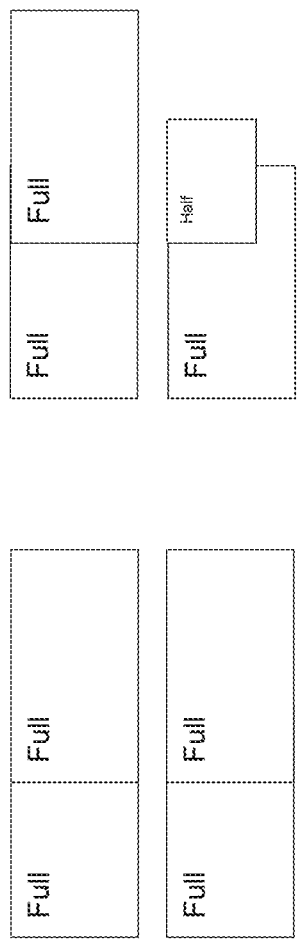
FIG. 13 shows an example of tile group-based resampling for ARC.

FIG. 13 shows an example of tile group-based resampling for ARC. Consider the right picture, which is made up of four sub-pictures (expressed perhaps as four rectangular tile groups in the bitstream syntax). To the left, the bottom right TG is subsampled to half the size. It needs to be discussed what to do with the samples outside the relevant area, marked as "Half".

Many (most? all?) previous video coding standards had in common that spatial extraction of parts of a picture in the compressed domain was not supported. That implied that each sample of a picture is represented by one or more syntax elements, and each syntax elements impacts at least one sample. To keep that up, it may be needed to populate the area around the samples covered by the downsampled TG labelled "Half" somehow. H. 263+ Annex P solved that problem by padding; in fact, the sample values of the padded samples could be signaled in the bitstream (within certain strict limits).

An alternative that would perhaps constitute a significant departure from previous assumptions but may be needed in any case to support sub-bitstream extraction (and composition) based on rectangular parts of a picture, would be to relax the current understanding that each sample of a reconstructed picture needs to be represented by something in the coded picture (even if that something is only a skipped block).

Implementation Considerations, System Implications and Profiles/Levels

The basic ARC to be included in the "baseline/main" profiles is proposed. Sub-profiling may be used to remove them if not needed for certain application scenarios. Certain restrictions may be acceptable. In that regard, it is noted that certain H. 263+ profiles and "recommended modes" (which pre-dated profiles) included a restriction for Annex P to be used only as "implicit factor of 4", i.e., dyadic downsampling in both dimensions. That was enough to support fast start (get the I frame over quickly) in video conferencing.

The design is such that all filtering can be done "on the fly" and that there is no, or only negligible, increases in memory bandwidth. Insofar, it doesn't seem there is a need to punt ARC into exotic profiles.

Complex tables and such may not be meaningfully used in capability exchange, as it was argued in Marrakech in conjunction with JVET-M 0135. The number of options is simply to big to allow for meaningful cross-vendor interop, assuming offer-answer and similar limited-depth handshakes. Insofar, realistically, to support ARC in a meaningful way in a capability exchange scenario, we have to fallback to a handful, at most interop points. For example: no ARC, ARC with implicit factor of 4, full ARC. As an alternative, it is possible to spec the required support for all ARC and leave the restrictions in bitstream complexity to higher level standards development organizations (SDOs). That's a strategic discussion to be done at some point anyway (beyond what already discussed in the sub-profiling and flags context).

As for levels: The basic design principle needs to be that, as a condition of bitstream conformance, the sample count of an upsampled pictures needs to fit into level of bitstream no matter how much upsampling is signaled in bitstream, and that all samples need to fit into the upsampled coded picture. It is noted that this was not the case in H263+; there, it was possible that certain samples were not present.

2.2.5. JVET-N0118

The following aspects are proposed:

1. A list of picture resolutions is signalled in the SPS, and an index to the list is signalled in the PPS to specify the size of an individual picture.

2. For any picture that is to be outputted, the decoded picture before resampling is cropped (as necessary) and outputted, i.e., a resampled picture is not for output, only for inter prediction reference.

3. Support 1.5× and 2× resampling ratios. No support of arbitrary resampling ratio. Further study the need of one or two more other resampling ratios.

4. Between picture-level resampling and block-level resampling, the proponents prefer block-level resampling.
   a. However, if picture-level resampling is chosen, the following aspects are proposed:
      i. When a reference picture is resampled, both the resampled version and the original, resampled version of the reference picture are stored in the DPB, and thus both would affect the DPB fullness.
      ii. A resampled reference picture is marked as "unused for reference" when the corresponding un-resampled reference picture is marked as "unused for reference".
      iii. The reference picture list (RPL) signalling syntax is kept unchanged, while the RPL construction process is modified as follows: When a reference picture needs to be included into a RPL entry, and a version of that reference picture with the same resolution as the current picture is not in the DPB, the picture resampling process is invoked and the resampled version of that reference picture is included into the RPL entry.
      iv. The number of resampled reference pictures that may be present in the DPB should be limited, e.g., to be less than or equal to 2.
   b. Otherwise (block-level resampling is chosen), the following are suggested:
      i. To limit the worst-case decoder complexity, it is proposed that bi-prediction of a block from a reference picture with a different resolution than the current picture is disallowed.
      ii. Another option is that, when resampling and quarter-pel interpolation need to be done, the two filters are combined and the operation is applied at once.

5. Regardless of which of the picture-based and block-based resampling approaches is chosen, it is proposed that temporal motion vector scaling is applied as needed.

2.2.5.1. Implementation

The ARC software was implemented on top of VVC test model (VTM)-4.0.1, with the following changes:

A list of supported resolutions is signalled in SPS.

The spatial resolution signalling was moved from SPS to PPS.

A picture-based resampling scheme was implemented for resampling reference pictures. After a picture is decoded, the reconstructed picture may be resampled to a different spatial resolution. The original reconstructed picture and the resampled reconstructed picture are both stored in the DPB and are available for reference by future pictures in decoding order.

The implemented resampling filters are based on the filters tested in JCTVC-H0234, as follows:

The up-sampling filter: 4-tap+/-quarter-phase DCTIF with taps (−4, 54, 16, −2)/64

The down-sampling filter: the h 11 filter with taps (1, 0, −3, 0, 10, 16, 10, 0, −3, 0, 1)/32

When constructing the reference picture lists of the current picture (i.e., L0 and L1), only the reference pictures with the same resolution as the current picture are used. Note that the reference pictures may be available in both their original sizes or the resampled sizes.

TMVP and ATVMP may be enabled; however, when the original coding resolutions of the current picture and a reference picture are different, TMVP and ATMVP are disabled for that reference picture.

For convenience and simplicity of the starting-point software implementation, when outputting a picture, the decoder outputs the highest available resolution.

On Signaling of Picture Sizes and Picture Output

1. On the List of Spatial Resolutions of Coded Pictures in the Bitstream

Currently all coded pictures in a CVS have the same resolution. Thus, it is straightforward to signal just one resolution (i.e., picture width and height) in the SPS. With ARC support, instead of one resolution, a list of picture resolutions needs to be signaled. It is proposed that this list is signaled in the SPS, and an index to the list is signaled in the PPS to specify the size of an individual picture.

2. On Picture Output

It is proposed that, for any picture that is to be outputted, the decoded picture before resampling is cropped (as necessary) and outputted, i.e., a resampled picture is not for output, only for inter prediction reference. The ARC resampling filters needs to be designed to optimize the use of the resampled pictures for inter prediction, and such filters may not be optimal for picture outputting/displaying purpose, while video terminal devices usually have optimized output zooming/scaling functionalities already implemented.

2.2.5.3. On Resampling

Resampling of a decoded picture can be either picture-based or block-based. For the final ARC design in VVC, block-based resampling is preferred over picture-based resampling. It is recommended that these two approaches are discussed and the JVET makes a decision on which of these two is to be specified for ARC support in VVC.

Picture-Based Resampling

In picture-based resampling for ARC, a picture is resampled only once for a particular resolution, which is then stored in the DPB, while the un-resampled version of the same picture is also kept in the DPB.

Employing picture-based resampling for ARC has two issues: 1) additional DPB buffer is required for storing resampled reference pictures, and 2) additional memory bandwidth is required since due to increased operations of reading reference picture data from the DPB and writing reference picture data into the DPB.

Keeping only one version of a reference picture in the DPB would not be a good idea for picture-based resampling. If only the un-resampled version is kept, a reference picture may need to be resampled multiple times since multiple pictures may refer to the same reference picture, and. On the other hand, if a reference picture is resampled and the resampled version only is kept, then inverse resampling needs to be applied when the reference picture needs to be outputted, since it's better to output un-resampled pictures, as discussed above. This is a problem since resampling process is not a lossless operation. Take a picture A and downsample it then upsample it to get A' with the same resolution as A, A and A' would not be the same; A' would contain less information than A since some high frequency information has been lost during the downsampling and upsampling processes.

To deal with the issues of additional DPB buffer and memory bandwidth, it is proposed that, if the ARC design in VVC uses picture-based resampling, the following applies:

1. When a reference picture is resampled, both the resampled version and the original, resampled version of the reference picture are stored in the DPB, and thus both would affect the DPB fullness.

2. A resampled reference picture is marked as "unused for reference" when the corresponding un-resampled reference picture is marked as "unused for reference".

3. The reference picture lists (RPLs) of each tile group contain reference pictures that have the same resolution as the current picture. While there is no need for a change to the RPL signalling syntax, the RPL construction process is modified to ensure what is said in the previous sentence, as follows: When a reference picture needs to be included into a RPL entry while a version of that reference picture with the same resolution as the current picture is not yet available, the picture resampling process is invoked and the resampled version of that reference picture is included.

4. The number of resampled reference pictures that may be present in the DPB should be limited, e.g., to be less than or equal to 2.

Furthermore, to enable temporal MV usage (e.g., merge mode and ATMVP) for the case that the temporal MV comes from the reference frame with different resolution than the current one, it is proposed that, scaling temporal MV to the current resolution as needed.

Block-Based ARC Resampling

In block-based resampling for ARC, a reference block is resampled whenever needed, and no resampled picture is stored in the DPB.

The main issue here is the additional decoder complexity. This is because a block in a reference picture may be referred to multiple times by multiple blocks in another picture and by blocks in multiple pictures.

When a block in a reference picture is referred to by a block in the current picture and the resolutions of the reference picture and the current picture are different, the reference block is resampled by invocation of the interpolation filter such that the reference block has the integer-pel resolution. When the motion vector is in quarter-pel, the interpolation process is invoked again to obtain the resampled reference block in the quarter-pel resolution. Therefore, for each motion compensation operation for the current block from a reference block involving different resolutions, up to two, instead of one, interpolation filtering operations are needed. Without ARC support, up to only one interpolation filter operation (i.e., for generation of the reference block in the quarter-pel resolution) is needed.

To limit the worst-case complexity, it is proposed that, if the ARC design in VVC uses block-based resampling, the following apply:

Bi-prediction of a block from a reference picture with a different resolution than the current picture is disallowed.

To be more precise, the constraint is as follows: For the current block blkA in the current picture picA refers to a reference block blkB in a reference picture picB, when picA and picB have different resolutions, block blkA shall be a uni-predicted block.

With this constraint, the worst-case number of interpolation operations needed to decode a block is limited to two. If a block refers to a block from a different-resolution picture, the number of interpolation operations needed is two as discussed above. This is the same as in the case when the block refers to a reference block from a same-resolution picture and coded as a bi-predicted block since the number of interpolation operations is also two (i.e., one for getting the quarter-pel resolution for each reference block).

To simplify the implementation, another variation is proposed that if the ARC design in VVC uses block-based resampling, the following apply:

If the reference frame and current frame have different resolutions, the corresponding positions of every pixel of predictors are calculated first, and then the interpolation is applied only one time. That is, two interpolation operations (i.e., one for resampling and one for quarter-pel interpolation) are combined into only one interpolation operation. The sub-pel interpolation filters in the current VVC can be reused, but, in this case, the granularity of interpolation should be enlarged but the interpolation operation times are reduced from two to one.

To enable temporal MV usage (e.g., merge mode and ATMVP) for the case that the temporal MV comes from the reference frame with different resolution than the current one, it is proposed that, scaling temporal MV to the current resolution as needed.

Resampling Ratios

In JVET-M 0135, to start the discussion on ARC, it is proposed that for the starting point of ARC, consider only the resampling ratio of 2× (meaning 2×2 for upsampling and ½×½ for downsampling). From further discussion on this topic after the Marrakech meeting, it is found that supporting only the resampling ratio of 2× is very limited, as in some cases a smaller difference between resampled and un-resampled resolutions would be more beneficial.

Although support of arbitrary resampling ratio may be desirable, it support seemed difficult. This is because to support arbitrary resampling ratio, the number of resampling filters that have to be defined and implemented seemed to be too many and to impose a significant burden on decoder implementations.

It is proposed that more than one but a small number of resampling ratios need to be supported, but at least 1.5× and 2× resampling ratios, and arbitrary resampling ratio is not supported.

2.2.5.4. Max DPB Buffer Size and Buffer Fullness

With ARC, the DPB may contains decoded pictures of different spatial resolutions within the same CVS. For DPB management and related aspects, counting DPB size and fullness in units decoded picture no longer works.

Below are discussions of some specific aspects that need to be addressed and possible solutions in the final VVC specification if ARC is supported:

1. Rather than using the value of PicSizeInSamplesY (i.e., PicSizeInSamplesY=pic_width_in_luma_samples*pic_height_in_luma_samples) for deriving MaxDpbSize (i.e., maximum number of reference picture that may present in the DPB), derivation of MaxDpbSize is based on the value of MinPicSizeInSamplesY. MinPicSizeInSampleY defined as follows:

MinPicSizeInSample*Y*=(Width of the smallest picture resolution in the bitstream)*(Height of the smallest resolution in the bitstream)

The derivation of MaxDpbSize is modified as follows (based on the HEVC equation):

```
if( MinPicSizeInSamplesY <= ( MaxLumaPs >> 2 ) )
    MaxDpbSize = Min( 4 * maxDpbPicBuf, 16 )
else if( MinPicSizeInSamplesY <= ( MaxLumaPs >> 1 ) )
    MaxDpbSize = Min( 2 * maxDpbPicBuf, 16 )
else if( MinPicSizeInSamplesY <= ( ( 3 * MaxLumaPs ) >> 2 ) )
    MaxDpbSize = Min( ( 4 * maxDpbPicBuf ) / 3, 16 )
else
    MaxDpbSize = maxDpbPicBuf
```

2. Each decoded picture is associated with a value called PictureSizeUnit. PictureSizeUnit is an integer value that specifies how big a decoded picture size is relative to the MinPicSizeInSampleY. The definition of PictureSizeUnit depends on what resampling ratios are supported for ARC in VVC.

For example, if ARC supports only the resampling ratio of 2, the PictureSizeUnit is defined as follows:
  Decoded pictures having the smallest resolution in the bitstream are associated with PictureSizeUnit of 1.
  Decoded pictures having the resolution that is 2 by 2 of the smallest resolution in the bitstream is associated with PictureSizeUnit of 4 (i.e., 1*4).

For another example, if ARC supports both the resampling ratios of 1.5 and 2, the PictureSizeUnit is defined as follows:
  Decoded pictures having the smallest resolution in the bitstream is associated with PictureSizeUnit of 4.
  Decoded pictures having the resolution that is 1.5 by 1.5 of the smallest resolution in the bitstream is associated with PictureSizeUnit of 9 (i.e., 2.25*4).
  Decoded pictures having the resolution that is 2 by 2 of the smallest resolution in the bitstream is associated with PictureSizeUnit of 16 (i.e., 4*4).

For other resampling rations supported by ARC, the same principle as given by the examples above should be used to determine the value of PictureSizeUnit for each picture size.

3. Let the variable MinPictureSizeUnit be the smallest possible value of PictureSizeUnit. That is, if ARC supports only resampling ratio of 2, MinPictureSizeUnit is 1; if ARC supports resampling ratios of 1.5 and 2, MinPictureSizeUnit is 4; likewise, the same principle is used to determine the value of MinPictureSizeUnit.

4. The value range of sps_max_dec_pic_buffering_minus1[i] is specified to range from 0 to (MinPictureSizeUnit* (MaxDpbSize−1)). The variable MinPictureSizeUnit is the smallest possible value of PictureSizeUnit.

5. The DPB fullness operation is specified based on PictureSizeUnit as follows:
  The hypothetical reference decoder (HRD) is initialized at decoding unit 0, with both the coded picture buffer (CPB) and the DPB being set to be empty (the DPB fullness is set equal to 0).
  When the DPB is flushed (i.e., all pictures are removed from the DPB), the DPB fullness is set equal to 0.
  When a picture is removed from the DPB, the DPB fullness is decrement by the value of PictureSizeUnit associated with the removed picture.
  When a picture is inserted into the DPB, the DPB fullness is increment by the value of PictureSizeUnit associated with the inserted picture.

2.2.5.5. Resampling Filters

In the software implementation, the implemented resampling filters were simply taken from previously available filters described in JCTVC-H0234. Other resampling filters should be tested and used if they provide better performance and/or lower complexity. It is proposed that various resampling filters to be tested to strike a trade-off between complexity and performance. Such tests can be done in a core experiment (CE).

2.2.5.6. Miscellaneous Necessary Modifications to Existing Tools

To support ARC, some modifications and/or additional operations may be needed to some of the existing coding tools. For example, in the ARC software implementation picture-based resampling, for simplicity, TMVP and ATMVP are disabled when the original coding resolutions of current picture and reference picture are different.

2.2.6. JVET-N0279

Figure 14:
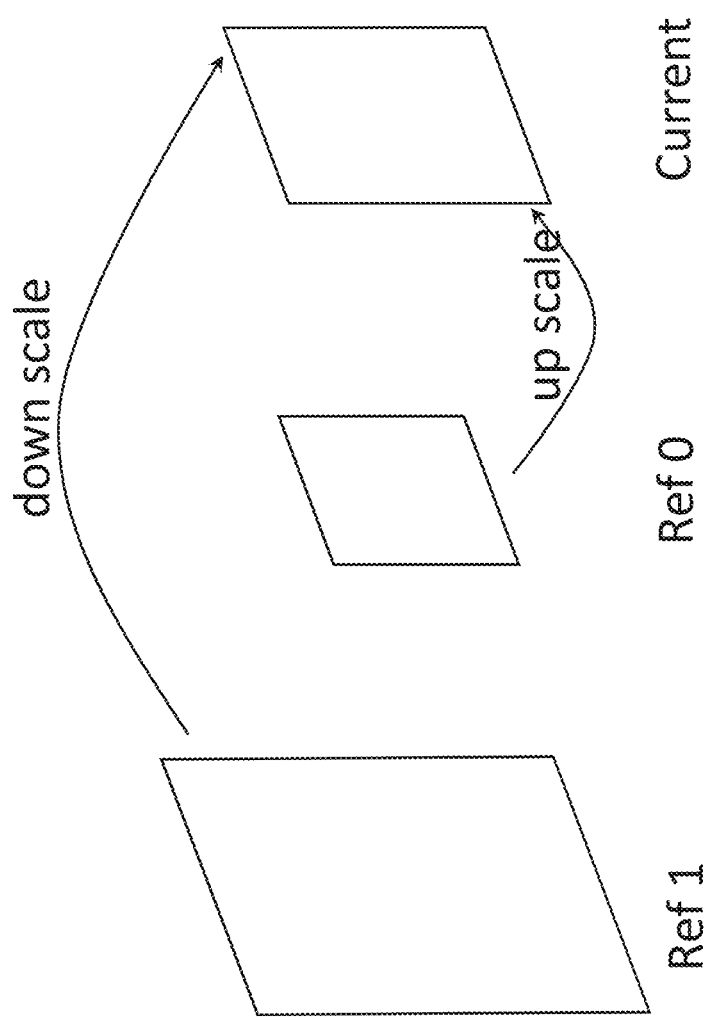
FIG. 14 shows an example of adaptive resolution change.

According to "Requirements for a Future Video Coding Standard", "the standard shall support fast representation switching in the case of adaptive streaming services that offer multiple representations of the same content, each having different properties (e.g., spatial resolution or sample bit depth)." In real-time video communication, allowing resolution change within a coded video sequence without inserting an I picture can not only adapt the video data to dynamic channel conditions or user preference seamlessly, but also remove the beating effect caused by I pictures. A hypothetical example of adaptive resolution change is shown in FIG. 14 where the current picture is predicted from reference pictures of different sizes.

This contribution proposes high level syntax to signal adaptive resolution change as well as modifications to the current motion compensated prediction process in the VTM. These modifications are limited to motion vector scaling and subpel location derivations with no changes in the existing motion compensation interpolators. This would allow the existing motion compensation interpolators to be reused and not require new processing blocks to support adaptive resolution change which would introduce additional cost.

2.2.6.1. Adaptive Resolution Change Signaling

Double brackets are placed before and after the text deleted.

TABLE 12

| SPS | |
|---|---|
| | Descriptor |
| seq_parameter_set_rbsp( ) { | |
| ... | |
| [[pic_width_in_luma_samples | ue(v) |
| pic_height_in_luma_samples | ue(v)]] |
| max_pic_width_in_luma_samples | ue(v) |
| max_pic_height_in_luma_samples | ue(v) |
| ... | |
| } | |

[[pie_width_in_luma_samples specifies the width of each decoded picture in units of luma samples. pic_width_in_luma_samples shall not be equal to 0 and shall be an integer multiple of MinCbSizeY.

pic_height_in_luma_samples specifies the height of each decoded picture in units of luma samples. pic_height_in_luma_samples shall not be equal to 0 and shall be an integer multiple of MinCbSizeY.]]

max_pic_width_in_luma_samples specifies the maximum width of decoded pictures referring to the SPS in units of luma samples. max pic_width_in_luma_samples shall not be equal to 0 and shall be an integer multiple of MinCbSizeY.

max_pic_height_in_luma_samples specifies the maximum height of decoded pictures referring to the SPS in units of luma samples. max pic_height_in_luma_samples shall not be equal to 0 and shall be an integer multiple of MinCbSizeY.

TABLE 13

PPS

| | Descriptor |
|---|---|
| pic_parameter_set_rbsp( ) { | |
| ... | |
| pic_size_different_from_max_flag | u(1) |
| if (pic_size_different_from_max_flag) { | |
| pic_width_in_luma_samples | ue(v) |
| pic_height_in_luma_samples | ue(v) |
| } | |
| ... | |
| } | | pic_size_different_from_max_flag equal to 1 specifies that the PPS signals different picture width or picture height from the max_pic_width_in_luma_samples and max_pic_height_in_luma_sample in the referred SPS. pic_size_different_from_max_flag equal to 0 specifies that pic_width_in_luma_samples and pic_height_in_luma_sample are the same as max_pic_width_in_luma_samples and max_pic_height_in_luma_sample in the referred SPS.

pic_width_in_luma_samples specifies the width of each decoded picture in units of luma samples. pic_width_in_luma_samples shall not be equal to 0 and shall be an integer multiple of MinCbSizeY. When pic_width_in_luma_samples is not present, it is inferred to be equal to max_pic_width_in_luma_samples pic_height_in_luma_samples specifies the height of each decoded picture in units of luma samples. pic_height_in_luma_samples shall not be equal to 0 and shall be an integer multiple of MinCbSizeY. When pic_height_in_luma_samples is not present, it is inferred to be equal to max_pic_height_in_luma_samples.

It is a requirement of bitstream conformance that horizontal and vertical scaling ratios shall be in the range of ⅛ to 2, inclusive for every active reference picture. The scaling ratios are defined as follows:

horizontal_scaling_ratio=((reference_pic_width_in_luma_samples<<14)+(pic_width in_luma_samples/2))/pic_width_in_luma_samples vertical_scaling_ratio=((reference_pic_height_in_luma_samples<<14)+(pic_height_in_luma_samples/2))/pic_height_in_luma_samples

TABLE 14

| | Descriptor |
|---|---|
| tile_group_header( ) { | |
| ... | ue(v) |
| if ( tile_group_type != I ) { | |
| if( sps_temporal_mvp_enabled_flag ) | |
| tile_group_temporal_mvp_enabled_flag | u(1) |
| if( tile_group_type = = B ) | |
| mvd_l1_zero_flag | u(1) |
| if( tile_group_temporal_mvp_enabled_flag ) { | |
| if( tile group type = = B ) | |
| collocated_from_l0_flag | u(1) |
| } | |

TABLE 14-continued

| | Descriptor |
|---|---|
| six_minus_max_num_merge_cand | ue(v) |
| if( sps_affine_enable_flag ) | |
| five_minus_max_num_subblock_merge_cand | ue(v) |
| } | |
| ... | |
| } | |

Reference Picture Scaling Process

When there is a resolution change within a CVS, a picture may have a different size from one or more of its reference pictures. This proposal normalizes all motion vectors to the current picture grid instead of their corresponding reference picture grids. This is asserted to be beneficial to keep the design consistent and make resolution changes transparent to the motion vector prediction process. Otherwise, neighboring motion vectors pointing to reference pictures with different sizes cannot be used directly for spatial motion vector prediction due to the different scale.

When a resolution change happens, both the motion vectors and reference blocks have to be scaled while doing motion compensated prediction. The scaling range is limited to [⅛, 2], i.e., the upscaling is limited to 1:8 and downscaling is limited to 2:1. Note that upscaling refers to the case where the reference picture is smaller than the current picture, while downscaling refers to the case where the reference picture is larger than the current picture. In the following sections, the scaling process is described in more detail.

Luma Block

The scaling factors and their fixed-point representations are defined as $$hori_{scale_{fp}} = \frac{(width_{ref} \ll 14) + \left(\frac{width_{cur}}{2}\right)}{width_{cur}}$$ [Equation 1]

$$vert\_scale\_fp = \frac{(height_{ref} \ll 14) + \left(\frac{height_{cur}}{2}\right)}{height_{cur}}$$ [Equation 2]

The scaling process includes two parts:
1. Map the upper left corner pixel of the current block to the reference picture;
2. Use the horizontal and vertical step sizes to address the reference locations of the current block's other pixels.

If the coordinate of the upper left corner pixel of the current block is (x, y), the subpel location (x^, y^) in the reference picture pointed to by a motion vector (mvX, mvY) in units of 1/16th pel is specified as follows:

The horizontal location in the reference picture is $x' = ((x \ll 4) + mvX) \cdot hori\_scale\_fp$ [Equation 3]

and x' is further scaled down to only keep 10 fractional bits $x' = Sign(x') \cdot ((Abs(x') + (1 \ll 7)) \gg 8)$ [Equation 4]

Similarly, the vertical location in the reference picture is $y' = ((y \ll 4) + mvY) \cdot vert\_scale\_fp$ [Equation 5]

and y' is further scaled down to $y' = Sign(y') \cdot ((Abs(y') + (1 \ll 7)) \gg 8)$ [Equation 6]

At this point, the reference location of the upper left corner pixel of the current block is at (x^,y^). The other reference subpel/pel locations are calculated relative to $(x'', y'')$ with horizontal and vertical step sizes. Those step sizes are derived with $1/1024$-pel accuracy from the above horizontal and vertical scaling factors as follows:

$$x\_step = (hori\_scale\_fp + 8) >> 4 \quad \text{[Equation 7]}$$

$$y\_step = (vert\_scale\_fp + 8) >> 4. \quad \text{[Equation 8]}$$

As an example, if a pixel in the current block is i-column and j-row away from the upper left corner pixel, its corresponding reference pixel's horizontal and vertical coordinates are derived by $$x'_i = x' + i * x\_step \quad \text{[Equation 9]}$$

$$y'_j = y' + j * y\_step \quad \text{[Equation 10]}$$

In subpel interpolation, $x'_i$ and $y'_j$ have to be broken up into full-pel parts and fractional-pel parts:

The full-pel parts for addressing reference block are equal to $$(x'_i + 32) >> 10 \quad \text{[Equation 11]}$$

$$(y'_j + 32) >> 10 \quad \text{[Equation 12]}$$

The fractional-pel parts used to select interpolation filters are equal to $$\Delta x = ((x'_i + 32) >> 6) \& 15 \quad \text{[Equation 13]}$$

$$\Delta y = ((y'_j + 32) >> 6) \& 15. \quad \text{[Equation 14]}$$

Once the full-pel and fractional-pel locations within a reference picture are determined, the existing motion compensation interpolators can be used without any additional changes. The full-pel location will be used to fetch the reference block patch from the reference picture and the fractional-pel location will be used to select the proper interpolation filter.

Chroma Block

When the chroma format is 4:2:0, chroma motion vectors have $1/32$-pel accuracy. The scaling process of chroma motion vectors and chroma reference blocks is almost the same as for luma blocks except a chroma format related adjustment.

When the coordinate of the upper left corner pixel of the current chroma block is (xc, yc), the initial horizontal and vertical locations in the reference chroma picture are $$x_c' = ((x_c << 5) + mvX) \cdot hori\_scale\_fp \quad \text{[Equation 15]}$$

$$y_c' = ((y_c << 5) + mvY) \cdot vert\_scale\_fp \quad \text{[Equation 16]}$$

where mvX and mvY are the original luma motion vector but now should be examined with $1/32$-pel accuracy.

$x_c'$ and $y_c'$ are further scaled down to keep $1/1024$ pel accuracy $$x_c' = Sign(x_c') \cdot ((Abs(x_c') + (1 << 8)) >> 9) \quad \text{[Equation 17]}$$

$$y_c' = Sign(y_c') \cdot ((Abs(y_c') + (1 << 8)) >> 9) \quad \text{[Equation 18]}$$

Compared to the associated luma equations, the above right shift is increased by one extra bit.

The step sizes used are the same as for luma. For a chroma pixel at (i, j) relative to the upper left corner pixel, its reference pixel's horizontal and vertical coordinates are derived by $$x_{c\,i}' = x_c' + i * x\_step \quad \text{[Equation 19]}$$

$$y_{c\,j}' = y_c' + j * y\_step \quad \text{[Equation 20]}$$

In subpel interpolation, $x_{c\,i}'$ and $y_{c\,j}'$ are also broken up into full-pel parts and fractional-pel parts:

The full-pel parts for addressing reference block are equal to:

$$(x_{c\,i}' + 16) >> 10 \quad \text{[Equation 21]}$$

$$(y_{c\,j}' + 16) >> 10 \quad \text{[Equation 22]}$$

The fractional-pel parts used to select interpolation filters are equal to:

$$\Delta x = ((x_{c\,i}' + 16) >> 5) \& 31 \quad \text{[Equation 23]}$$

$$\Delta y = ((y_{c\,j}' + 16) >> 5) \& 31 \quad \text{[Equation 24]}$$

Interaction with Other Coding Tools

Because of the extra complexity and memory bandwidth associated with the interaction of some coding tools with reference picture scaling, it is recommended to add the following restrictions to the VVC specification:

When tile_group_temporal_mvp_enabled_flag is equal to 1, the current picture and its collocated picture shall have the same size.

When resolution change is allowed within a sequence, decoder motion vector refinement shall be turned off When resolution change is allowed within a sequence, sps_bdof_enabled_flag shall be equal to 0.

2.3. Coding Tree Block (CTB)-Based Adaptive Loop Filter (ALF) in JVET-N0415

Slice-Level Temporal Filter

Adaptive parameter set (APS) was adopted in VTM 4. Each APS contains one set of signalled ALF filters, up to 32 APSs are supported. In the proposal, slice-level temporal filter is tested. A tile group can re-use the ALF information from an APS to reduce the overhead. The APSs are updated as a first-in-first-out (FIFO) buffer.

CTB Based ALF

For luma component, when ALF is applied to a luma CTB, the choice among 16 fixed, 5 temporal or 1 signaled filter sets is indicated. Only the filter set index is signalled. For one slice, only one new set of 25 filters can be signaled. If a new set is signalled for a slice, all the luma CTBs in the same slice share that set. Fixed filter sets can be used to predict the new slice-level filter set and can be used as candidate filter sets for a luma CTB as well. The number of filters is 64 in total.

For chroma component, when ALF is applied to a chroma CTB, if a new filter is signalled for a slice, the CTB used the new filter, otherwise, the most recent temporal chroma filter satisfying the temporal scalability constrain is applied.

As the slice-level temporal filter, the APSs are updated as a first-in-first-out (FIFO) buffer.

2.4. Alternative Temporal Motion Vector Prediction (a.k.a., Subblock-Based Temporal Merging Candidate in VVC)

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 14, the sub-CUs are square N×N blocks (N is set to 8 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 15 which shows an example of ATMVP motion prediction for a CU.

In the first step, a reference picture and the corresponding block is determined by the motion information of the spatial neighbouring blocks of the current CU. To avoid the repetitive scanning process of neighbouring blocks, the merge candidate from block A0 (the left block) in the merge candidate list of the current CU is used. The first available motion vector from block A0 referring to the collocated reference picture are set to be the temporal vector. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply.

2.5. Affine Motion Prediction

In HEVC, only translation motion model is applied for motion compensation prediction (MCP). While in the real world, there are many kinds of motion, e.g., zoom in/out, rotation, perspective motions and the other irregular motions. In VVC, a simplified affine transform motion compensation prediction is applied with 4-parameter affine model and 6-parameter affine model. FIGS. 16A and 16B show a simplified 4-parameter affine motion model and a simplified 6-parameter affine motion model, respectively. As shown FIGS. 16A and 16B, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively.

$$\begin{cases} mv^h(x, y) = ax - by + e = \\ \quad \frac{(mv_1^h - mv_0^h)}{w}x - \frac{(mv_1^v - mv_0^v)}{w}y + mv_0^h \\ mv^v(x, y) = bx + ay + f = \\ \quad \frac{(mv_1^v - mv_0^v)}{w}x + \frac{(mv_1^h - mv_0^h)}{w}y + mv_0^v \end{cases} \quad [\text{Equation 25}]$$

$$\begin{cases} mv^h(x, y) = ax + cy + e = \\ \quad \frac{(mv_1^h - mv_0^h)}{w}x + \frac{(mv_2^h - mv_0^h)}{h}y + mv_0^h \\ mv^v(x, y) = bx + dy + f = \\ \quad \frac{(mv_1^v - mv_0^v)}{w}x + \frac{(mv_2^v - mv_0^v)}{h}y + mv_0^v \end{cases} \quad [\text{Equation 26}]$$

where (mvh0, mvh0) is motion vector of the top-left corner control point, and (mvh1, mvh1) is motion vector of the top-right corner control point and (mvh2, mvh2) is motion vector of the bottom-left corner control point, all of the three motion vectors are called control point motion vectors (CPMV), (x, y) represents the coordinate of a representative point relative to the top-left sample within current block and (mvh(x,y), mvv(x,y)) is the motion vector derived for a sample located at (x, y). The compensation prediction (CP) motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 17:
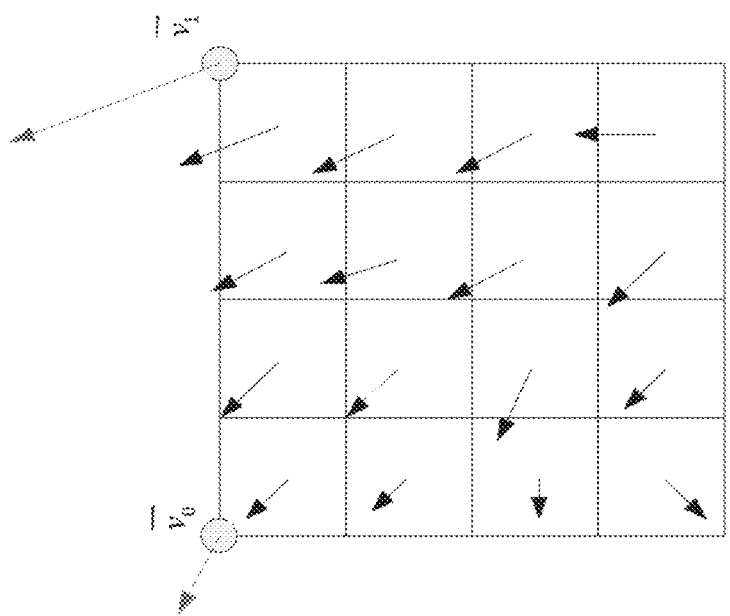
FIG. 17 shows an example of affine motion vector field (MVF) per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 17, is calculated according to Equation 25 and Equation 26, and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.5.1. Signaling of Affine Prediction

Similar to the translational motion model, there are also two modes for signaling the side information due affine prediction. They are AFFINE_INTER and AFFINE_MERGE modes.

2.5.2. AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIGS. 18A and 18B and the estimated CPMVs are signaled. In addition, the index of affine AMVP candidate from which the estimated CPMVs are derived is further signaled.

1) Inherited Affine Motion Predictors

Figure 19:
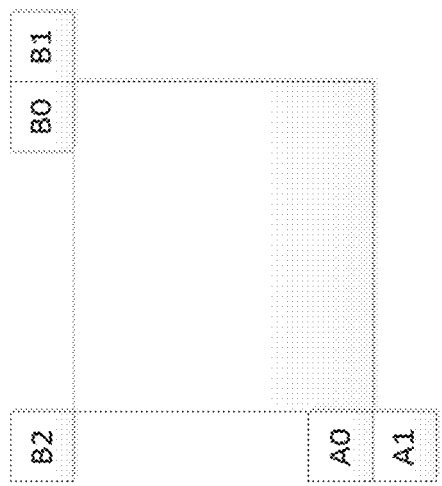
FIG. 19 shows Motion Vector Prediction (MVP) for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Figure 18B:
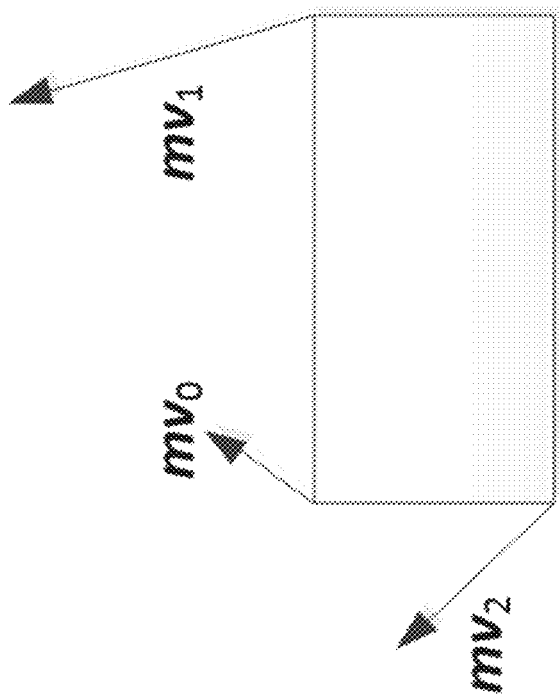
FIGS. 18A and 18B show examples of a 4-parameter affine model and 6-parameter affine model, respectively.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 20:
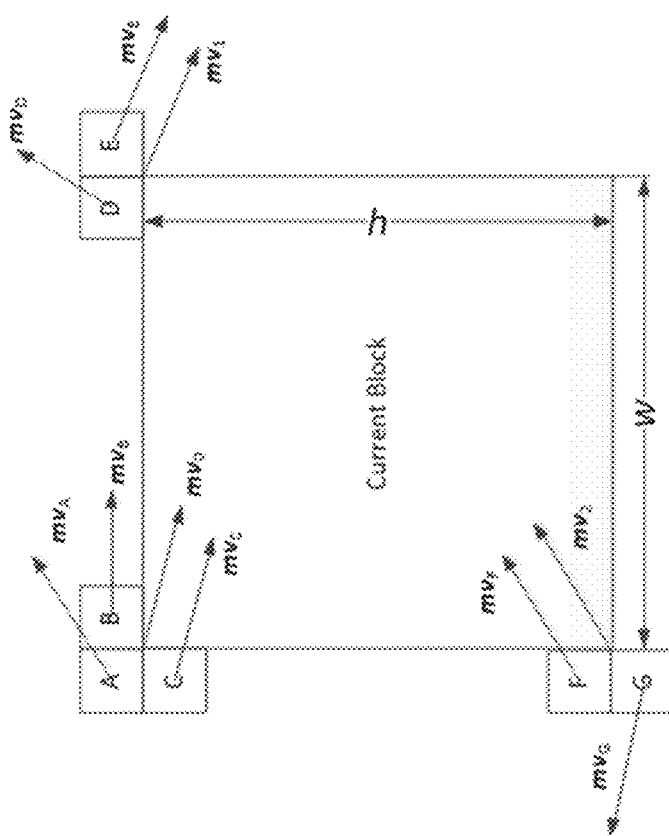
FIG. 20 shows MVP for AF_INTER for constructed affine candidates.

A constructed affine motion predictor consists of control-point motion vectors (CPMVs) that are derived from neighboring inter coded blocks, as shown in FIG. 20, which have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$, and $\overline{mv}_2$ are all founded, that is, $\overline{mv}_0$, $\overline{mv}_1$, and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.
i. Derive an affine motion predictor by setting all CPMVs equal to $\overline{mv}_2$ if available.
ii. Derive an affine motion predictor by setting all CPMVs equal to $\overline{mv}_1$ if available.
iii. Derive an affine motion predictor by setting all CPMVs equal to $\overline{mv}_0$ if available.
iv. Derive an affine motion predictor by setting all CPMVs equal to HEVC TMVP if available.
v. Derive an affine motion predictor by setting all CPMVs to zero MV.

Note that $\overline{mv}_i$ is already derived in constructed affine motion predictor.

Figure 18A:
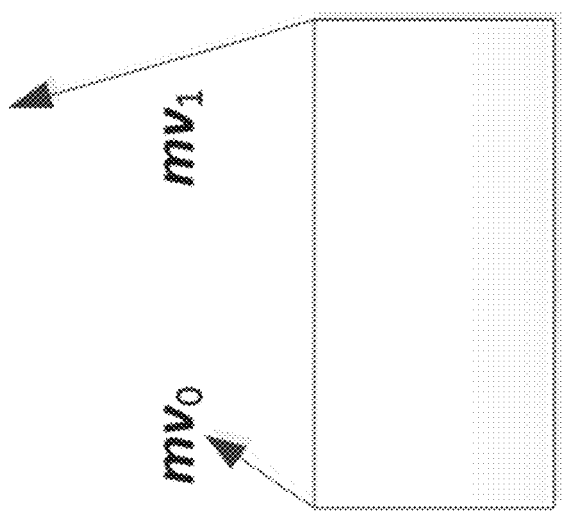

In AF_INTER mode, when 4/6-parameter affine mode is used, ⅔ control points are required, and therefore ⅔ MVD (Motion Vector Difference) needs to be coded for these control points, as shown in FIGS. 18A and 18B. In JVET-K 0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $\overline{mv}_i$, $mvd_1$ and $mv_1$ are the predicted motion vector, motion vector difference and motion vector of the top-left pixel (i=0), top-right pixel (i=1) or left-bottom pixel (i=2) respectively, as shown in FIG. 18B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.5.2.1. AF_MERGE Mode

Figures 21A, 21B:
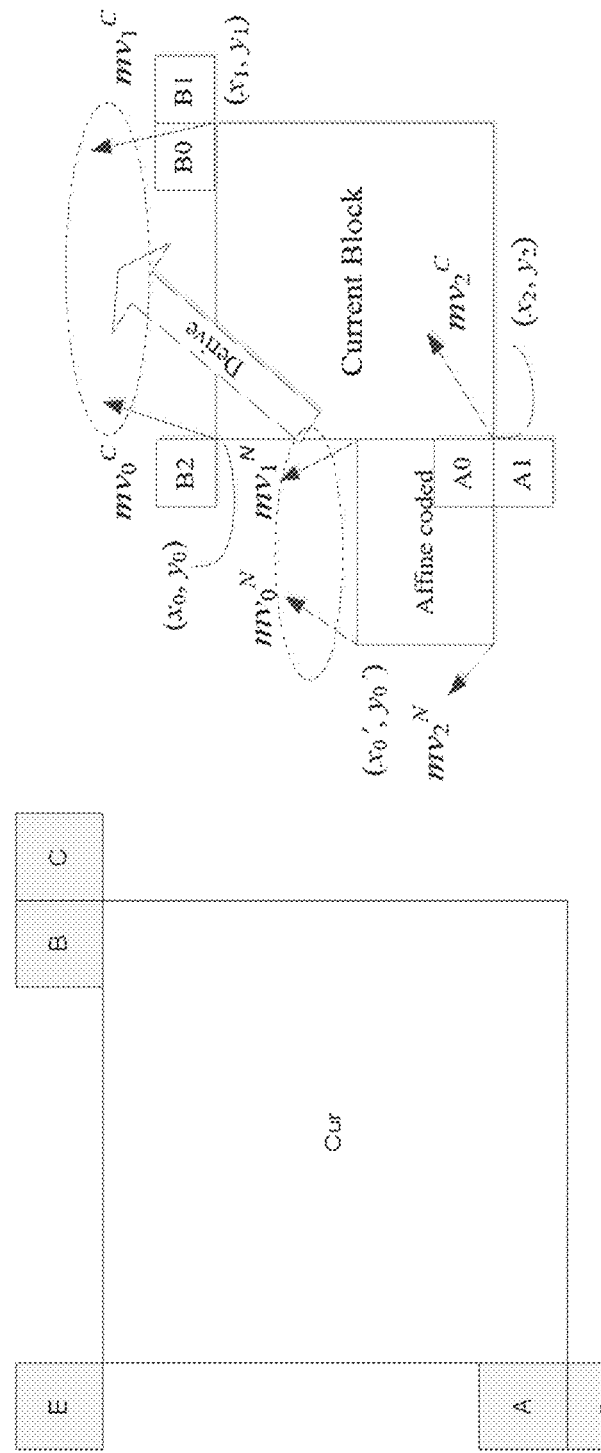
FIGS. 21A and 21B show five neighboring blocks and control point motion vector (CPMV) predictor derivation, respectively.

When a CU is applied in AF_MERGE mode, it gets the first block coded with affine mode from the valid neighbor reconstructed blocks. FIG. 21 shows candidates for AF_MERGE. The selection order for the candidate block is from left, above, above right, left bottom to above left as shown in FIG. 21A (denoted by A, B, C, D, E in order). For example, if the neighbor left bottom block is coded in affine mode as denoted by A0 in FIG. 21B, the Control Point (CP) motion vectors $mv_0^N$, $mv_1^N$ and $mv_2^N$ of the top left corner, above right corner and left bottom corner of the neighboring CU/PU which contains the block A are fetched. And the motion vector $mv_0^C$, $mv_1^C$ and $mv_2^C$ (which is only used for the 6-parameter affine model) of the top left corner/top right/bottom left on the current CU/picture unit (PU) is calculated based on $mv_0^N$, $mv_1^N$ and $mv_2^N$. It should be noted that in VTM-2.0, sub-block (e.g., 4×4 block in VTM) located at the top-left corner stores mv0, the sub-block located at the top-right corner stores mv1 if the current block is affine coded. If the current block is coded with the 6-parameter affine model, the sub-block located at the bottom-left corner (LB) stores mv2; otherwise (with the 4-parameter affine model), the sub-block located at the bottom-left corner (LB) stores mv2'. Other sub-blocks store the MVs used for MC.

After the CPMV of the current CU mv0C, mv1C and mv2C are derived, according to the simplified affine motion model Equation 25 and Equation 26, the MVF of the current CU is generated. In order to identify whether the current CU is coded with AF_MERGE mode, an affine flag is signaled in the bitstream when there is at least one neighbor block is coded in affine mode.

In JVET-L0142 and JVET-L0632, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 22:
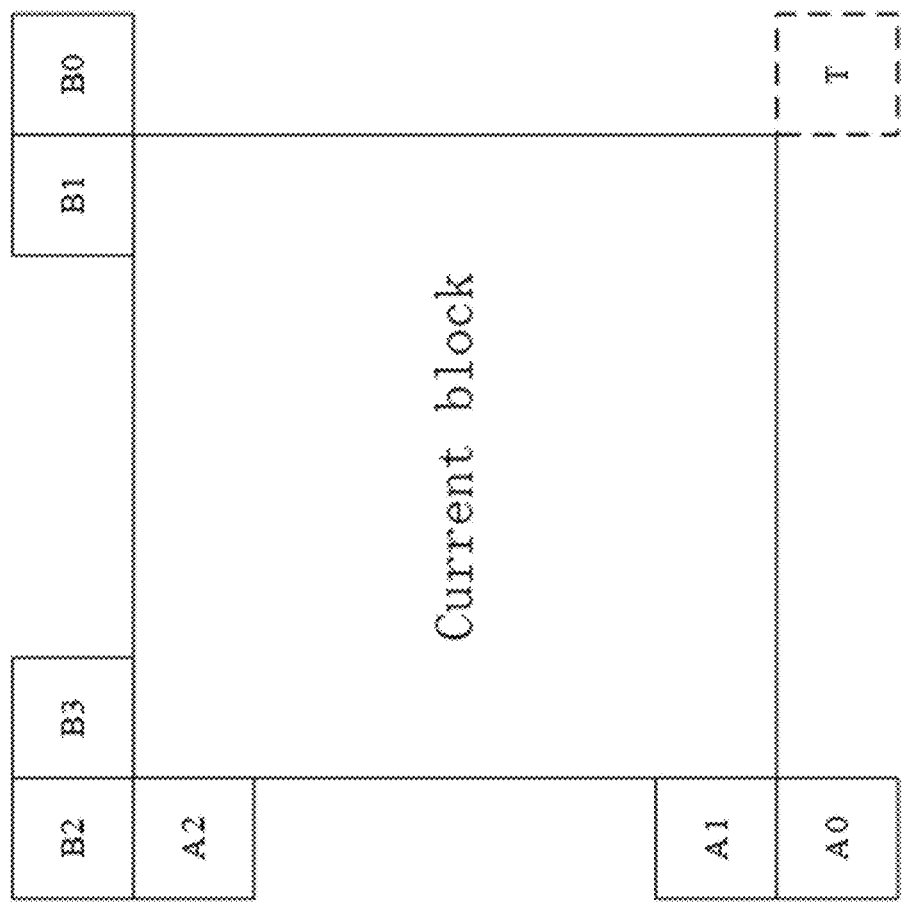
FIG. 22 shows an example of a candidates position for affine merge mode.

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 22 which shows an example of a candidates position for affine merge mode. CPk (k=1, 2, 3, 4) represents the k-th control point. A0, A1, A2, B0, B1, B2 and B3 are spatial positions for predicting CPk (k=1, 2, 3). T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

b) Secondly, the combinations of controls points are used to construct an affine merge candidate.

Motion information of three control points is needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points is needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3} i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

Drawbacks of Existing Implementations

When applied in VVC, ARC may have the following issues:

It is unclear to apply coding tools in VVC such as ALF, Luma Mapping Chroma Scaling (LMCS), Decoder Side Motion-vector Refinement (DMVR), Bi-Directional Optical Flow (BDOF), Affine prediction, Triangular Prediction Mode (TPM), Symmetrical Motion Vector Difference (SMVD), Merge Motion Vector Difference (MMVD), inter-intra prediction (a.k.a. Combined Inter-picture merge and Intra-picture Prediction CIIP in VVC), Localized Illumination Compensation (LIC) and History-based Motion Vector Prediction (HMVP).

Exemplary Methods for Coding Tools with Adaptive Resolution Conversion

Embodiments of the disclosed technology overcome the drawbacks of existing implementations. The examples of the disclosed technology provided below are discussed to facilitate the understanding of the disclosed technology and should be interpreted in a way to limit the disclosed technology. Unless explicitly indicated to the contrary, the various features described in these examples can be combined.

In the following discussion, SatShift(x, n) is defined as $$SatShift(x, n) = \begin{cases} (x + \mathit{offsset0}) \gg n & \text{if } x \geq 0 \\ -((-x + \mathit{offset1}) \gg n) & \text{if } x < 0 \end{cases}$$

Shift(x, n) is defined as Shift(x, n)=(x+ offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as:

$$Clip3(Min, Max, x) = \begin{cases} Min & \text{if } x < Min \\ Max & \text{if } x > Max \\ x & \text{Otherwise} \end{cases}$$

Floor(x) is defined as the largest integer less than or equal to x.

Ceil(x) is the smallest integer greater than or equal to x.

Log 2(x) is defined as the base-2 logarithm of x.

Some aspects of the implementations of the disclosed technology are listed in the below.

1. The derivation of MV offsets in MMVD/SMVD and/or refined motion vectors in decoder side derivation process may depend on the resolution of reference pictures associated with current block and the resolution of current picture.
   a. For example, the second MV offset referring to a second reference picture may be scaled from a first MV offset referring to a first reference picture. The scaling factor may depend on the resolutions of the first and second reference pictures.

2. The motion candidate list construction process may be constructed according to the reference picture resolution associated with the spatial/temporal/history motion candidates.
   a. In one example, a merge candidate referring to a reference picture with a higher resolution may have a higher priority than a merge candidate referring to a reference picture with a lower resolution. In the discussion, resolution W0*H0 is lower than resolution W1*H1 if W0<W1 and H0<H1.
   b. For example, a merge candidate referring to a reference picture with a higher resolution may be put before a merge candidate referring to a reference picture with a lower resolution in the merge candidate list.
   c. For example, a motion vector referring to a reference picture with a resolution lower than the resolution of the current picture cannot be in the merge candidate list.
   d. In one example, whether to and/or how to update the history buffer (look up table) may depend on reference picture resolution associated with the decoded motion candidate.
      i. In one example, if one reference picture associated with the decoded motion candidate is with different resolution, such motion candidate is disallowed to update the history buffer.

3. It is proposed that a picture should be filtered with ALF parameters associated with corresponding dimensions.
   a. In one example, ALF parameters signaled in a video unit such as APS may be associated with one or multiple picture dimensions.

b. In one example, a video unit such as APS signaling ALF parameters may be associated with one or multiple picture dimensions.

c. For example, a picture may only apply ALF parameters signaled in a video unit such as APS, associated with the same dimensions.

d. The resolution/index of PPS/indication of resolution may be signaled in the ALF APS.

e. It is restricted that ALF parameter may only inherit/be predicted from that used for a picture with the same resolution.

4. It is proposed that ALF parameters associated with a first corresponding dimensions may inherit or be predicted from ALF parameters associated with a second corresponding dimensions.

a. In one example, the first corresponding dimensions must be the same as the second corresponding dimensions.

b. In one example, the first corresponding dimensions may be different to the second corresponding dimensions.

5. It is proposed that samples in a picture should be reshaped with LMCS parameters associated with corresponding dimensions.

a. In one example, LMCS parameters signaled in a video unit such as APS may be associated with one or multiple picture dimensions.

b. In one example, a video unit such as APS signaling LMCS parameters may be associated with one or multiple picture dimensions.

c. For example, a picture may only apply LMCS parameters signaled in a video unit such as APS, associated with the same dimensions.

d. The resolution/index of PPS/indication of resolution may be signaled in the LMCS APS.

e. It is restricted that LMCS parameter may only inherit/be predicted from that used for a picture with the same resolution.

6. It is proposed that LMCS parameters associated with a first corresponding dimensions may inherit or be predicted from LMCS parameters associated with a second corresponding dimensions.

a. In one example, the first corresponding dimensions must be the same as the second corresponding dimensions.

b. In one example, the first corresponding dimensions may be different to the second corresponding dimensions.

7. Whether to and/or how to enable triangular prediction mode (TPM)/inter prediction with geometry partitioning (GEO) or other coding tools that may split one block to two or multiple sub-partitions may depend on the associated reference picture information of the two or multiple sub-partitions.

a. In one example, it may depend on whether resolution of one of the two reference pictures and resolution of current picture.

i. In one example, if at least one of the two reference pictures are associated with different resolution compared to the current picture, such a coding tool is disabled.

b. In one example, it may depend on whether resolutions of the two reference pictures are same or not.

i. In one example, if two reference pictures are associated with different resolution, such a coding tool may be disabled.

ii. In one example, if both two reference pictures are associated with different resolution compared to the current picture, such a coding tool is disabled.

iii. Alternatively, if both two reference pictures are associated with different resolution compared to the current picture but the two reference pictures are with same resolution, such a coding tool may still be disabled.

iv. Alternatively, if at least one of the reference pictures has different resolution as current picture, and the reference pictures are with different resolution, the coding tool X may be disabled.

c. Alternatively, furthermore, it may depend on whether the two reference pictures are the same reference picture.

d. Alternatively, furthermore, it may depend on whether the two reference pictures are in the same reference list or not.

e. Alternatively, such a coding tool may be always disabled if RPR (reference picture resampling is enabled in slice/picture header/sequence parameter set).

8. It is proposed that coding tool X may be disabled for a block if the block refers to at least one reference picture with different dimensions to the current picture.

a. In one example, the information related to the coding tool X may not be signaled.

b. In one example, motion information of such block may not be inserted into the HMVP table.

c. Alternatively, if coding tool X is applied in a block, the block cannot refer to a reference picture with different dimensions to the current picture.

i. In one example, a merge candidate referring to a reference picture with different dimensions to the current picture may be skipped or not put into the merge candidate list.

ii. In one example, the reference index corresponds to a reference picture with different dimensions to the current picture may be skipped or not allowed to be signaled.

d. Alternatively, the coding tool X may be applied after scaling the two reference blocks or pictures according to resolution of the current picture and resolutions of the reference pictures.

e. Alternatively, the coding tool X may be applied after scaling the two MVs or MVDs according to resolution of the current picture and resolutions of the reference pictures.

f. In one example, for a block (e.g., bi-prediction coded block or a block with multiple-hypothesis from the same reference picture list with different reference pictures or different MVs; or a block with multiple-hypothesis from different reference picture lists), whether to disable or enabled the coding tool X may depend on the resolutions of the reference picture associated with the reference picture list and/or current reference picture.

i. In one example, the coding tool X may be disabled for one reference picture list but enabled for the other reference picture list.

ii. In one example, the coding tool X may be disabled for one reference picture but enabled for the other reference picture. Here, the two reference pictures may be from different or same reference picture list.

iii. In on example, for each reference picture list L, enabling/disabling the coding tool is determined regardless the reference picture in another reference picture list different than list L.
1. In one example, it may be determined by the reference picture of list L and current picture.
2. In one example, the tool may be disabled for list L if the associated reference picture for list L is different from current picture.
iv. Alternatively, enabling/disabling the coding tool is determined by resolutions of all reference pictures and/or current picture.
1. In one example, if at least one of the reference pictures has different resolution as current picture, the coding tool X may be disabled.
2. In one example, if at least one of the reference pictures has different resolution as current picture, but the reference pictures are with the same resolution, the coding tool X may be still enabled.
3. In one example, if at least one of the reference pictures has different resolution as current picture, and the reference pictures are with different resolution, the coding tool X may be disabled.
g. The coding tool X may be anyone below.
iii. DMVR
iv. BDOF
v. Affine prediction
vi. Triangular Prediction Mode
vii. SMVD
viii. MMVD
ix. Inter-intra prediction in VVC
x. LIC
xi. HMVP
xii. Multiple Transform Set (MTS)
xiii. Sub-Block Transform (SBT)
xiv. PROF and/or other decode side motion/prediction refinement methods
xv. LFNST (low frequency non-square transform)
xvi. Filtering methods (e.g., deblocking filter/sample adaptive offset (SAO)/ALF)
xvii. GEO/TPM/cross-component ALF
9. Reference picture list of a picture may contain no more than K different resolutions.
a. In one example, K is equal to 2.
10. No more than K different resolutions may be allowed for N consecutive (in decoding order or display order) pictures.
a. In one example, N=3, K=3.
b. In one example, N=10, K=3.
c. In one example, no more than K different resolutions may be allowed in a GOP
d. In one example, no more than K different resolutions may be allowed between two pictures with same certain temporal layer id (denoted as tid).
i. For example, K=3, tid=0.
11. Resolution change may be allowed for Intra picture only.
12. Bi-prediction may be converted to uni-prediction in the decoding process if one or two reference pictures of one block are with different resolution as the current picture.
a. In one example, the prediction from list X with the corresponding reference picture with different resolution as the current picture may be discarded.
13. Whether to enable or disable inter-prediction from reference pictures in different resolution may depend on the motion vector precision and/or resolution ratios.
a. In one example, if the scaled motion vector according to the resolution ratios point to integer positions, the inter-prediction may be still applied.
b. In one example, if the scaled motion vector according to the resolution ratios point to a sub-pel position (e.g., ¼-pel) which is allowed for the cases without ARC, the inter-prediction may be still applied.
c. Alternatively, bi-prediction may be disallowed when both reference pictures are with different resolutions from the current picture.
d. Alternatively, bi-prediction may be enabled when one reference picture is with different resolution from the current picture and the other is with the same resolution.
e. Alternatively, uni-prediction may be disallowed for a block when the reference picture is with different resolution from the current picture and the block dimension satisfy certain conditions.
14. A first flag (e.g., pic_disable_X_flag) to indicate whether a coding tool X is disabled may be signaled in picture header.
a. Whether to enable the coding tool for a slice/tile/brick/subpicture/other video unit smaller than a picture may be controlled by this flag in picture header and/or slice types.
b. In one example, when the first flag is true, the coding tool X is disabled.
i. Alternatively, when the first flag is false, the coding tool X is enabled.
ii. In one example, it is enabled/disabled for all samples within the picture.
c. In one example, the signaling of the first flag may further depend on a syntax element or multiple syntax elements in SPS/video parameter set (VPS)/DPS/PPS.
i. In one example, the signaling of the flag may depend on the enabling flag of the coding tool X in SPS.
ii. Alternatively, furthermore, a second flag (e.g., sps_X_slice_present_flag) to indicate the presence of the first flag in a picture header may be signaled in SPS.
1) Alternatively, furthermore, the second flag may be conditionally signaled when the coding tool X is enabled for a sequence (e.g., sps_X_enabled_flag is true).
2) Alternatively, furthermore, only the second flag indicates the first flag is present, the first flag may be signaled in picture header.
d. In one example, the first and/or the second flag is coded with 1-bit.
e. The coding tool X may be:
i. In one example, the coding tool X is the PROF.
ii. In one example, the coding tool X is the DMVR.
iii. In one example, the coding tool X is the BDOF.
iv. In one example, the coding tool X is the cross-component ALF.
v. In one example, the coding tool X is the GEO.
vi. In one example, the coding tool X is the TPM.
vii. In one example, the coding tool X is the MTS.
15. Whether a block can refer to a reference picture with different dimensions to the current picture may depend on the width (WB) and/or height (HB) of the block, and/or block prediction mode (i.e., bi-prediction or uni-prediction).

a. In one example, a block can refer to a reference picture with different dimensions to the current picture if WB>=T1 and HB>=T2. E.g., T1=T2=8.
b. In one example, a block can refer to a reference picture with different dimensions to the current picture if WB*HB>=T. E.g., T=64.
c. In one example, a block can refer to a reference picture with different dimensions to the current picture if Min(WB, HB)>=T. E.g., T=8.
d. In one example, a block can refer to a reference picture with different dimensions to the current picture if Max(WB, HB)>=T. E.g., T=8.
e. In one example, a block can refer to a reference picture with different dimensions to the current picture if WB<=T1 and HB<=T2. E.g., T1=T2=64.
f. In one example, a block can refer to a reference picture with different dimensions to the current picture if WB*HB<=T. E.g., T=4096.
g. In one example, a block can refer to a reference picture with different dimensions to the current picture if Min(WB, HB)<=T. E.g., T=64.
h. In one example, a block can refer to a reference picture with different dimensions to the current picture if Max(WB, HB)<=T. E.g., T=64.
i. Alternatively, a block is disallowed to refer to a reference picture with different dimensions to the current picture if WB<=T1 and/or HB<=T2. E.g., T1=T2=8.
j. Alternatively, a block is disallowed to refer to a reference picture with different dimensions to the current picture if WB<=T1 and/or HB<=T2. E.g., T1=T2=8.

Figure 23A:
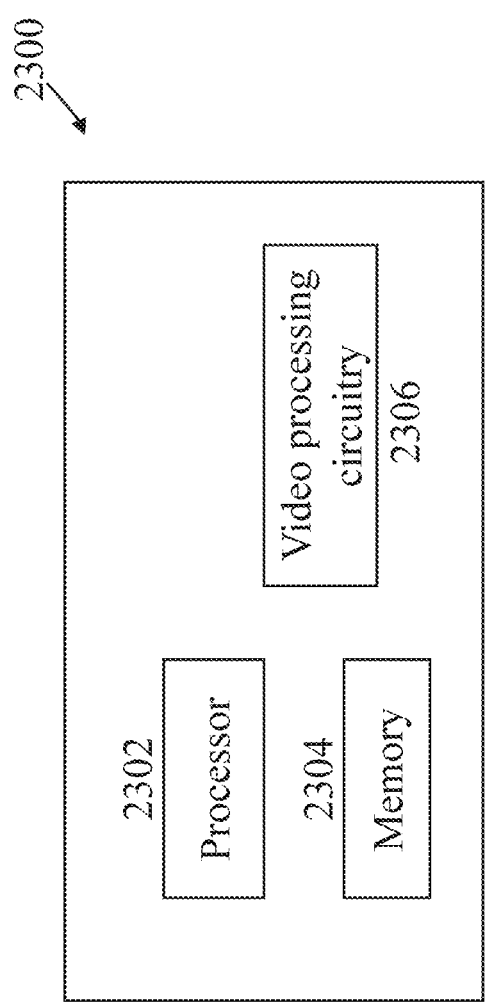
FIGS. 23A and 23B are block diagrams of examples of a hardware platform for implementing a visual media decoding or a visual media encoding technique described in the present disclosure.

FIG. 23A is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods (including, but not limited to, methods as shown in FIGS. 24A to 25I) described in the present disclosure. The memory (memories) 2304 may be used for storing data and code used for implementing the methods and techniques described herein. The video processing hardware 2306 may be used to implement, in hardware circuitry, some techniques described in the present disclosure.

Figure 23B:
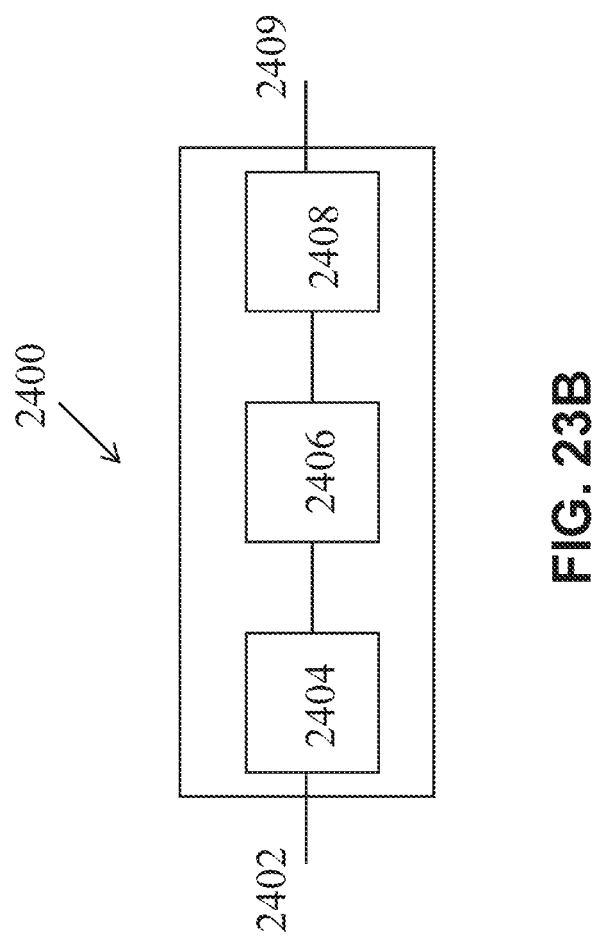

FIG. 23B is another example of a block diagram of a video processing system in which disclosed techniques may be implemented. FIG. 23B is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2400 may include a coding component 2404 that may implement the various coding or encoding methods described in the present disclosure. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2409. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 24A:
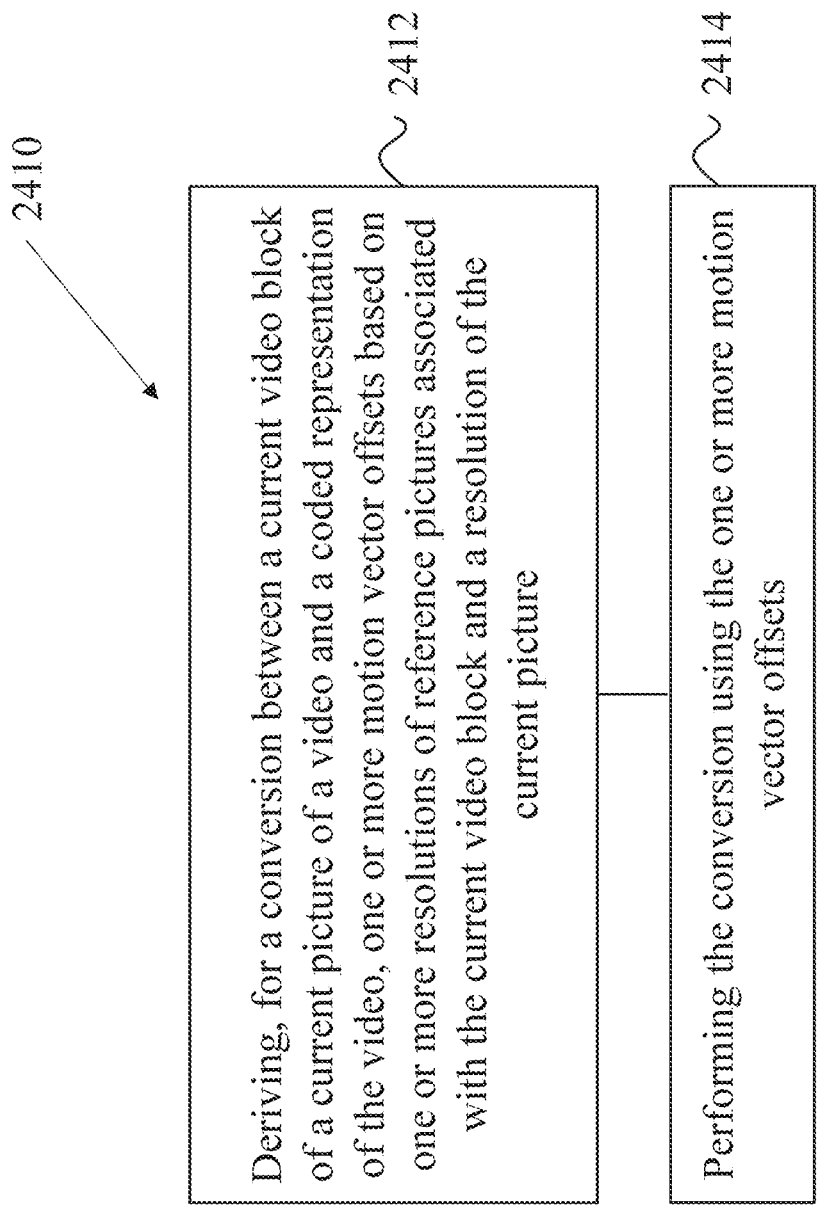
FIGS. 24A to 24E show flowcharts of example methods for video processing in accordance with some implementations of the disclosed technology.

FIG. 24A shows a flowchart of an exemplary method for video processing. Referring to FIG. 24A, the method 2410 includes, at step 2412, deriving, for a conversion between a current video block of a current picture of a video and a coded representation of the video, one or more motion vector offsets based on one or more resolutions of reference pictures associated with the current video block and a resolution of the current picture. The method 2410 further includes, at step 2414, performing the conversion using the one or more motion vector offsets.

Figure 24B:
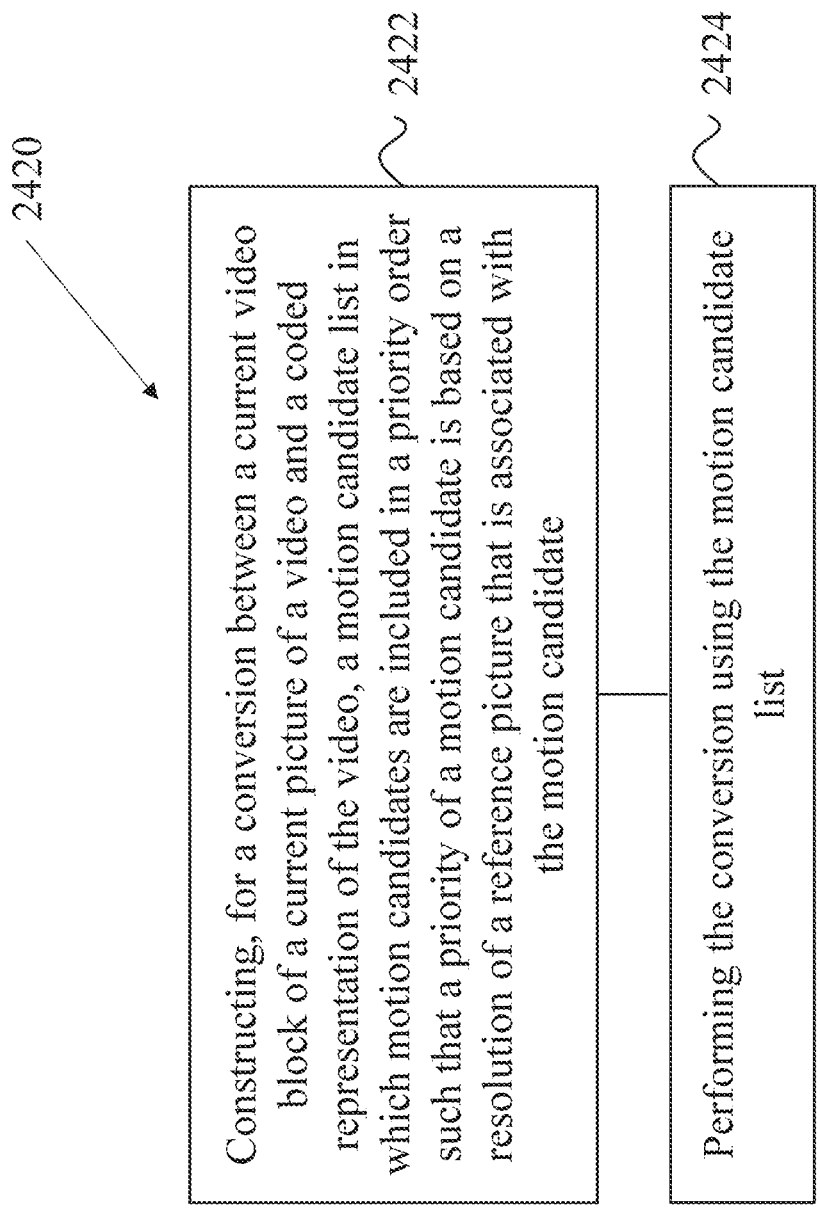

FIG. 24B shows a flowchart of an exemplary method for video processing. Referring to FIG. 24B, the method 2420 includes, at step 2422, constructing, for a conversion between a current video block of a current picture of a video and a coded representation of the video, a motion candidate list in which motion candidates are included in a priority order such that a priority of a motion candidate is based on a resolution of a reference picture that is associated with the motion candidate. The method 2420 further includes, at step 2424, performing the conversion using the motion candidate list.

Figure 24C:
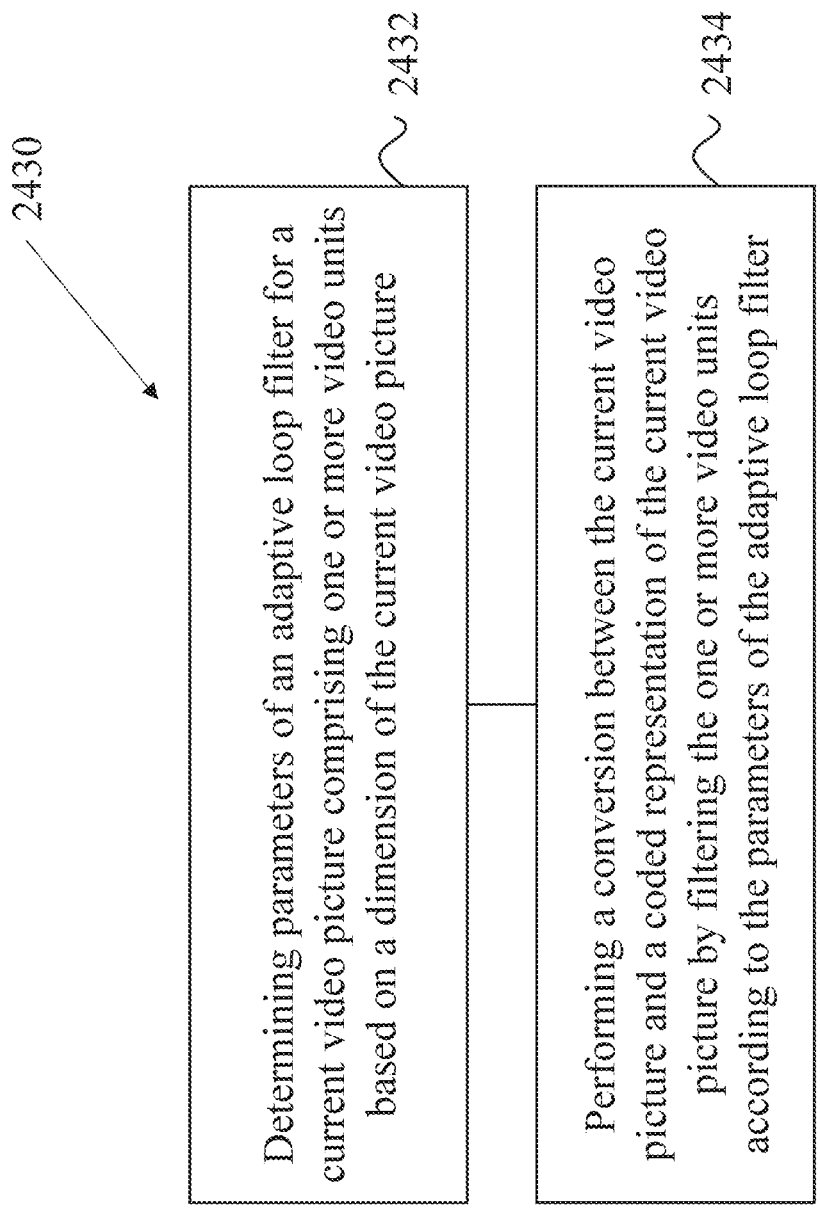

FIG. 24C shows a flowchart of an exemplary method for video processing. Referring to FIG. 24C, the method 2430 includes, at step 2432, determining parameters of an adaptive loop filter for a current video picture comprising one or more video units based on a dimension of the current video picture. The method 2430 further includes, at step 2434, performing a conversion between the current video picture and a coded representation of the current video picture by filtering the one or more video units according to the parameters of the adaptive loop filter.

Figure 24D:
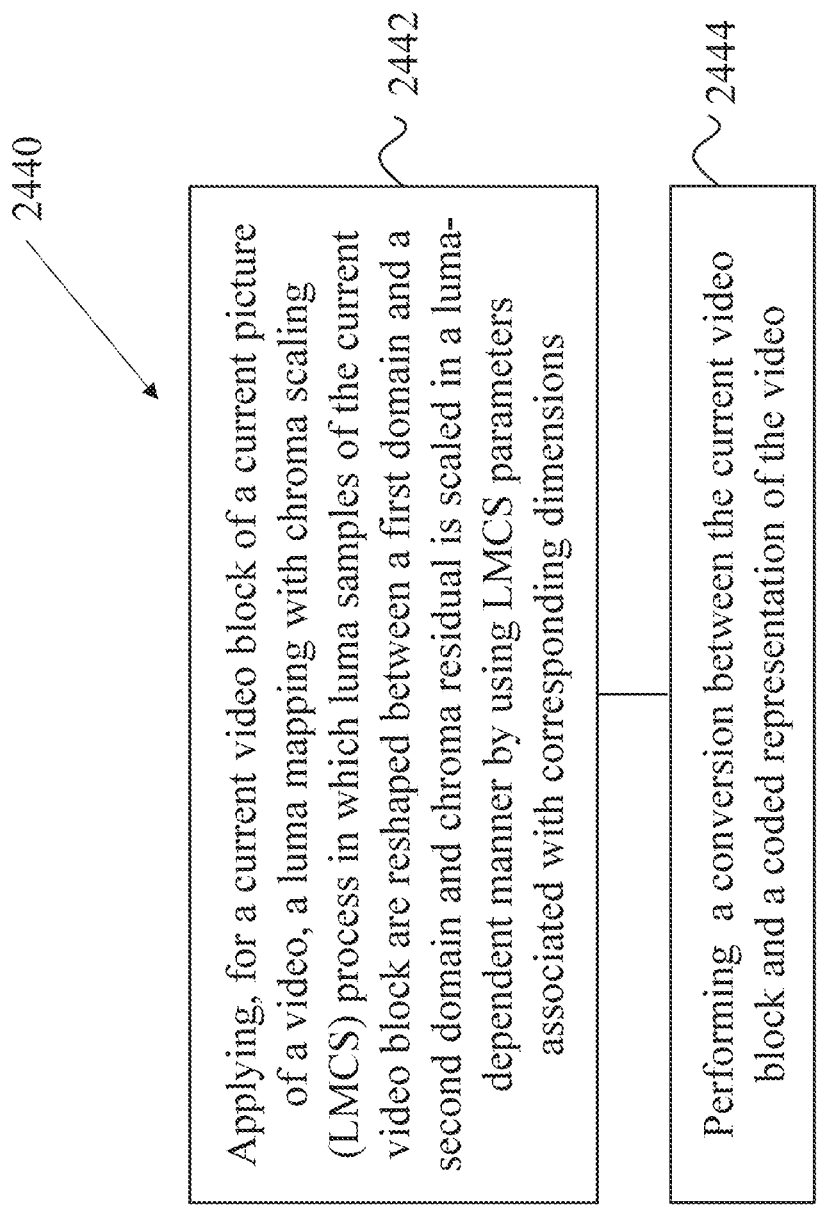

FIG. 24D shows a flowchart of an exemplary method for video processing. Referring to FIG. 24D, the method 2440 includes, at step 2442, applying, for a current video block of a current picture of a video, a luma mapping with chroma scaling (LMCS) process in which luma samples of the current video block are reshaped between a first domain and a second domain and chroma residual is scaled in a luma-dependent manner by using LMCS parameters associated with corresponding dimensions. The method 2440 further includes, at step 2444, performing a conversion between the current video block and a coded representation of the video.

Figure 24E:
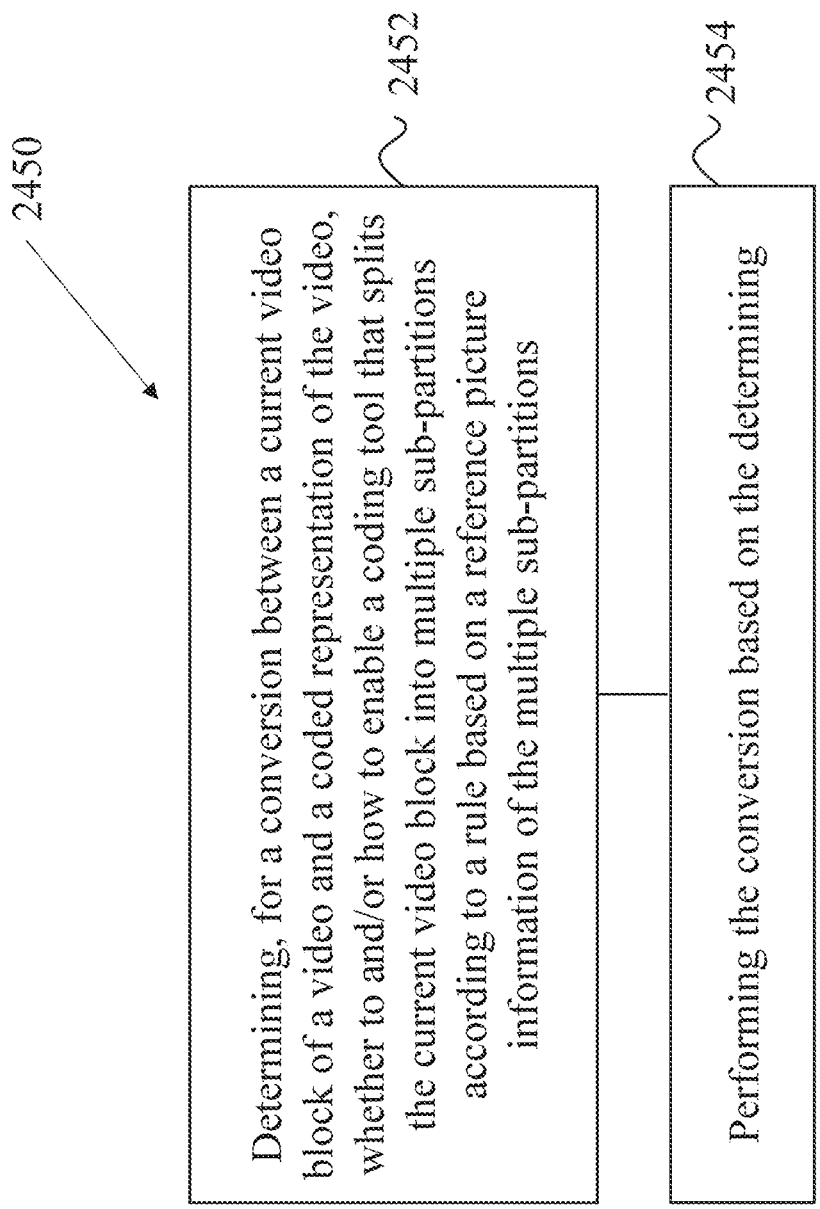

FIG. 24E shows a flowchart of an exemplary method for video processing. Referring to FIG. 24E, the method 2450 includes, at step 2452, determining, for a conversion between a current video block of a video and a coded representation of the video, whether to and/or how to enable a coding tool that splits the current video block into multiple sub-partitions according to a rule based on a reference picture information of the multiple sub-partitions. The method 2450 further includes, at step 2454, performing the conversion based on the determining.

Figure 25A:
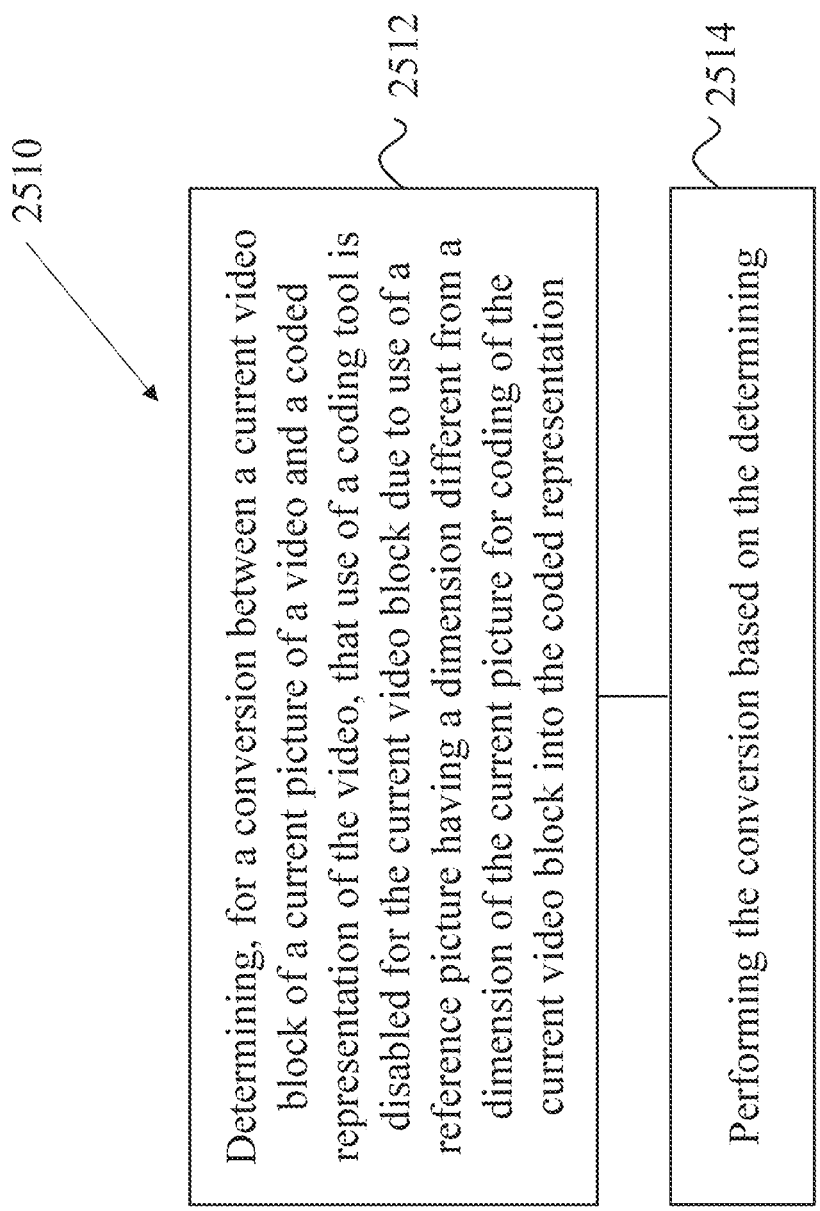

FIG. 25A shows a flowchart of an exemplary method for video processing. Referring to FIG. 25A, the method 2510 includes, at step 2512, determining, for a conversion between a current video block of a current picture of a video and a coded representation of the video, that use of a coding tool is disabled for the current video block due to use of a reference picture having a dimension different from a dimension of the current picture for coding of the current video block into the coded representation. The method 2510 further includes, at step 2514, performing the conversion based on the determining.

Figure 25B:
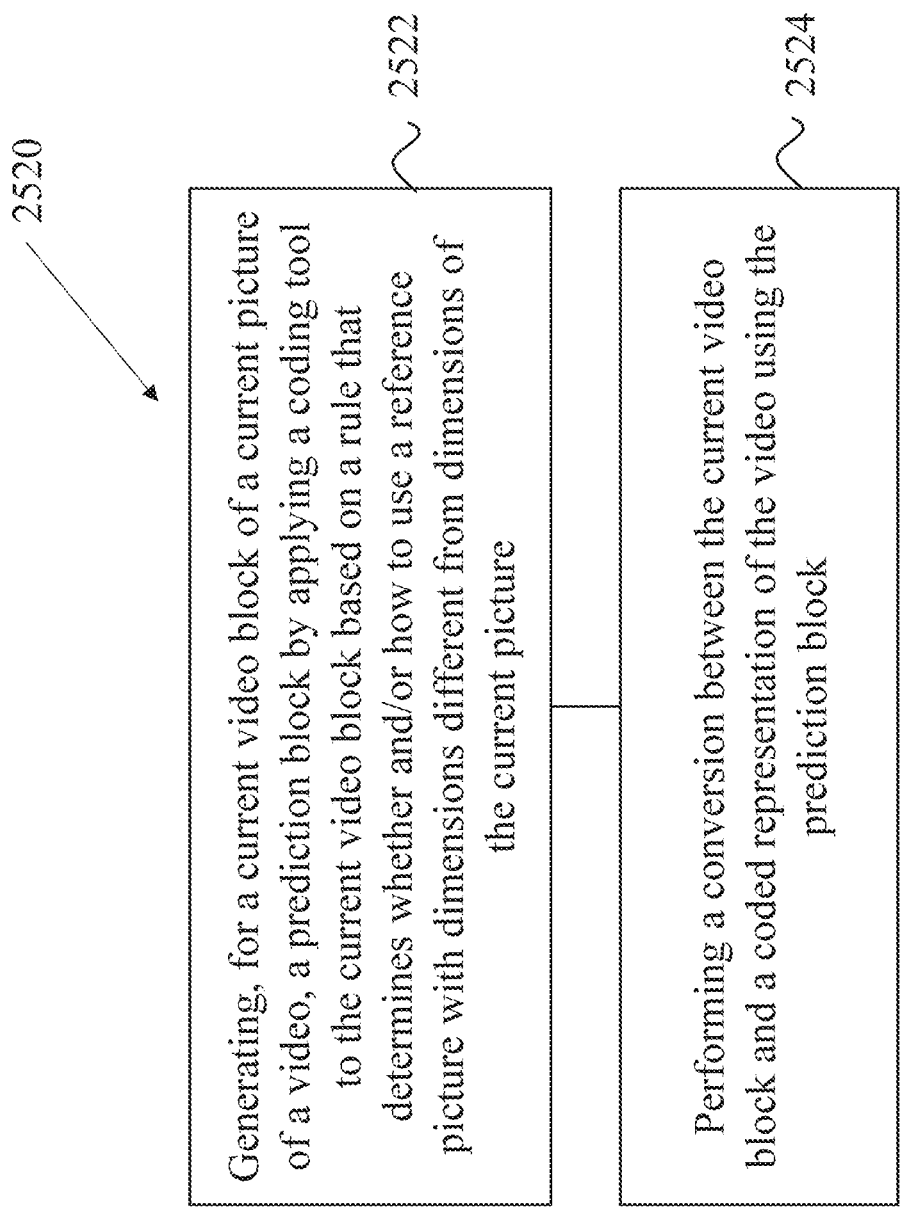

FIG. 25B shows a flowchart of an exemplary method for video processing. Referring to FIG. 25B, the method 2520 includes, at step 2522, generating, for a current video block of a current picture of a video, a prediction block by applying a coding tool to the current video block based on a rule that determines whether and/or how to use a reference picture with dimensions different from dimensions of the current picture. The method 2520 further includes, at step 2524, performing a conversion between the current video block and a coded representation of the video using the prediction block.

Figure 25C:
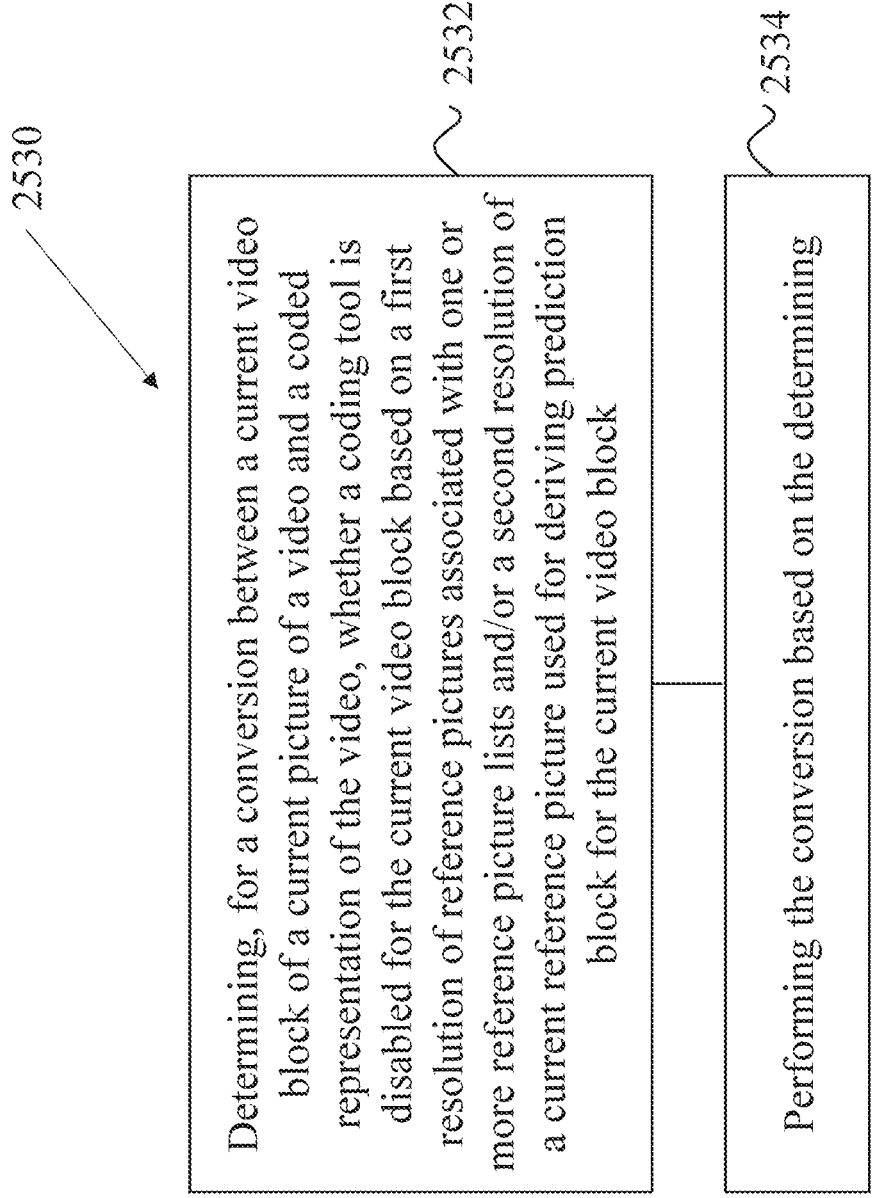

FIG. 25C shows a flowchart of an exemplary method for video processing. Referring to FIG. 25C, the method 2530 includes, at step 2532, determining, for a conversion between a current video block of a current picture of a video and a coded representation of the video, whether a coding tool is disabled for the current video block based on a first resolution of reference pictures associated with one or more reference picture lists and/or a second resolution of a current reference picture used for deriving prediction block for the current video block. The method 2530 further includes, at step 2534, performing the conversion based on the determining.

Figure 25D:
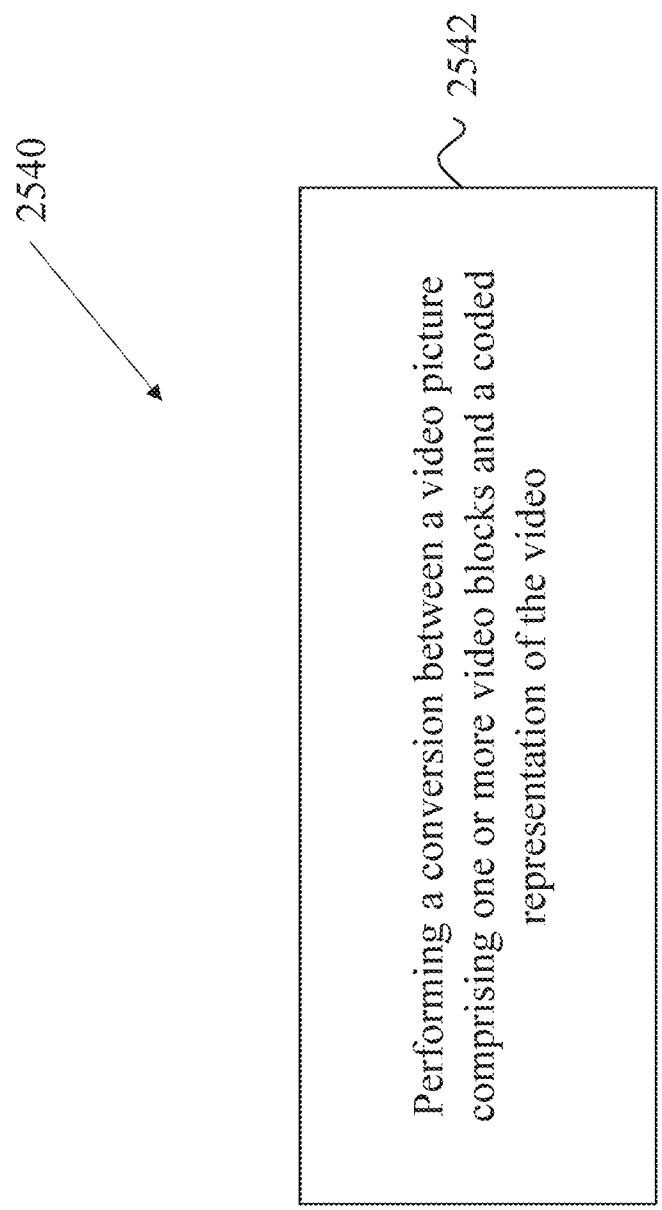

FIG. 25D shows a flowchart of an exemplary method for video processing. Referring to FIG. 25D, the method 2540 includes, at step 2542, performing a conversion between a video picture comprising one or more video blocks and a coded representation of the video. In some implementations, at least some of the one or more video blocks are coded by referring to a reference picture list for the video picture according to a rule and the rule specifies that the reference picture list contains reference pictures having at most K different resolutions, where K is an integer.

Figure 25E:
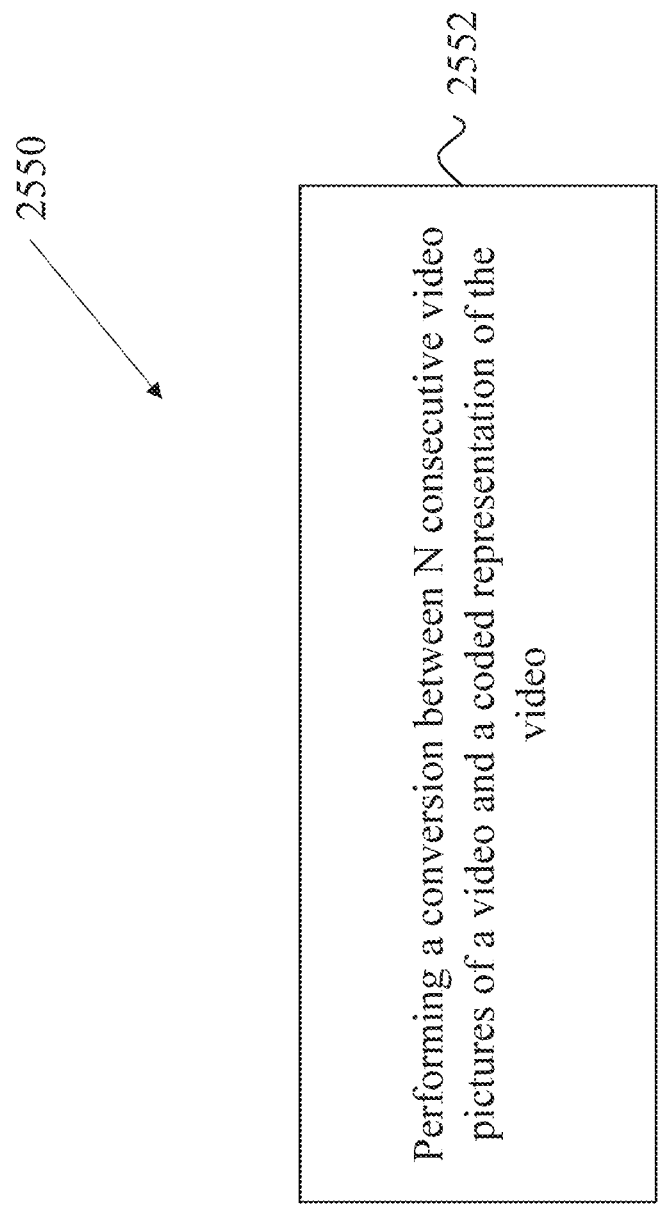

FIG. 25E shows a flowchart of an exemplary method for video processing. Referring to FIG. 25E, the method 2550 includes, at step 2552, performing a conversion between N consecutive video pictures of a video and a coded representation of the video. In some implementations, the N consecutive video pictures include one or more video blocks that are coded with different resolutions according to a rule and the rule specifies that at most K different resolutions are allowed for the N consecutive pictures, where N and K are integers.

Figure 25F:
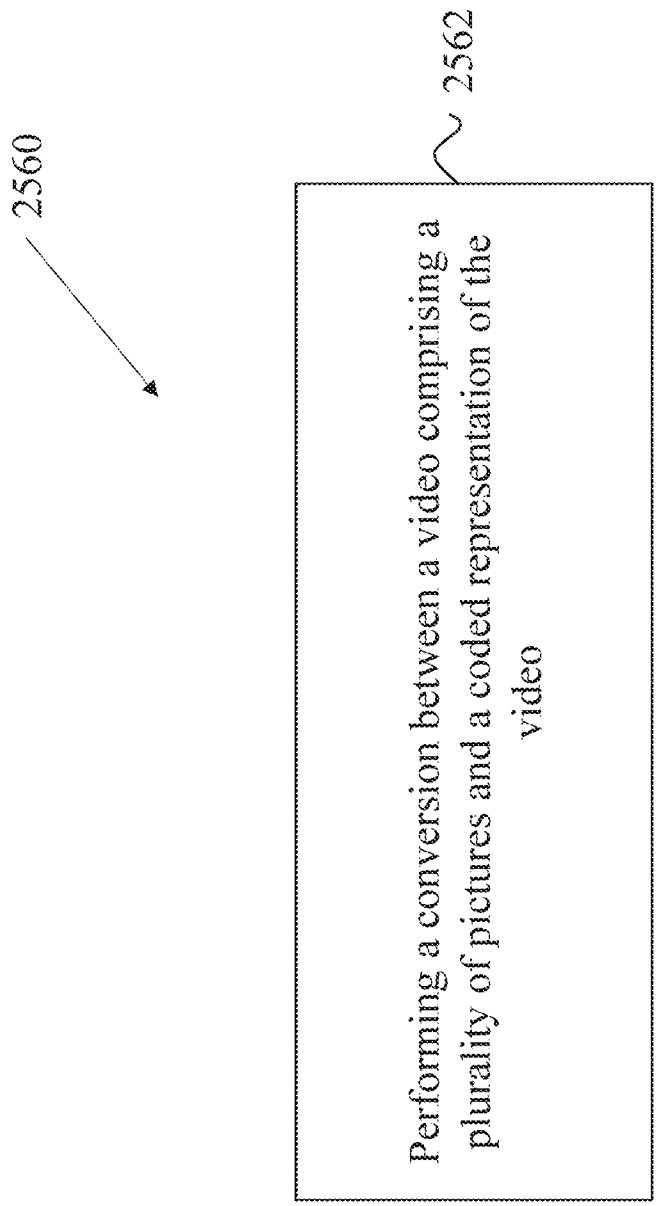

FIG. 25F shows a flowchart of an exemplary method for video processing. Referring to FIG. 25F, the method 2560 includes, at step 2562, performing a conversion between a video comprising a plurality of pictures and a coded representation of the video. In some implementations, at least some of the plurality of pictures are coded in the coded representation using different coded video resolutions, and the coded representation conforms to a format rule that a first coded resolution of a previous frame is changed to a second coded resolution of a next frame after the previous frame in an order only in a case that the next frame is coded as an intra frame.

FIG. 25G shows a flowchart of an exemplary method for video processing. Referring to FIG. 25G, the method 2570 includes, at step 2572, parsing a coded representation of a video to determine that a current video block of a current picture of the video refers to a reference picture that is associated with a resolution different from a resolution of the current picture. The method 2570 further includes, at step 2574, generating a prediction block for the current video block by converting a bi-prediction mode to a uni-prediction mode to be applied to the current video block. The method 2570 further includes, at step 2576, generating the video from the coded representation using the prediction block.

Figure 25H:
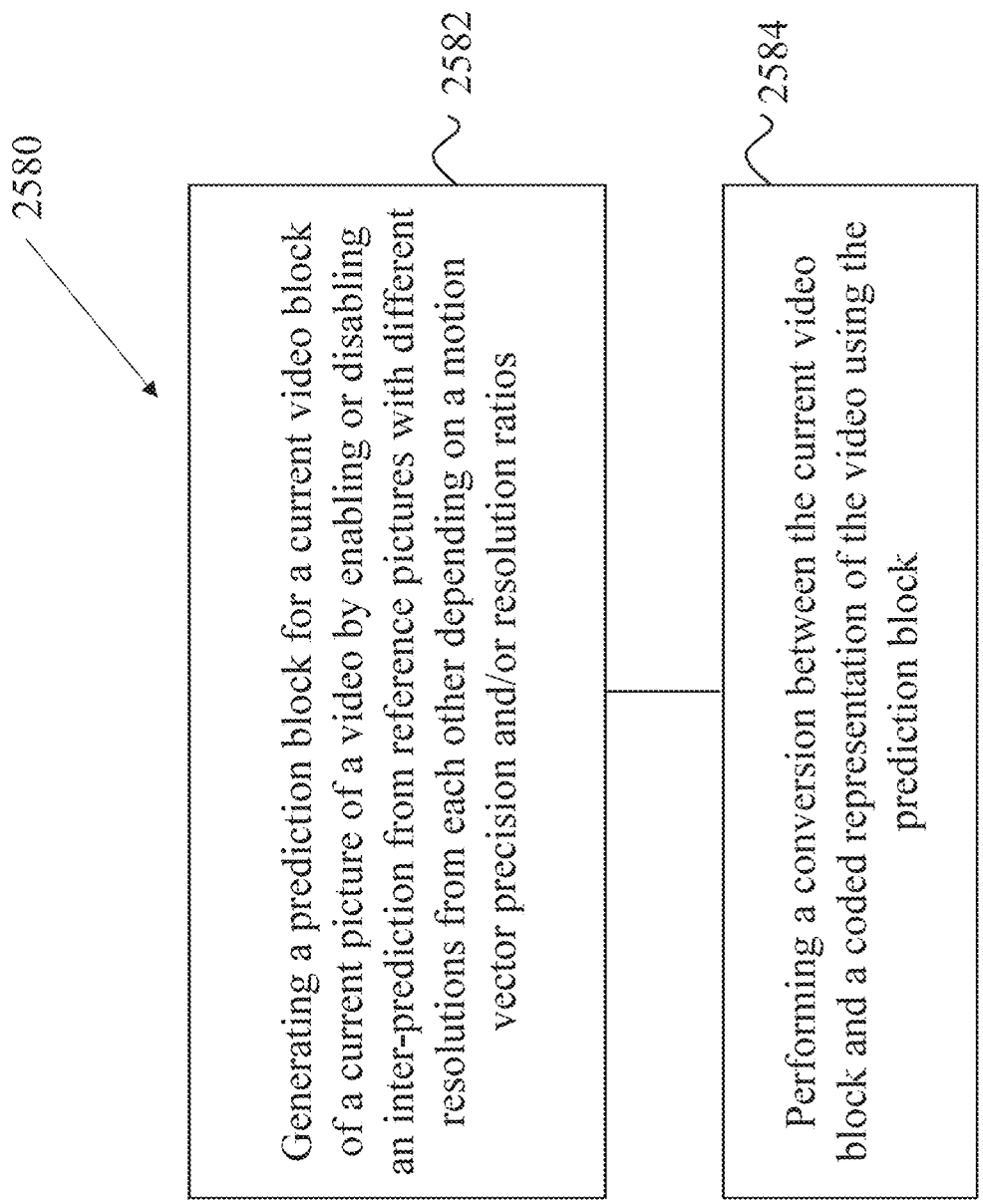

FIG. 25H shows a flowchart of an exemplary method for video processing. Referring to FIG. 25H, the method 2580 includes, at step 2582, generating a prediction block for a current video block of a current picture of a video by enabling or disabling an inter-prediction from reference pictures with different resolutions from each other depending on a motion vector precision and/or resolution ratios. The method 2580 further includes, at step 2584, performing a conversion between the current video block and a coded representation of the video using the prediction block.

Figure 25I:
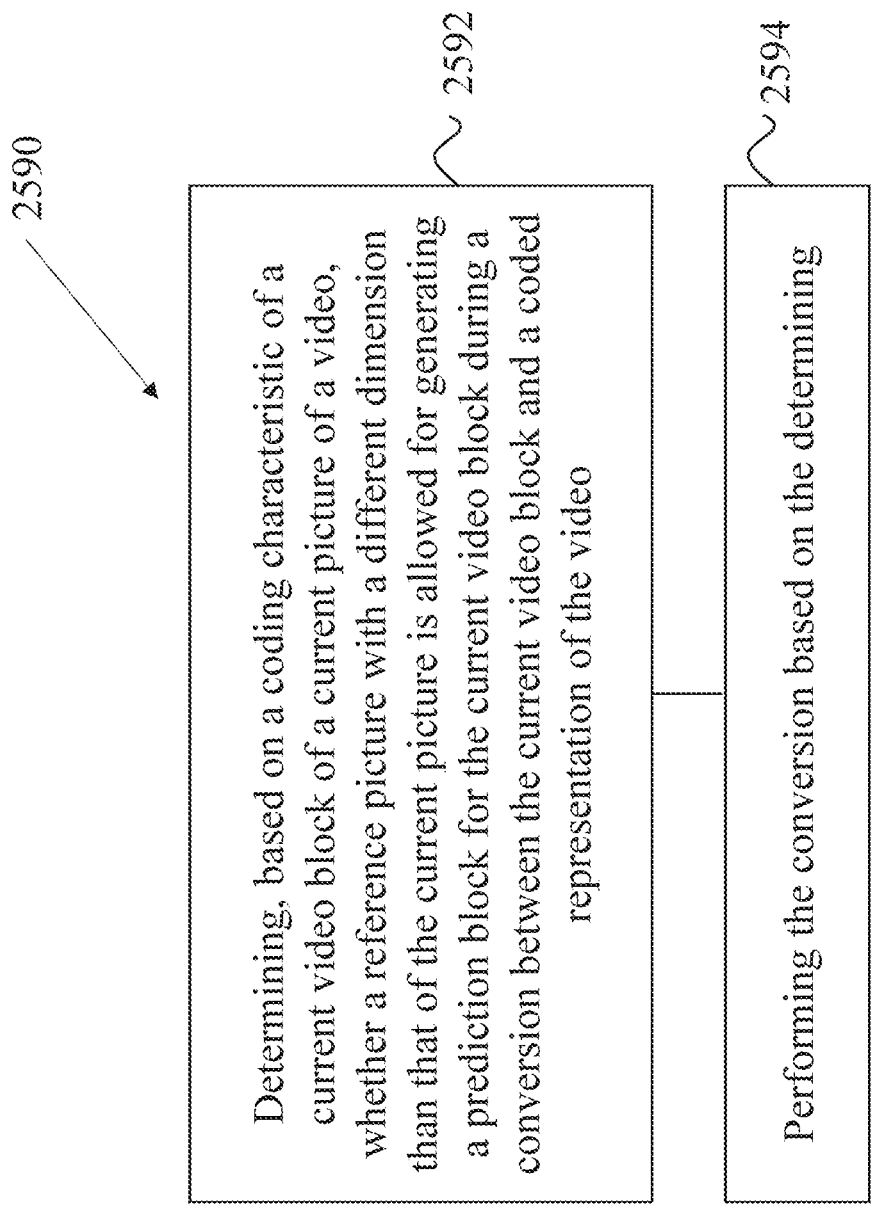

FIG. 25I shows a flowchart of an exemplary method for video processing. Referring to FIG. 25I, the method 2590 includes, at step 2592, determining, based on a coding characteristic of a current video block of a current picture of a video, whether a reference picture with a different dimension than that of the current picture is allowed for generating a prediction block for the current video block during a conversion between the current video block and a coded representation of the video. The method 2590 further includes, at step 2594, performing the conversion according to the determining.

In some embodiments, the video coding methods may be implemented using an apparatus that is implemented on a hardware platform as described with respect to FIG. 23A or 23B. It will be appreciated that the disclosed methods and techniques will benefit video encoder and/or decoder embodiments incorporated within video processing devices such as smartphones, laptops, desktops, and similar devices by allowing the use of the techniques disclosed in the present disclosure.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Here, the video block may be a logical unit corresponding to the processing operation being performed, e.g., a coding unit, a transform unit, a prediction unit, and so on.

First set of clauses describe certain features and aspects of the disclosed techniques listed in the previous section.

1. A method for video processing, comprising: deriving, during conversion between a current video block and a bitstream representation of the current video block, motion vector offsets based on a resolution of reference pictures associated with the current video block and a resolution of a current picture; and performing the conversion using the motion vector offsets.

2. The method of clause 1, wherein the deriving motion vector offset includes: deriving a first motion vector offset referring to a first reference picture; and deriving a second motion vector offset referring to a second reference picture based on the first motion vector offset.

3. The method of clause 1, further comprising: performing, for the current video block, a motion candidate list construction process based on a reference picture resolution associated with a spatial, temporal, or history motion candidates.

4. The method of clause 1, wherein whether to or how to update a look up table depends on a reference picture resolution associated with a decoded motion candidate.

5. The method of clause 1, further comprising: performing, for the current picture, a filtering operation with adaptive loop filter (ALF) parameters associated with corresponding dimensions.

6. The method of clause 5, wherein the ALF parameters include first ALF parameters associated with first corresponding dimensions and second ALF parameters associated with second corresponding dimensions, the second ALF parameters being inherited or predicted from the first ALF parameters.

7. The method of clause 1, further comprising reshaping samples in the current picture with Luma Mapping Chroma Scaling (LMCS) parameters associated with corresponding dimensions.

8. The method of clause 7, wherein the LMCS parameters include first LMCS parameters associated with first corresponding dimensions and second LMCS parameters associated with second corresponding dimensions, the second LMCS parameters being inherited or predicted from the first LMCS parameters.

9. The method of clause 5 or 7, wherein the ALF parameters or the LMCS parameters signaled in a video unit is associated with one or multiple picture dimensions.

10. The method of clause 1, further comprising disabling a coding tool for the current video block when the current video block refers to at least one reference picture with different dimensions to the current picture.

11. The method of clause 10, further including skipping or omitting a merge candidate referring to a reference picture with different dimensions from dimensions of the current picture.

12. The method of clause 1, further including applying a coding tool after scaling two reference blocks or two reference pictures based on the resolution of the reference pictures and the resolution of the current picture or after scaling two MVs or Motion Vector Differences (MVDs) based on the resolution of the reference pictures and the resolution of the current picture.

13. The method of clause 1, wherein the current picture includes no more than K different resolutions, K being a natural number.

14. The method of clause 13, wherein the K different resolutions are allowed for N consecutive pictures, N being a natural number.

15. The method of clause 1, further including applying a resolution change to the current picture that is an Intra picture.

16. The method of clause 1, further including converting a bi-prediction to a uni-prediction when one or two reference pictures of the current video block has a different resolution from that of the current picture.

17. The method of clause 1, further including enabling or disabling an inter-prediction from the reference pictures in different resolutions depending on at least one of a motion vector precision or a resolution ratio between a current block dimension and a reference block dimension.

18. The method of clause 1, further including applying a bi-prediction depending on whether both reference pictures or one reference picture is with different resolution from that of the current picture.

19. The method of clause 1, wherein whether the current video block refers to a reference picture with different dimensions from that of the current picture depends on at least one of a size of the current video block or a block prediction mode.

20. The method of clause 1, wherein the performing of the conversion includes generating the current video block from the bitstream representation.

21. The method of clause 1, wherein the performing of the conversion includes generating the bitstream representation from the current video block.

22. An apparatus in a video system comprising a processor and a non-transitory memory with instructions thereon, wherein the instructions upon execution by the processor, cause the processor to implement the method in any one of clauses 1 to 21.

23. A computer program product stored on a non-transitory computer readable media, the computer program product including program code for carrying out the method in any one of clauses 1 to 21.

Second set of clauses describe certain features and aspects of the disclosed techniques listed in the previous section, including, for example, Example Implementation 1-7.

1. A video processing method, comprising: deriving, for a conversion between a current video block of a current picture of a video and a coded representation of the video, one or more motion vector offsets based on one or more resolutions of reference pictures associated with the current video block and a resolution of the current picture; and performing the conversion using the one or more motion vector offsets.

2. The method of clause 1, wherein the one or more motion vector offsets correspond to motion vector offsets in a merge with motion vector difference (MMVD) that includes a motion vector expression including a distance index specifying a distance between two motion candidates or a symmetrical motion vector difference (SMVD) that processes motion vector difference symmetrically.

3. The method of clause 1, wherein the one or more motion vector offsets correspond to refined motion vectors used in a decoder side derivation process.

4. The method of clause 1, wherein the deriving the one or more vector offset includes: deriving a first motion vector offset referring to a first reference picture; and deriving a second motion vector offset referring to a second reference picture based on the first motion vector offset.

5. The method of any of clauses 1-4, wherein the one or more motion vector offsets include a first offset (offset0) and a second offset (offset1), and wherein the performing of the conversion includes calculating motion vectors using a SatShift formula that is defined as:

$$SatShift(x, n) = \begin{cases} (x + offsset0) \gg n & \text{if } x \geq 0 \\ -((-x + offset1) \gg n) & \text{if } x < 0 \end{cases}$$

6. The method of any of clauses 1 to 5, wherein the performing of the conversion includes generating the coded representation from the video or generating the video from the coded representation.

7. A video processing method, comprising: constructing, for a conversion between a current video block of a current picture of a video and a coded representation of the video, a motion candidate list in which motion candidates are included in a priority order such that a priority of a motion candidate is based on a resolution of a reference picture that is associated with the motion candidate; and performing the conversion using the motion candidate list.

8. The method of clause 7, wherein the motion candidate referring to the reference picture with a higher resolution has a higher priority than another motion candidate referring to another reference picture with a lower resolution.

9. The method of clause 7, wherein the motion candidate referring to the reference picture with a higher resolution is put in the motion candidate list before another merge candidate referring to another reference picture with a lower resolution.

10. The method of clause 7, wherein the constructing the motion candidate list is performed not to include a motion candidate referring to a reference picture with a lower resolution than a resolution of a current picture including the current video block.

11. The method of clause 7, wherein whether to and/or how to update a look up table depends on the resolution of the reference picture associated with a decoded motion candidate.

12. The method of clause 11, wherein the reference picture associated the decoded motion candidate and having a different resolution from a resolution of a current picture including the current video block, the motion candidate from the reference picture is disallowed to update the look up table.

13. The method of any of clauses 7-12, wherein the motion candidate is a temporal motion candidate.

14. The method of any of clauses 7-12, wherein the motion candidate is a spatial motion candidate.

15. The method of any of clauses 7-12, wherein the motion candidate is a history-based motion candidate.

16. The method of any of clauses 7 to 15, wherein the performing of the conversion includes generating the coded representation from the video or generating the video from the coded representation.

17. A video processing method, comprising: determining parameters of an adaptive loop filter for a current video picture comprising one or more video units based on a dimension of the current video picture; and performing a conversion between the current video picture and a coded representation of the current video picture by filtering the one or more video units according to the parameters of the adaptive loop filter.

18. The method of clause 17, wherein the parameters are signaled in a video unit and associated with one or more picture dimensions.

19. The method of clause 17, wherein a video unit used to signal the parameters are associated with one or more picture dimensions.

20. The method of clause 17, wherein the parameters signaled in a video unit and associated with same dimensions are applied to the current picture.

21. The method of clause 17, wherein the coded representation includes a data structure that signals at least one of a resolution, an index of a picture parameter set (PPS), an indication of the resolution.

22. The method of clause 17, wherein the parameters are inherited or predicted from those used for another picture with a same resolution of the current picture.

23. The method of clause 17, wherein the parameters include a first set of the parameters associated with first corresponding dimensions and a second set of the parameters associated with second corresponding dimensions, the second set of the parameters being inherited or predicted from the first set of the parameters.

24. The method of clause 23, wherein the first corresponding dimensions are same as the second corresponding dimensions.

25. The method of clause 23, wherein the first corresponding dimensions are different from the second corresponding dimensions.

26. The method of any of clauses 17 to 25, wherein the performing of the conversion includes generating the coded representation from the video or generating the video from the coded representation.

27. A video processing method, comprising: applying, for a current video block of a current picture of a video, a luma mapping with chroma scaling (LMCS) process in which luma samples of the current video block are reshaped between a first domain and a second domain and chroma residual is scaled in a luma-dependent manner by using LMCS parameters associated with corresponding dimensions; and performing a conversion between the current video block and a coded representation of the video.

28. The method of clause 27, wherein the LMCS parameters are signaled in a video unit and associated with one or more picture dimensions.

29. The method of clause 27, wherein a video unit used to signal the LMCS parameters are associated with one or more picture dimensions.

30. The method of clause 27, wherein the LMCS parameters signaled in a video unit and associated with same dimensions are applied to the current picture.

31. The method of clause 27, wherein the coded representation includes a data structure that signals at least one of a resolution, an index of a picture parameter set (PPS), an indication of the resolution.

32. The method of clause 27, wherein the LMCS parameters are inherited or predicted from those used for another picture with a same resolution of the current picture.

33. The method of clause 27, wherein the LMCS parameters include first LMCS parameters associated with first corresponding dimensions and second LMCS parameters associated with second corresponding dimensions, the second LMCS parameters being inherited or predicted from the first LMCS parameters.

34. The method of clause 33, wherein the first corresponding dimensions are same as the second corresponding dimensions.

35. The method of clause 33, wherein the first corresponding dimensions are different from the second corresponding dimensions.

36. The method of any of clauses 27 to 35, wherein the performing of the conversion includes generating the coded representation from the video or generating the video from the coded representation.

37. A video processing method, comprising: determining, for a conversion between a current video block of a video and a coded representation of the video, whether to and/or how to enable a coding tool that splits the current video block into multiple sub-partitions according to a rule based on a reference picture information of the multiple sub-partitions; and performing the conversion based on the determining.

38. The method of clause 37, wherein the coding tool corresponds to a triangular prediction mode (TPM) in which at least one of the sub-partitions is a non-rectangular partition or an inter prediction with geometry partitioning (GEO) in which a video block can be split using a non-horizontal or a non-vertical line.

39. The method of clause 37, wherein the rule specifies whether to and/or how to enable the coding tool based on whether a resolution of one of two reference pictures corresponding to two sub-partitions is same or different from a resolution of a current picture including the current video block.

40. The method of clause 39, wherein the rule specifies not to enable the coding tool in a case that at least one of the two reference pictures is associated with a different resolution from the resolution of the current picture.

41. The method of clause 39, wherein the rule specifies not to enable the coding tool in a case that the two reference pictures are associated with different resolutions from each other.

42. The method of clause 39, wherein the rule specifies not to enable the coding tool in a case that the two reference pictures are associated with resolutions different from the resolution of the current picture.

43. The method of clause 39, wherein the rule specifies not to enable the coding tool in a case that the two reference pictures are associated with a same resolution that is different from the resolution of the current picture.

44. The method of clause 39, wherein the rule specifies not to enable the coding tool in a case that at least one of the two reference pictures is associated with a resolution different from the resolution of the current picture.

45. The method of clause 37, wherein the rule specifies whether to and/or how to enable the coding tool based on whether two reference pictures corresponding to two sub-partitions are same reference picture or not.

46. The method of clause 37, wherein the rule specifies whether to and/or how to enable the coding tool based on whether two reference pictures corresponding to two sub-partitions are in a same reference list or not.

47. The method of clause 37, wherein the rule specifies to always disable the coding tool if a reference picture resampling is enabled in a video unit of the video.

48. The method of any of clauses 37 to 47, wherein the performing of the conversion includes generating the coded representation from the video or generating the video from the coded representation.

49. An apparatus in a video system comprising a processor and a non-transitory memory with instructions thereon, wherein the instructions upon execution by the processor, cause the processor to implement the method in any one of clauses 1 to 48.

50. A computer program product stored on a non-transitory computer readable media, the computer program product including program code for carrying out the method in any one of clauses 1 to 48.

Third set of clauses describe certain features and aspects of the disclosed techniques listed in the previous section, including, for example, Example Implementation 8-13 and 15.

1. A video processing method, comprising: determining, for a conversion between a current video block of a current picture of a video and a coded representation of the video, that use of a coding tool is disabled for the current video block due to use of a reference picture having a dimension different from a dimension of the current picture for coding of the current video block into the coded representation; and performing the conversion based on the determining.

2. The method of clause 1, wherein information related to the coding tool is not signaled in a case that the use of the coding tool is disabled.

3. The method of clause 1, wherein motion information of the current video block is not inserted into a history-based motion vector prediction (HMVP) table, wherein the HMVP table includes one or more entries corresponding to motion information of one or more previously processed blocks.

4. The method of any of clauses 1 to 3, wherein the coding tool corresponds to a decoder side motion vector refinement (DMVR), a bi-directional optical flow (BDOF), an affine prediction, a triangular prediction mode, a symmetric motion vector difference (SMVD), a merge mode with motion vector differences (MMVD), an inter-intra prediction, a local illumination compensation (LIC), a history-based motion vector prediction (HMVP), a multiple Transform Set (MTS), a sub-block transform (SBT), a prediction refinement with optical flow (PROF), a low frequency non-square transform (LFNST), or filtering tool.

5. The method of any of clauses 1 to 4, wherein the dimension comprises at least one of a width and a height of the current picture.

6. The method of any of clauses 1 to 5, wherein the performing of the conversion includes generating the coded representation from the video or generating the video from the coded representation.

7. A video processing method, comprising: generating, for a current video block of a current picture of a video, a prediction block by applying a coding tool to the current video block based on a rule that determines whether and/or how to use a reference picture with dimensions different from dimensions of the current picture; and performing a conversion between the current video block and a coded representation of the video using the prediction block.

8. The method of clause 7, wherein the rule specifies not to use the reference picture to generate the prediction block due to the coding tool applied to the current video block.

9. The method of clause 8, wherein a merge candidate referring to the reference picture is skipped or not put into a merge candidate list.

10. The method of clause 8, wherein a reference index corresponding to the reference picture is skipped or not allowed to be signaled.

11. The method of clause 7, wherein the rule specifies to scale, before applying the coding tool, the reference picture according to a resolution of the current picture and a resolution of the reference picture.

12. The method of clause 7, wherein the rule specifies to scale, before applying the coding tool, motion vectors or motion vector differences according to a resolution of the current picture and a resolution of the reference picture.

13. The method of any of clauses 7 to 12, wherein the coding tool corresponds to a decoder side motion vector refinement (DMVR), a bi-directional optical flow (BDOF), an affine prediction, a triangular prediction mode, a symmetric motion vector difference (SMVD), a merge mode with motion vector differences (MMVD), an inter-intra prediction, a local illumination compensation (LIC), a history-based motion vector prediction (HMVP), a multiple Transform Set (MTS), a sub-block transform (SBT), a prediction refinement with optical flow (PROF), a low frequency non-square transform (LFNST), or filtering tool.

14. The method of any of clauses 7 to 12, wherein the performing of the conversion includes generating the coded representation from the video or generating the video from the coded representation.

15. A video processing method, comprising: determining, for a conversion between a current video block of a current picture of a video and a coded representation of the video, whether a coding tool is disabled for the current video block based on a first resolution of reference pictures associated with one or more reference picture lists and/or a second resolution of a current reference picture used for deriving prediction block for the current video block; and performing the conversion based on the determining.

16. The method of clause 15, wherein the determining determines that the coding tool is disabled for one reference picture list and that the coding tool is enabled for another reference picture list.

17. The method of clause 15, wherein the determining determines that the coding tool is disabled for a first reference picture of a reference picture list and that the coding tool is enabled for a second reference picture of the reference picture list or of another reference picture list.

18. The method of clause 15, wherein the determining determines whether the coding tool is disabled for a first reference picture list without considering a second reference picture list different from the first reference picture list.

19. The method of clause 18, wherein the determining determines whether the coding tool is disabled based on a reference picture of the first reference picture list and the current picture.

20. The method of clause 18, wherein the determining determines whether the coding tool is disabled for the first reference picture list in a case that a reference picture associated with the first reference picture list is different from the current picture.

21. The method of clause 15, wherein the determining determines whether the coding tool is disabled further based on other resolutions of the reference pictures associated with the one or more reference picture lists and/or the current picture.

22. The method of clause 21, wherein the determining determines the coding tool is disabled in a case that at least one of the reference pictures has different resolutions as a resolution of the current picture.

23. The method of clause 21, wherein determining determines the coding tool is not disabled in a case that at least one of the reference pictures has different resolutions as a resolution of the current picture and that the reference pictures are associated with a same resolution.

24. The method of clause 21, wherein determining determines the coding tool is disabled in a case that at least one of the reference pictures has different resolutions as a resolution of the current picture and that the reference pictures are associated with different resolutions from each other.

25. The method of any of clauses 15 to 24, wherein the coding tool corresponds to a decoder side motion vector refinement (DMVR), a bi-directional optical flow (BDOF), an affine prediction, a triangular prediction mode, a symmetric motion vector difference (SMVD), a merge mode with motion vector differences (MMVD), an inter-intra prediction, a local illumination compensation (LIC), a history-based motion vector prediction (HMVP), a multiple Transform Set (MTS), a sub-block transform (SBT), a prediction refinement with optical flow (PROF), a low frequency non-square transform (LFNST), or filtering tool.

26. The method of any of clauses 15 to 25, wherein the performing of the conversion includes generating the coded representation from the video or generating the video from the coded representation.

27. A video processing method, comprising: performing a conversion between a video picture comprising one or more video blocks and a coded representation of the video, wherein at least some of the one or more video blocks are coded by referring to a reference picture list for the video picture according to a rule, wherein the rule specifies that the reference picture list contains reference pictures having at most K different resolutions, where K is an integer.

28. The method of clause 27, wherein K is equal to 2.

29. The method of clause 27 or 28, wherein the performing of the conversion includes generating the coded representation from the video or generating the video from the coded representation.

30. A video processing method, comprising: performing a conversion between N consecutive video pictures of a video and a coded representation of the video, wherein the N consecutive video pictures include one or more video blocks that are coded with different resolutions according to a rule, wherein the rule specifies that at most K different resolutions are allowed for the N consecutive pictures, where N and K are integers.

31. The method of clause 30, wherein N and K are equal to 3.

32. The method of clause 30, wherein N is equal to 10 and K is equal to 3.

33. The method of clause 30, wherein the K different resolutions are allowed in a group of picture (GOP) in the coded representation.

34. The method of clause 30, wherein the K different resolutions are allowed between two pictures with a same temporal layer identification.

35. The method of any of clauses 30 to 34, wherein the performing of the conversion includes generating the coded representation from the video or generating the video from the coded representation.

36. A video processing method, comprising: performing a conversion between a video comprising a plurality of pictures and a coded representation of the video, wherein at least some of the plurality of pictures are coded in the coded representation using different coded video resolutions, and wherein the coded representation conforms to a format rule that a first coded resolution of a previous frame is changed to a second coded resolution of a next frame after the previous frame in an order only in a case that the next frame is coded as an intra frame.

37. The method of clause 36, wherein the order corresponds to an encoding order by which the plurality of pictures is encoded.

38. The method of clause 36, wherein the order corresponds to a decoding order by which the plurality of pictures is decoded.

39. The method of clause 36, wherein the order corresponds to a display order by which the plurality of pictures is displayed after decoding.

40. The method of any of clauses 36 to 39, wherein the intra frame is an intra random access point picture.

41. The method of any of clauses 36 to 39, wherein the intra frame is an instantaneous decoding refresh (IDR) frame.

42. The method of any of clauses 36 to 41, wherein the performing of the conversion includes generating the coded representation from the video or generating the video from the coded representation.

43. A video processing method, comprising: parsing a coded representation of a video to determine that a current video block of a current picture of the video refers to a reference picture that is associated with a resolution different from a resolution of the current picture; generating a prediction block for the current video block by converting a bi-prediction mode to a uni-prediction mode to be applied to the current video block; and generating the video from the coded representation using the prediction block.

44. The method of clause 43, wherein the generating the prediction block includes discarding a prediction from a list with the reference picture associated with the resolution different from the resolution of the current picture.

45. A video processing method, comprising: generating a prediction block for a current video block of a current picture of a video by enabling or disabling an inter-prediction from reference pictures with different resolutions from each other depending on a motion vector precision and/or resolution ratios; and performing a conversion between the current video block and a coded representation of the video using the prediction block.

46. The method of clause 45, wherein the inter-prediction is enabled in a case that motion vectors scaled according to the resolution ratios point to integer positions.

47. The method of clause 45, wherein the inter-prediction is enabled in a case that motion vectors scaled according to the resolution ratios point to a sub-pel position.

48. The method of clause 45, wherein a bi-prediction is disabled in a case that the reference pictures are associated with resolutions different from a resolution of the current picture.

49. The method of clause 45, wherein a bi-prediction is enabled in a case that one reference picture is with a different resolution from a resolution of the current picture and another reference picture is associated with a same resolution as the resolution of the current picture.

50. The method of clause 45, wherein a uni-prediction is disallowed in a case that a reference picture is associated with a resolution different from a resolution of the current picture and that a block dimension of the current video block satisfies certain conditions.

51. The method of any of clauses 45 to 50, wherein the performing of the conversion includes generating the coded representation from the video or generating the video from the coded representation.

52. A video processing method, comprising: determining, based on a coding characteristic of a current video block of a current picture of a video, whether a reference picture with a different dimension than that of the current picture is allowed for generating a prediction block for the current video block during a conversion between the current video block and a coded representation of the video; and performing the conversion according to the determining.

53. The method of clause 52, wherein the coding characteristics include a dimension of the current video block and/or a prediction mode of the current video block.

54. The method of clause 52, wherein the determining determines that the reference picture is allowed in a case that WB>=T1 and HB>=T2, whereby WB and HB correspond to a width and a height of the current video block, respectively, and T1 and T2 are positive integers.

55. The method of clause 52, wherein the determining determines that the reference picture is allowed in a case that WB*HB>=T, whereby WB and HB correspond to a width and a height of the current video block, respectively, and T is a positive integer.

56. The method of clause 52, wherein the determining determines that the reference picture is allowed in a case that Min (WB, HB)>=T, whereby WB and HB correspond to a width and a height of the current video block, respectively, and T is a positive integer.

57. The method of clause 52, wherein the determining determines that the reference picture is allowed in a case that Max (WB, HB)>=T, whereby WB and HB correspond to a width and a height of the current video block, respectively, and T is a positive integer.

58. The method of clause 52, wherein the determining determines that the reference picture is allowed in a case that WB<=T1 and HB<=T2, whereby WB and HB correspond to a width and a height of the current video block, respectively, and T1 and T2 are positive integers.

59. The method of clause 52, wherein the determining determines that the reference picture with the dimensions different from dimensions of the current video block is allowed in a case that WB*HB<=T, whereby WB and HB correspond to a width and a height of the current video block, respectively, and T is a positive integer.

60. The method of clause 52, wherein the determining determines that the reference picture is allowed in a case that Min (WB, HB)<=T, whereby WB and HB correspond to a width and a height of the current video block, respectively, and T is a positive integer.

61. The method of clause 52, wherein the determining determines that the reference picture is allowed in a case that Max (WB, HB)<=T, whereby WB and HB correspond to a width and a height of the current video block, respectively, and T is a positive integer.

62. The method of clause 52, wherein the determining determines that the reference picture is not allowed in a case that WB<=T1 and/or HB<=T2, whereby WB and HB correspond to a width and a height of the current video block, respectively, and T1 and T2 are positive integers.

63. The method of any of clauses 52 to 62, wherein the performing of the conversion includes generating the coded representation from the video or generating the video from the coded representation.

64. An apparatus in a video system comprising a processor and a non-transitory memory with instructions thereon, wherein the instructions upon execution by the processor, cause the processor to implement the method in any one of clauses 1 to 63.

65. A computer program product stored on a non-transitory computer readable media, the computer program product including program code for carrying out the method in any one of clauses 1 to 63.

From the foregoing, it will be appreciated that specific embodiments of the presently disclosed technology have been described herein for purposes of illustration, but that various modifications may be made without deviating from the scope of the disclosed technology. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:
   determining, for a conversion between a first video block of a video region of a first current picture of a video and a bitstream of the video, that at least one of one or more first coding tools is disabled for the first video block due to a first reference picture resampling being enabled, wherein whether the first reference picture resampling is enabled is based on at least one of a width or a height of the first current picture, wherein, when the first reference picture resampling for the first current picture is enabled, a first reference picture of the first current picture has a resolution different from a resolution of the first current picture, and wherein the one or more first coding tools comprise a bi-directional optical flow (BDOF) tool; and
   performing the conversion based on the determining,
   wherein whether a first syntax element is signaled in a picture header of the first current picture is determined according to one or more syntax elements in a sequence parameter set (SPS) that is associated with the video region, and wherein the first syntax element indicates whether one of the one or more first coding tools is disabled for the first current picture or not.

2. The method of claim 1, wherein the one or more first coding tools comprise a decoder side motion vector refinement (DMVR) tool.

3. The method of claim 1, further comprising:
   determining, for a further conversion between a second video block of a second current picture of the video and the bitstream of the video, that at least one of one or more second coding tools is disabled for the second video block due to a second reference picture resampling being enabled, wherein whether the second reference picture resampling is enabled is based on at least one of a width or a height of the first current picture, wherein, when the second reference picture resampling for the second current picture is enabled, a second reference picture of the second current picture has a resolution different from a resolution of the second current picture, wherein the one or more second coding tools comprise a prediction refinement with optical flow (PROF) tool.

4. The method of claim 3, wherein the one or more second coding tools further comprise a sub-block based temporal motion vector prediction tool, wherein in the sub-block based temporal motion vector prediction tool, a block is divided into at least one subblock, and motion information of the at least one subblock is derived based on a video region in a collocated picture, and wherein a position of the video region is derived based on an available specific neighboring block.

5. The method of claim 1, wherein the one or more first coding tools further comprise a temporal motion vector prediction tool.

6. The method of claim 1, wherein the performing the conversion based on the determining comprises:
   calculating predictors of the first video block; and
   applying an interpolation processing to the predictors once without a resampling processing.

7. The method of claim 1, wherein the one or more first coding tools further comprise an affine prediction, a triangular prediction mode, a symmetric motion vector difference (SMVD), a merge mode with motion vector differences (MMVD), an inter-intra prediction, a local illumination compensation (LIC), a history-based motion vector prediction (HMVP), a multiple Transform Set (MTS), a sub-block transform (SBT), a low frequency non-square transform (LFNST), or a filtering tool.

8. The method of claim 1, wherein information related to the one or more first coding tools is not included in a case that use of the one or more first coding tools is disabled.

9. The method of claim 1, wherein the performing of the conversion includes decoding the first video block from the bitstream.

10. The method of claim 1, wherein the performing of the conversion includes encoding the first video block into the bitstream.

11. An apparatus for processing video data comprising a processor and a non-transitory memory with instructions thereon, wherein the instructions upon execution by the processor, cause the processor to:
    determine, for a conversion between a first video block of a video region of a first current picture of a video and a bitstream of the video, that at least one of one or more first coding tools is disabled for the first video block due to a first reference picture resampling being enabled, wherein whether the first reference picture resampling is enabled is based on at least one of a width or a height of the first current picture, wherein, when the first reference picture resampling for the first current picture is enabled, a first reference picture of the first current picture has a resolution different from a resolution of the first current picture, wherein the one or more first coding tools comprise a bi-directional optical flow (BDOF) tool; and
    perform the conversion based on the determination,
    wherein whether a first syntax element is signaled in a picture header of the first current picture is determined according to one or more syntax elements in a sequence parameter set (SPS) that is associated with the video region, and wherein the first syntax element indicates whether one of the one or more first coding tools is disabled for the first current picture or not.

12. The apparatus of claim 11, wherein the one or more first coding tools comprise:
    a decoder side motion vector refinement (DMVR) tool; and
    a temporal motion vector prediction tool.

13. The apparatus of claim 11, wherein performing the conversion based on the determination comprises:
    calculating predictors of the first video block; and
    applying an interpolation processing to the predictors without a resampling processing.

14. The apparatus of claim 11, wherein the performing of the conversion includes decoding the first video block from the bitstream.

15. The apparatus of claim 11, wherein the performing of the conversion includes encoding the first video block into the bitstream.

16. A non-transitory computer-readable storage medium storing instructions that cause a processor to:
    determine, for a conversion between a first video block of a video region of a first current picture of a video and a bitstream of the video, that at least one of one or more first coding tools is disabled for the first video block due to a first reference picture resampling being enabled, wherein whether the first reference picture resampling is enabled is based on at least one of a width or a height of the first current picture, wherein, when the first reference picture resampling for the first current picture is enabled, a first reference picture of the first current picture has a resolution different from a resolution of the first current picture, wherein the one or more first coding tools comprise a bi-directional optical flow (BDOF) tool; and perform the conversion based on the determination, wherein whether a first syntax element is signaled in a picture header of the first current picture is determined according to one or more syntax elements in a sequence parameter set (SPS) that is associated with the video region, and wherein the first syntax element indicates whether one of the one or more first coding tools is disabled for the first current picture or not.

17. The non-transitory computer-readable storage medium of claim 16, wherein the one or more first coding tools comprise:
    a decoder side motion vector refinement (DMVR) tool; and
    a temporal motion vector prediction tool.

18. The non-transitory computer-readable storage medium of claim 16, wherein performing the conversion based on the determination comprises:
    calculating predictors of the first video block; and
    applying an interpolation processing to the predictors without a resampling processing.

19. A non-transitory computer-readable recording medium storing a bitstream which is generated by a method performed by a video processing apparatus, wherein the method comprises:
    determining, for a first video block of a video region of a first current picture of a video, that at least one of one or more first coding tools is disabled for the first video block due to a first reference picture resampling being enabled, wherein whether the first reference picture resampling is enabled is based on at least one of a width or a height of the first current picture, wherein, when the first reference picture resampling for the first current picture is enabled, a first reference picture of the first current picture has a resolution different from a resolution of the first current picture, wherein the one or more first coding tools comprise a bi-directional optical flow (BDOF) tool; and generating the bitstream based on the determining, wherein whether a first syntax element is signaled in a picture header of the first current picture is determined according to one or more syntax elements in a sequence parameter set (SPS) that is associated with the video region, and wherein the first syntax element indicates whether one of the one or more first coding tools is disabled for the first current picture or not.

20. The method of claim 1, wherein the one or more syntax elements comprises a second syntax element indicating a presence of the first syntax element in the picture header and a third syntax element indicating whether the one or more first coding tools is enabled for a sequence of the video, wherein the second syntax element is conditionally signaled in the SPS based on the third syntax element, and the first syntax element is signaled in the picture header in a case that the second syntax element is equal to 1, and the second syntax element is signaled in the SPS in a case that the one or more first coding tools is enabled for a sequence of the video.

* * * * *